United States Patent [19]

Palmer

[11] Patent Number: 5,014,770

[45] Date of Patent: May 14, 1991

[54] ATTIC SOLAR ENERGY VEHICLE

[75] Inventor: Edward G. Palmer, Elk River, Minn.

[73] Assignee: Attic Technology, Inc., Elk River, Minn.

[21] Appl. No.: 404,192

[22] Filed: Sep. 7, 1989

[51] Int. Cl.⁵ .............................................. F25B 29/00
[52] U.S. Cl. .................................... 165/48.2; 126/416; 126/428; 126/435; 237/2 B
[58] Field of Search ............... 126/416, 422, 428, 435; 62/238.6, 238.7; 165/48.2, 48.1; 237/2 B

[56] References Cited

U.S. PATENT DOCUMENTS

| 629,122 | 7/1899 | Davis. | |
|---|---|---|---|
| 1,338,644 | 4/1920 | Arthur et al. | |
| 3,902,474 | 9/1975 | Pyle | 126/270 |
| 3,989,032 | 11/1976 | Harrison | 126/271 |
| 4,011,904 | 3/1977 | Hope et al. | 165/108 |
| 4,051,999 | 10/1977 | Granger et al. | 237/1 A |
| 4,082,080 | 4/1978 | Pittinger | 126/271 |
| 4,133,338 | 1/1979 | Honikman | 126/271 |
| 4,241,725 | 12/1980 | Emon et al. | 126/435 |
| 4,242,872 | 1/1981 | Shaw | 237/2 B |
| 4,254,822 | 3/1981 | Geier | 126/428 |
| 4,270,518 | 6/1981 | Bourne | 62/238.6 |
| 4,353,412 | 10/1982 | Krumhansl | 165/59 |
| 4,368,549 | 1/1983 | Ramey | 4/493 |
| 4,378,785 | 4/1983 | Fleischman et al. | 126/435 |
| 4,378,787 | 4/1983 | Fleischman | 126/435 |
| 4,406,278 | 9/1983 | Demmer | 126/416 |
| 4,470,271 | 9/1984 | Draper et al. | 62/324.1 |
| 4,470,404 | 9/1984 | Kremen | 126/415 |
| 4,479,487 | 10/1984 | Migdal | 126/422 |
| 4,502,467 | 3/1985 | Smith | 126/429 |
| 4,517,958 | 5/1985 | Worf | 126/429 |
| 4,621,613 | 11/1986 | Krumhansl | 126/416 |
| 4,671,253 | 6/1987 | Blount, Sr. | 126/437 |
| 4,733,417 | 3/1988 | De Shon | 4/493 |

Primary Examiner—Carroll B. Dority

[57] ABSTRACT

The "unmodified" roof (32) and "unmodified" attic (34), of a residential or similar building, are used in conjunction with an "attic based" air to liquid forced air heat exchanger (46) to form an active "attic solar energy vehicle". This solar (30) based system is used to heat swimming pools, spas, hot tubs, domestic hot water and in providing space heating/cooling and in cooling overheated swimming pools or other bodies of water—in a cost efficient way. Low operating cost forced air convection principles that make use of the temperature differentials present are applied. The "unmodified" roof (32) functions as a massive solar (30) collector. The "unmodified" attic (34) functions as a heat transfer and storage medium. The forced air to liquid heat exchanger (46) takes hot attic (34) air directly off of the interior of the roof structure (32) and transfers it to water or other liquid. When used for swimming pool (76) heating, the "attic solar energy vehicle" can save 90% of the fossil fuel normally required to heat swimming pools (76). In addition, an active solar energy system is presented without the corresponding problems associated with roof (32) mounted solar panel systems.

3 Claims, 29 Drawing Sheets

| # | HEAT EXCHANGER LIFE CHARACTERISTIC | PCS1 | HEAT PUMP |
|---|---|---|---|
| A | CURRENT DRAWN | LOW | HIGH |
| B | TEMPERATURE INTERNAL TO EXCHANGER | NONE | HIGH |
| C | PRESSURE INTERNAL TO EXCHANGER | NONE | HIGH |
| D | NUMBER OF COIL TRANSFER CIRCUITS | 9 | 1 |
| E | HEAT EXCHANGER DUTY CYCLE* | 42% | 100% |
| F | COIL CIRCUIT DUTY CYCLE (E ÷ D)* | 4.6% | 100% |
| G | RELATIVE COIL CIRCUIT LIFE | 21.7X | 1X |

* TIME EXPOSED TO SWIMMING POOL WATER

BTUS VS ATTIC – POOL ΔT

BTUS VS FLOWRATE

Fig. 20

| Fig. 20A | Fig. 20B |

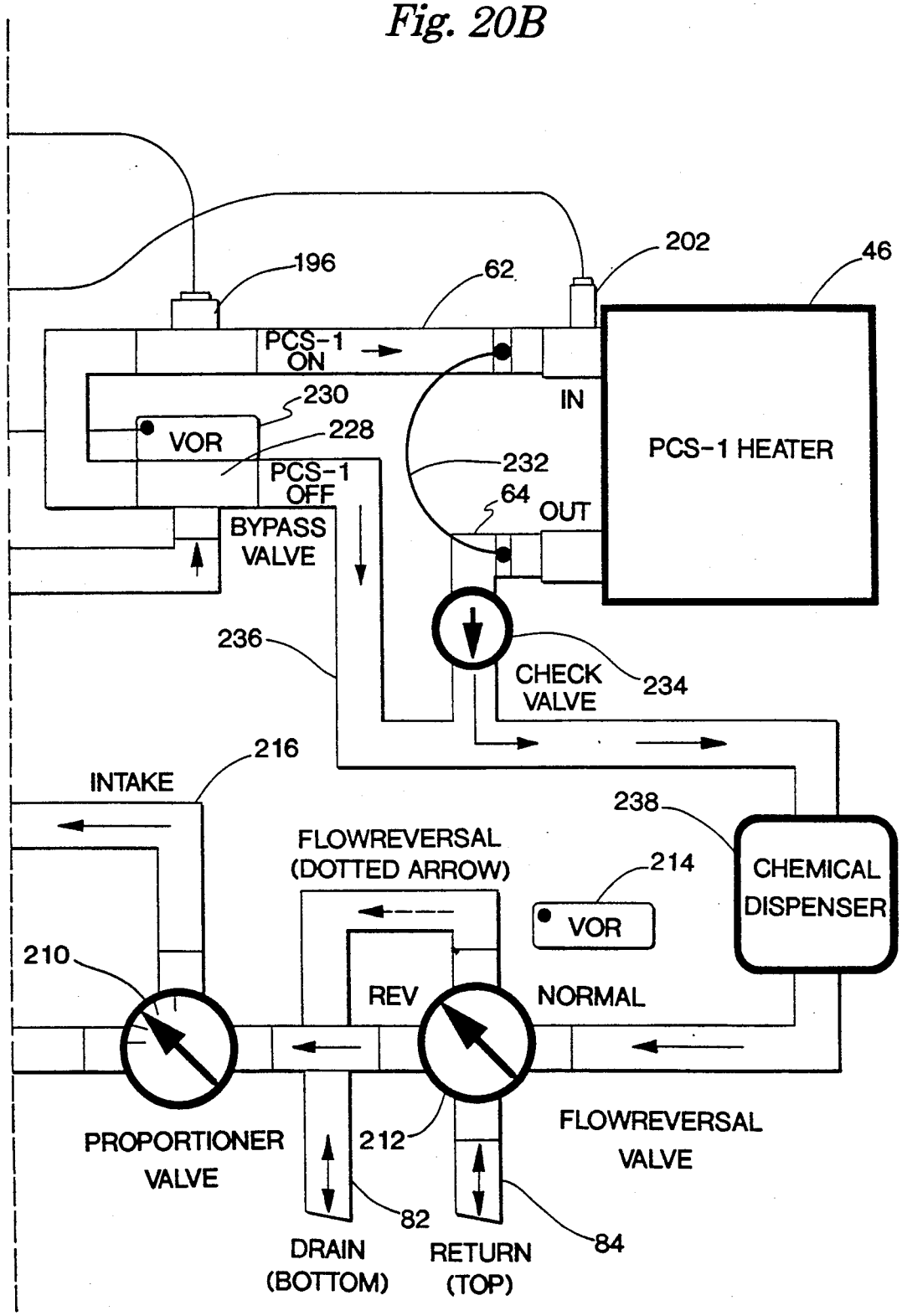

Fig. 25A

| OPERATING MODE | CONTROL SWITCHES | | | | | | | | | | | | | |
|---|---|---|---|---|---|---|---|---|---|---|---|---|---|---|
| | A 338 | B 340 | C 344 | D 346 | E 348 | F 350 | G 352 | H 354 | I 356 | J 358 | K 360 | L 362 | M 378 | N 298 |
| AUTO HEAT | 1 | 1 | -- | 0 | -- | -- | -- | 0 | -- | -- | -- | -- | 0 | * |
| AUTO BACKUP | 1 | 2 | -- | 0 | -- | -- | -- | 0 | -- | -- | -- | -- | 0 | * |
| AUTO COOL | 1 | 3 | -- | 0 | -- | -- | -- | 0 | -- | -- | -- | -- | 0 | * |
| MANUAL | 2 | -- | # | -- | # | # | # | # | # | # | # | # | -- | -- |
| VENTILATE | 3 | -- | -- | 0 | -- | -- | -- | 0 | -- | -- | -- | -- | 0 | -- |
| MANUAL PUMP ON | -- | -- | -- | 1 | -- | -- | -- | -- | -- | -- | -- | -- | -- | -- |
| SPA HEAT-MANUAL | 1 | -- | -- | 0 | -- | -- | -- | 1 | -- | -- | -- | -- | 0 | * |
| SPA HEAT-AUTO | 1 | -- | -- | 0 | -- | -- | -- | 0 | -- | -- | -- | -- | 1 | -- |

LEGEND

A & B SWITCHES INDICATE THEIR "POSITION" NUMBER (SEE FIGURE 22)
SEE FIGURE 24 FLOW CHART FOR EXPANDED INTERNAL LOGIC DESCRIPTIONS.
1 = ON
0 = OFF
-- NOT APPLICABLE
* TEMPERATURE CONTROL FACTOR
MANUAL SWITCH CAN BE USED
E OUTPUT ENABLED WHEN CORRESPONDING MANUAL SWITCH IS ON

Fig. 25B

| INPUT CONDITIONS | | | | | | | | | | | INTERNAL LOGIC | | | | | | | | |
|---|---|---|---|---|---|---|---|---|---|---|---|---|---|---|---|---|---|---|---|
| 194 | 196 | 198 | 200 | 58 | 226 | 290 | 292 | 294 | 296 | 380 | P>A | P<TS | P=TS | P>TS | A>P+8 | EHRS | MRUN | T1+120 | T2+30 |
| 1 | 1 | 0 | 0 | * | * | 0 | -- | -- | -- | -- | -- | 1 | 0 | 0 | 1 | 0 | -- | -- | -- |
| 0 | 1 | 0 | 0 | -- | * | 0 | -- | -- | -- | -- | -- | 1 | 0 | 0 | 0 | 0 | -- | 1 | -- |
| 1 | 1 | 0 | 0 | -- | * | 0 | -- | -- | * | -- | 1 | 0 | 0 | 1 | 0 | -- | -- | -- | 1 |
| -- | -- | 0 | 0 | -- | -- | 0 | -- | -- | -- | -- | -- | -- | -- | -- | -- | -- | -- | -- | -- |
| 1 | 0 | 0 | 0 | -- | -- | 0 | -- | -- | -- | -- | -- | -- | -- | -- | -- | -- | -- | -- | -- |
| -- | -- | 0 | 0 | -- | -- | 0 | -- | -- | -- | -- | -- | -- | -- | -- | -- | -- | -- | -- | -- |
| 1 | 1 | 0 | 0 | * | -- | 0 | -- | -- | -- | * | -- | -- | -- | -- | -- | -- | 0 | -- | -- |
| 1 | 1 | 0 | 0 | * | -- | 0 | -- | -- | -- | * | -- | -- | -- | -- | -- | -- | 0 | -- | -- |

Fig. 25C

| 222 | 52 | 364 | 36 | 230 | 214 | 366 | 368 | 202 | 370 |
|---|---|---|---|---|---|---|---|---|---|
| 1 | 1 | 0 | 0 | 1 | 1 | 0 | 0 | 0 | 0 |
| 1 | 0 | 0 | 0 | 0 | 1 | 0 | 0 | 0 | 1 |
| 1 | 1 | 0 | 1 | 1 | 0 | -- | 0 | 0 | 0 |
| E | E | 0 | E | E | E | E | E | E | E |
| -- | 1 | 0 | 1 | 0 | -- | -- | 0 | 0 | 0 |
| 1 | -- | 0 | -- | -- | -- | -- | -- | 0 | -- |
| 1 | 1 | 0 | 0 | 1 | 1 | 0 | 1 | 0 | 0 |
| 1 | 1 | 0 | 0 | 1 | 1 | 0 | 1 | 0 | 0 |

RESULTANT OUTPUTS

ATTIC SOLAR ENERGY VEHICLE

BACKGROUND-FIELD OF INVENTION

This invention relates to the use of the unmodified attic structure and unmodified roof structure of a residential dwelling or similar building in conjunction with an attic based air-to-liquid forced air heat exchanger to create an active "attic solar energy vehicle" [system]. This "vehicle" or system is then used in heating swimming pools, spas, hot tubs, domestic hot water and in providing space heating/cooling and in cooling overheated swimming pools or other bodies of water—in a cost efficient way.

BACKGROUND-DISCUSSION OF PRIOR ART

Prior art is limited on the use of the attic and roof structure—without modification—as a solar energy device! Heretofore, prior art has used the roof and attic as a passive solar energy device when modified with a transparent or translucent roof material and combined with an internal attic collector. The roof has been used with a transparent material spaced away from the roof to "trap" solar energy. The art shows how to effectively insulate an attic. However, prior art has primarily taught attic ventilation methods to eliminate the accumulated hot air in the attic or to prevent its accumulation. Ventilation has been taught with and without effective moisture barriers and has included: (a) the use of whole house ventilation fans mounted in the attic, (b) the use of wind turbine attic ventilators, and (c) the collection of attic air and its use in supplementing residential heating. Prior art has taught the prevention of attic heat through the use of different roofing materials and through the use of radiant heat barriers on roof materials. It also shows a "passive" domestic hot water preheater and pool heater used within the attic in the "form of a length of heat exchange pipe". Thus, the art has also stressed roof and attic modifications along with the passive use of the hot attic air. The present invention desires the opposite: "increasing the heat capacity of the attic". Heat collected from an unmodified roof and attic can be accelerated and placed into productive use. The present invention transforms the attic into an active "attic solar energy vehicle".

When it comes to using the attic, roof and an attic forced air-liquid heat exchanger to heat swimming pools—no prior art can be identified. An estimated eighty-eight percent of swimming pool heaters installed today are primarily fossil fuel devices. Gas heaters are estimated to account for the majority of these pool heaters with an estimated 74.4% of the total installed population. This is followed by Solar Panel Systems 12%; Electric Heaters 7.4%; Heat Pumps 4.2%; and, Oil Units 2.0%. It is well understood in the art that gas heaters are very expensive to operate and it's not unusual for a pool owner to be faced with gas bills exceeding $150.00 per month for swimming pool heat. Electric pool heaters can cost twice as much or more than gas heaters to operate. A low operating cost alternative is desirable: one that does not have the problems associated with solar panel systems but does have their low operating cost characteristic.

Without using some form of heat for the pool, the season is relatively short for swimming and the pool is less than enjoyable due to cold water. The art indicates a "comfort zone" for swimming is reached when the pool water is between 80-84 Degrees F. Even in areas such as Florida, where one might suspect that pool heat is not required—it is in fact required for a lot of pools. In some instances, high water tables provide a heat sink for the pool—necessitating the need for a heater. Even as far South as Fort Myers, Florida and below which get into very temperate and even tropical climate conditions, pool heat is required during late Fall and into Spring. Thousands of installations of Solar panel heating systems have documented the need for pool heat—especially within Florida and other States below the frost belt.

While Gas heaters are relatively low in cost for the initial installation, some pool dealers and contractors—mindful of high operating costs—are reluctant to sell these with the pool. One sales strategy is to avoid the issue of heating a pool and to simply "throw in" free a pool solar blanket. Often, the pool buyer is told that the pool blanket is all that is needed. Pool buyers are even told this in Northern States such as Minnesota. While a pool solar blanket can limit the main loss of heat which takes place from the surface of the pool—it is not a substitute for a heater in the majority of pool installations. Pool owners readily admit they hate having to drag a blanket on and off the pool. As a result, many pool blankets see only limited use. This is also a major drawback for black poly strips lowered into the pool to function as a "passive" solar heater [Kremen, U.S. Pat. No. 4,470,404 Issued 9/1984].

Some pool blanket manufacturers will specify a ten degree gain in pool temperature over a swimming season and in fine print disclose that the blanket is used on the pool for twenty hours of every day and off only between noon and four p.m. Such criteria is unrealistic since the majority of people are not so structured in their lives and would probably like to swim in the pool in the evening hours as well. Data also indicates a significant heat stratification at the upper layers where the temperature thermometer is located and use of a pool blanket will not create the same warmer temperatures at lower levels within the pool.

A higher temperature reading when using a blanket, is thus, only an indication of the temperature stratification within the pool and is not the average water temperature of the pool. With ideal pool installations and a pool blanket used diligently, pool owners state that the blanket will suffice. However, on the majority of cases, a blanket merely supplements other heating apparatus. Most manufacturers of heaters recommend the use of a blanket with their heaters when the pool is not in use. The present invention broadens the number of pools that can be used without a blanket during season and broadens the swimming season with the use of a blanket. Unlike gas and other heaters, lack of diligent pool blanket use does not translate into substantially higher operating costs.

Other forms of fossil fuel heaters answer specific market needs in areas that lack natural gas distribution or where propane gas costs are high. In Florida, for example, natural gas distribution is limited and homes are typically wired for electric space heat. As a result, one can find installations of electric pool heaters despite the enormous expense of using one. Other products such as Oil heaters, are again, related to distribution of energy sources and their relative costs to the pool owner.

One popular product is the Heat Pump pool heater. With a typical coefficient of performance of 4.0, the heat pump is four times more efficient than an electric resistance heater and is a popular choice when a solar panel system is not desired and electricity is primarily available. Heat pumps operate off of a reverse refrigeration principle. Refrigerant, typically freon, is compressed into a gaseous state, cycled through a heat exchanger to transfer the heat into the pool and returned to the compressor in liquid state via an expansion valve and evaporator coil. While the refrigerant passes through the evaporator coil, it absorbs heat from the air.

FIG. 3a shows a typical swimming pool heat exchanger used by a heat pump. Item 110 represents the entire heat exchanger which is in the form of a coil several feet long. This coil 110 is physically located in the bottom of the heat pump and is comprised of a flexible rubber coil 112 and an internal heat exchanger coil 114 [flexible cupro-nickel pipe] in which the heated refrigerant flows. Compressed and heated refrigerant, in gaseous state, enters heat exchanger 110 at input 116 and pool 76 [FIG. 1] water enters coil 112 at inlet 118. Heat exchange coil 114 is ribbed causing pool 76 water to agitate and improve the heat transfer which occurs internally between coil 114 and pool 76 water circulating through coil 112. After giving up its heat to pool 76 water, the refrigerant returns to a liquid state and leaves heat exchanger 110 at outlet 120. Pool 76 water returns back to pool 76 leaving at outlet 122. The liquid gas flows through an expansion valve and an evaporator coil [where heat is picked up from the air] back to the compressor which starts the cycle over by compressing the refrigerant back into a heated gas.

TABLE 1 in FIG. 3b shows a comparison chart with the present heat exchange method compared to the popular heat pump. The heat pump has the disadvantage of drawing a substantial amount of current at 220 vac. This is typically in the range of 12-25 amps. The present heat exchanger draws only 1.8 amps full load. The heat pump further has the disadvantage of employing a high internal temperature and pressure [of the gas] which is not a part of the present heat exchanger. One of the primary problems found in heat pumps relates to the life of the cupro-nickel heat exchange coil 114 when the pool water turns acidic. This cupro-nickel coil 114 represents a one coil circuit that is exposed 100% of the time to the pool water whether the heat pump is active in heating the pool water or not. In contrast, the present heat exchanger employs nine coil circuits that divide the pool water evenly. Further, the present exchanger is presented with the pool water only 42% of the time via a solar bypass valve which routes the water into the heat exchanger only when heat is available in the attic. This is estimated at a maximum of 10 hours per day [10/24=42%]. Given these factors, and assuming the heat pump coil to be a life factor of one in an acidic pool condition, the present exchanger represents a significant gain in relative life. The failure mode here is the acid like etching away of the coil material itself. TABLE 1 in FIG. 3B shows that the coil circuit exposure is only 4.6% in the present exchanger VS coil circuit exposure of 100% in a heat pump's heat exchanger.

Heat pumps have a limited coefficient of performance (C.O.P.) of 4.0-5.0 as contrasted with the present invention which provides a C.O.P. in the order of 44 [BTU's out÷BTU's in][1]. Heat pumps also use a chlorofluorocarbon chemical, CFC, as a refrigerant gas. This is known to damage our environment by depleting the earth's ozone layer which protects us from excessive and damaging solar radiation. These chemicals are expected to be banned in the near future. Irvine, CA has already passed a local ordinance restricting the use and banning CFC's. As yet, no effective replacement chemicals have been found for heat pump use. The present invention uses no chemicals nor any refrigeration process. It also does not burn fossil fuel.

[1] BTU=British Thermal Unit [The quantity of heat required to raise one pound of water 1° F]. [2] GPM=Gallons per minute A pertinent form of prior art is disclosed in FIG. 2. This invention was made back in May of 1981 by R. David Burns of Minnesota. Mr. Burns had a 17×35 foot swimming pool in Prior Lake, Minn. and was disturbed by the high costs of heating the pool water, an estimated 25,000 gallons. In May 1981, Mr. Burns installed sixty feet of ¾" baseboard hot water heatrim pipe connected in series—to form a heat exchanger 100—within his attic structure 34. The concept was to use hot water baseboard heating pipe which is an aluminum finned copper pipe in a reverse heating mode. Instead of putting 150-220 degree water into the copper pipe and having the fins radiate the heat into living space—placing the finned pipe in the hot attic air where the fins could get hot and routing cooler pool water through the pipe. Model R-750 Heatrim pipe, which is sold by American Std Plumbing and Heating of Brunswick, N.J., was used. In operation, pool water is drawn out of pool 76, at 14 GPM[2], by pump suction intake line 108 and is lifted up to attic 34 heat exchanger 100 by recirculating pump 106 via heatrim series heat exchanger inlet pipe 102. Output of heatrim series-connected heat exchanger 100 is delivered back to pool 76 via outlet pipe 104.

This invention simply recirculated pool water 76 through heat exchanger 100; constructed of sixty feet of series connected hot water aluminum finned copper heatrim pipe and physically located within attic structure 34. A simple commercial hot water tank temperature switch was added in attic 34 to turn recirculating pump 106 on automatically when attic 34 reached a preset temperature. The invention enjoyed limited success in heating the swimming pool. Enough to satisfy Mr. Burns. In March 1983, Mr. Burns made a full disclosure of the invention and made the invention public thereby deciding to forego any patent rights.

Mr. Burns and this inventor then proceeded jointly to attempt to manufacture and market this "passive" attic based pool heating system. By September 1984, efforts were abandoned because the invention did not have enough heating capacity and margin necessary to ensure commercial success. In Mr. Burn's invention, it appears that 200 btu's per foot were realized in the reverse mode of this pipe for an estimated 12,000 btu's per hour out of heat exchanger 100. Using a nominal pool demand of 50,000 Btu's per hour, one could calculate that 250 feet of this pipe would be required. However, the pipe becomes less efficient in longer runs and to obtain the necessary btu's requires an additional 150 feet. Thus, it was estimated that up to 400 feet or more of such hot water heatrim pipe would be required in series to ensure commercial success. Clearly this was not a feasible venture as it was simply not practical to assemble such pipe length in the limited environment and space of an attic.

In June 1985, this inventor revisited the use of attic based heating of swimming pools. By August 1985, I conceived the present invention later described herein. On Jul. 1, 1989, an experimental installation in Bloomington, Minn. provided proof that the present invention described herein works. Mr. Burn's invention is similar to Blount's U.S. Pat. No. 4,671,253. This patent discloses a method of "preheating" domestic hot water by utilizing 120 feet of serpentined PVC pipe physically located either vertically or horizontally within an attic structure. The patent specifies a heat exchanger comprised of "a length of pipe located entirely within the attic of a residential dwelling having a sufficient length and volume to effect exchange between hot air trapped in a residential attic and tap water flowing through the pipe".

Both Mr. Burn's invention and Blount's U.S. Pat. No. 4,671,253 describe pertinent prior art.

Both inventions use a series of pipe to effect heat transfer from the air to a liquid [water] in the attic. Both methods used "passive" heat transfer: a device merely sitting within the attic exposed to hot air with cooler water circulating through it. Mr. Burn's method actually heated a swimming pool on a limited basis, delivering an estimated 12,000 BTU's per hour and using a recirculating pump. The pool, itself, was the storage vehicle for the heat. Blount's U.S. Pat. No. 4,671,253 merely "preheats" domestic hot water using street municipal water pressure. Given a domestic water tank of 50 gallons capacity and an input water temperature of 50 degrees F and an output water desired temperature of 120 degrees F—it would take $50 \times 8.34 \times 70$ or 29,190 BTUS to heat such a 50 gallon tank to the desired temperature. Mr. Burn's invention, while still under capacity for a fast recovery, would not just "preheat" the water but would in fact provide full heating of domestic hot water for families whose hot water usage was low [i.e.-no kids, etc.]. The art has established that a well ventilated attic will only get ten degrees warmer than the outside ambient temperature. In such a situation, this kind of a heating method would not necessarily work for 100% of the hot water required—unless the ambient air temp reached 110 degrees F. Other attics, in contrast, can see temperatures ranging up to 160 degrees F and could easily accomplish the task. Well ventilated attic environments can easily and inexpensively be altered to enhance and raise the peak attic temperature.

However, neither of these methods are commercially feasible for heating swimming pools since BTU capacity and heating margin are unacceptable for both of them. Not to mention water flow rates which need to be considered. This is not to say the attic is incapable of delivering such heat and margin.

While experimenting and physically sitting within an attic structure with 60 feet of heatrim series connected pipe constituting a pool heating system running—no appreciable drop in attic temperature was noted. This means that while some measurable and significant heat can be extracted using a series of pipe connected to create a passive heat exchanger—much more heat is available to be extracted. This fact is not obvious in Mr. Burn's invention nor is obvious from Blount's U.S. Patent. In addition, the commercial viability of either method is questionable, for domestic water or other purpose, since assembly—of a series of pipes—within an attic with limited working space is required. It's obvious that neither sixty feet of rigid copper heatrim hot water baseboard heating pipe nor one-hundred-twenty feet of rigid PVC schedule forty pipe can be easily slipped through a conventional attic access.

Mr. Burn's method requires assembly taking place within an attic using copper soldering tools. An alternative would be to cut the heatrim pipes and assemble them using flexible pipe and hose clamps. Blount's patent requires assembly taking place within an attic using PVC welding cement and is hazardous given the toxicity of PVC weld cement and the enclosed assembly area. Both methods require building a heat exchanger within the limited attic space. In the case of Mr. Burn's method, an additional [booster] pump is required to recirculate the pool water. This is also the case involving some solar panel heaters. It is not the case with the present invention.

To resolve the limitations of these two methods requires that an efficient heat transfer apparatus be established that (a) can be easily installed within an attic structure, (b) can be easily adapted to the existing pool plumbing, (c) does not require a booster pump, and (d) will have sufficient BTU capacity to heat a swimming pool.

Solar Panel systems have the lowest monthly operating cost which is only a fraction of operating a gas heater. Solar panel systems, however, have several drawbacks which are explained below. The present invention not only matches the low operating cost of a solar panel system but also provides an additional cost savings in terms of reduced or eliminated air conditioning costs explained herein.

Solar designers have created many types of passive devices designed to collect solar heat and heat pools, domestic water, and space, etc.. Prior art has taught two significant methods that are opposite of the present invention. First, prior art has taught extensively the construction of various solar panels and the mounting of said solar panels physically onto roof structures for purposes of collecting solar energy efficiently. Prior art has not taught that an "existing" roof structure along with the attic structure were capable of being used "without modification" as an "active" and viable solar collector. Secondly, prior art has taught the construction of a passive attic collector by use of a "transparent" or "translucent" roof material that would allow the sun to pass through the roof, collect on an internal attic "collector", and be trapped within the attic for use. It has not taught that neither the roof structure nor the attic structure need not be modified. Prior art has not explored the use of a roof structure and attic structure—itself—as an "active" solar energy vehicle when used in conjunction with a significant heat sinking source such as a swimming pool along with an efficient "internal attic based" heat exchange apparatus.

Active in this sense means that the roof and attic structure are capable of behaving in more than just a passive manner as will be explained herein. Several questions have been left unanswered in prior art to date. These questions are: "How much heat is collected by a non modified roof and attic structure?" "Can this heat collection be increased substantially?" "Can this heat collection be placed into use commercially and at a low cost?" The present invention answers these questions.

The state of solar installations have evolved to flat rubberized panels [series connected] in several areas of the country vs the more expensive glass panel installations. However, the rule of thumb for sizing still applies! For every square foot of surface area of the pool—a square foot of solar panel is needed. This requires a very substantial structural installation for any modern solar panel system. In some cases, a separate structure is built specifically just for the solar panels in lieu of mounting the panels on the roof.

Solar panel systems have the following limitations and various problems associated with them: (a) Massive roof mounted installations or separate panel structures required; (b) Roof rotting under the panels caused by trapped moisture; (c) Panel deterioration caused by solar exposure and exposure to the elements; (d) Plugged panel plumbing caused by small water circuit orifices; (e) Possibility of vandal damage to glass if used; (f) Large surface areas of collectors required for effective heating of pools; (g) Orientation for optimum solar collection; (h) Wind damage problems; (i) Glazing problems; (j) Assembly leak problems; (k) Glue Problems; (l) Vacuum problems; (m) Water leveling problems; (n) Pressure problems; (o) Flow Rate Problems; (p) Technical sales explanations; and, (q) Unsightly installations. As will be seen herein, the present invention overcomes these "solar panel" problems.

Another method for heating pools is disclosed in U.S. Pat. No. 4,733,417 issued to De Shon (3/1988) which uses a plate under the bottom of the pool coupled to a vertical shaft that extends into the earth. Said invention communicates the earth's constant temperature to the pool thereby heating the pool. A significant disadvantage of this method is that the pool will now also communicate its heat to the earth since it has a convenient heat sink. To date, heat loss directly to the earth was only a minimal consideration and could be compensated for by increased insulation. In areas like Minnesota, said invention is impractical since the earth's constant temperature is around 59 degrees F. Such a method would create a serious increase in pool heating costs if employed. In temperate areas cited with ground temperatures of 72 degrees F., the invention poses a sizeable and costly installation problem. Such problems not existing with the present invention.

Pool heaters can typically require some kind of flow bypass circuitry due to the limited amount of pool water they are able to accept. An example would be a pool's pump and filter having a flow rate of 45 gallons per minute and a heater capable of only accepting 25 gallons per minute. In the art, the way of dealing with this is to build into the heater itself a flow bypass circuit or to build externally into the plumbing a bypass flow circuit thereby allowing only a partial flow of the pumps water into and through the heater. Specifically, allowing only the amount of water flow the heater's heat exchanger is capable of accepting. The present invention solves this problem on the majority of residential pools by inherently being able to accept the pumps full flow rate without the need for a bypass circuit.

When it comes to other heat exchangers, prior art discloses Hydronic heaters using steam at 200 degrees F along with a fan. Such heaters appear structurally similar to the present exchanger but differ in application. Hydronic heaters are used to heat space. Their application involves putting hot water or stream into the unit at low pressure and low flow rates and then either communicating this heat to the air passively using fins as in baseboard hot water heating units or actively using a fan as on a ceiling mounted unit. The steam is typically at 2 psi and will drop 20 degrees F. going through the heat exchanger. These hydronic heaters require a source of heat. This is usually in the form of a boiler that heats hot water with natural gas or some other form of fossil fuel. Hydronic heaters are not considered pertinent prior art except those that can use the solar heated water available from the present invention [Gantner, U.S. Pat. No. 4,607,791 issued 8/1986].

Prior art further discloses the benefits of using the swimming pool as an energy storage device [Krumhansl, U.S. Pat. No. 4,621,613 issued 11/1986]. A heat pump is employed with a modified roof having a transparent covering spaced away from the roof, air plenums to effect air movement throughout the house and attic, and a swimming pool with a cover for heat storage and use as a heat transfer medium. Heat is transferred to and from the pool and the house. Hot air is routed from the attic and other spaces to serve as the "air source" for the heat pump's evaporator coil. Collectively the system functions as an efficient space heating and cooling device. One would not put a heat pump physically into an attic, without modification, as the extreme temperatures the attic is capable of providing could lead to premature failure of the compressor system which already runs at a high temperature. However, the evaporator coil could be placed within the attic itself to draw on the heated air to increase its efficiency. Such a modification has the disadvantage of requiring separation and rebrazing of the refrigerant lines as well as recharging of same. In addition, the heat pump has the previous disadvantages already cited.

Swimming pools are now being plumbed to create a more efficient heating environment. Krumhansl's patent discloses a method for heating a pool whereby the water is drawn from the top of the pool, heated and then returned to the bottom of the pool. The heated pool water then rises within the pool reducing the pool's heating needs substantially. In addition to this method, in floor pool circulation systems have evolved that also allow the heated pool water to rise from the bottom at the same time they "sweep" dirt and sand towards the pool's main drain. Such pools are more efficient to heat because of the plumbing. Krumhansl's patent does not anticipate the present invention as a device used in conjunction with the flow reversal of pool water.

Finally, in the discussion of pool heaters, is the fact that fossil fuels are being depleted on essentially a luxury item at the same time the world is facing one of its greatest challenges: the "Greenhouse Effect". A lot of development is being carried on, in this area, for solutions.

This present invention is one solution. It saves ninety percent of fossil fuel requirements for heating swimming pools. A call worldwide is being made to switch to the "cleanest" fossil fuel of natural gas wherever possible. As conversions are made and demand for natural gas goes up—the price of heating a swimming pool with said natural gas will escalate. The present invention anticipates energy legislation that will further restrict the use of natural gas and other fossil fuel heaters. Again—88% of existing pool heater installations will be impacted by any increase in fuel costs and/or restrictive energy legislation.

The following 28 patents were found to contain pertinent prior art.

Davis' U.S. Pat. No. 629,122 (7/1899) discloses a solar water heater comprising in combination with a double walled box mounted at an inclination, of a heat retaining material therein, the water receptacles supported by and partly embedded in said heat retaining material, suitable connections between said receptacles, the inclined reflectors in said box, and the double glass cover with space intervening between same.

Arthur and Cartter's U.S. Pat. No. 1,338,644 (4/1920) discloses a solar hot water heater using a roof mounted glass panelled collector wherein a serpentined pipe is used to collect solar radiation. Means are provided for storage and supplementing the solar heat on cloudy days.

Pyle's U.S. Pat. No. 3,902,474 (9/1975) discloses a solar heat converter comprised of a box of any convenient size with a maze of air passageways within the box. The passageways are partially filled with shredded heat conductive material, preferably having a black color. The heated air is forced through the passageways by means of fans or pumps, and the interior of the box is exposed to sunlight by a covering of thermal glass.

Harrison's U.S. Pat. No. 3,989,032 (11/1976) discloses a system for solar heating of water in combination with a domestic hot water system having a hot water storage tank. The solar heater used has a surface which absorbs sunlight to produce heat, and a heat exchange passage for water in the solar heat collector. Means are provided to maintain air within an inflatable elastic member of the collector at a higher hydrostatic air pressure than the static hydrostatic water pressure in the water passage of the collector whereby the collector is rendered tolerant to freezing.

Chayet's U.S. Pat. No. 4,010,734 (3/1977) discloses a solar heating system including a solar collector, a water storage tank and water lines. The solar collector preferably includes a continuous length of the tubing coiled in a helical array of closely adjacent turns, having a water inlet communicating with the outermost turn and a water outlet communicating with the innermost turn. The solar collector is exposed to the direct rays of the sun and provides hot water for storage in a storage tank.

Hope et al. U.S. Pat. No. 4,011,904 (3/1977) discloses a combination heat exchanger and blower unit suitable for connection in the breeching between a heater and the stack to admit hot flue gases into the unit. The flue gases enter a fan section wherein the hot flue gases and recirculated gases within the unit are accelerated by a fan. A helical coiled tube heat exchanger is positioned within the unit and is bombarded by the gases which are discharged by the fan. The turbulence created within the unit causes the heated gases to impact upon and pass between the heat exchanger coils many times at high pressure. The repeated impacts of the heated gases upon the tube heat exchanger breaks down the boundary layer of stagnant gas surround the heat exchanger coils and results in increased heat exchange efficiency.

Granger et al. U.S. Pat. No. 4,051,999 (10/1977) discloses a solar heated building including a thermal collector means which is carried in the attic of the building for absorbing energy and heating the air within the attic. Duct means are connected between the attic and a thermal storage chamber carried below the bottom floor of the building. A translucent roof material is used that allows solar radiation to enter the attic where it is absorbed on a black solar collector internally mounted in said attic. Solar energy heats the collector and the attic air and this heated air is then used in space heating.

Pittinger's U.S. Pat. No. 4,082,080 (4/1978) discloses a heating and cooling system utilizing solar radiation as an energy source and a fluid body as a storage medium, the fluid body being distributed over the roof area of a dwelling or other structure with provision for controlling the absorption, storage and delivery of thermal energy to regulate the temperature in the enclosed areas of the structure.

Cook's U.S. Pat. No. 4,119,087 (10/1978) discloses a solar water heating system in which piping arrangements and solenoid operated valves are combined with a water storage heater and solar heater or collectors in a manner to protect the system against over temperature and against freezing without the use of antifreeze or auxiliary heat exchanger systems.

Honikman's U.S. Pat. No. 4,133,338 (1/1979) discloses a redundant freeze protection device for a solar heating system having primary and secondary protection modes. The primary mode is triggered in response to the collector liquid temperature dropping to a selected freeze protection trigger level and involves termination of liquid circulation through and draining of liquid from the collector. The secondary or back up freeze protection mode occurs upon failure of the collector drainage means to drain the collector in the primary mode in response to a second freeze protection trigger and involves continued circulation of liquid through the collector and solar energy storage tank to warm the collector.

Hinterberger's U.S. Pat. No. 4,153,955 (5/1979) discloses a solar heating device which uses a solar energy converter employing a stationary mirror which reflects and focuses solar radiation onto a tank of continuous radiation concentrators through which a liquid is selectively passed as the focussed radiation passes there across as the elevation of the sun changes during the day. This system provides for greater concentration of the rays of the sun on the solar energy converter throughout the course of the day.

Novi's U.S. Pat. No. 4,159,017 (6/1979) discloses a solar heating panel having a rectangular frame to receive a rectangular metal pan which supports a continuous coil of water tubing which is attached thereto by strips of metal attached to the pan. The solar heating panel is exposed to the direct rays of the sun and closed off by a pane of glass. The solar heating panel can be included into a household water system and also to heat space.

Geaslin's U.S. Pat. No. 4,191,329 (3/1980) discloses a hot water solar system which heats water in solar panels exposed to the direct radiation from the sun. From the solar panels, the water is circulated through a supplemental heater and through a domestic heating system and thus made available for domestic use in washes and baths. In the event the solar panels will not increase the temperature of the water one and a half degrees C., the water is not circulated through the solar panel but merely circulated back through the supplemental heater in the household loop.

Neustein's U.S. Pat. No. 4,196,718 (4/1980) discloses a solar heating system for a building in which the liquid in the solar cell is subjected both to radiation from the sun and to heat from the exhaust chimney gases from the building furnace. The fluid in the tubes is heated by radiation and is circulated to a fluid reservoir where the fluid is drawn when required.

Shaw's U.S. Pat. No. 4,242,872 (1/1981) discloses a solar assisted multiple source and multiple sink heat pump system for use in residential homes and includes a solar/air coil mounted in the attic of the residential home and selectively open to the attic interior with the attic roof bearing a solar window with selective shield permitting the attic solar space to constitute a passive solar collector.

Gouyou-Beauchamp's U.S. Pat. No. 4,257,397 (3/1981) discloses an apparatus for heating water with solar radiation incorporating an auxiliary heating unit external to the hot water reservoir and by-passing the solar heating element, for providing auxiliary water heating whenever the temperature in a selected portion of the reservoir decreases below a pre-determined level.

Krumhansl's U.S. Pat. No. 4,353,412 (10/1982) discloses a heating and cooling system for dwellings and other confined spaces which is facilitated when thermal energy is transported between an air heating and cooling system in the dwelling and a water heat storage sink or source, preferably in the form of a swimming pool or swimming pool and spa combination. Special reversing valve circuitry and the use of solar collectors and liquid to liquid heat exchangers on the liquid side of the system and special air valves and air modules on the air side of the system, enhance the system's efficiency and make it practical in the sense that systems employing the invention can utilize existing craft skills and building financing arrangements without major modification.

Ramey's U.S. Pat. No. 4,368,549 (1/1983) discloses a swimming pool heater temperature control system designed to optimize the use of a conventional heater as a supplemental heat source for a solar heated swimming pool. The temperature control system operates by automatically adjusting the temperature setting of the heater to conform to the temperature vs time profile of an optimum solar collector.

Palmatier's U.S. Pat. No. 4,384,568 (5/1983) discloses a solar heating system comprising a solar collector having its fluid circulation controlled by pressure differentials within the system. By constant monitoring of the pressures differential by the valves within the system, the fluid is allowed to circulate through the system without the necessity of circulating pumps or the use of a thermosiphon, even when the collector is elevated gravitationally above the storage tank.

Demmer's U.S. Pat. No. 4,406,278 (9/1983) discloses a heat exchange assembly comprised of a solar heat collector panel adapted to be mounted on a portable support for use in heating swimming pools.

Kremen's U.S. Pat. No. 4,470,404 (9/1984) discloses an apparatus for and method of heating a swimming pool which incorporates a submersible suspendible black body sheet to serve as a device to absorb solar radiation and transfer the collected energy to the pool water so that the pool water can be efficiently heated.

Migdal's U.S. Pat. No. 4,479,487 (10/1984) discloses a solar water heating system with a solar collector having coils consisting of several stages, some of the coils having different heat insulation effects increasing the temperature in the coil stages.

Smith's U.S. Pat. No. 4,502,467 (3/1985) discloses a compact attic mounted solar heating pack assembly that includes an enclosed sheet metal plenum fixedly hung by straps from the attic rafters at the apex of North and South facing roofing sections. This plenum is equipped with a blower motor and flexible ducting to the house along with appropriate temperature controls. The device functions as a supplemental source for space heating during late fall and early spring.

Worf's U.S. Pat. No. 4,517,958 (5/1985) discloses a corrugated solar panel assembly that allows the use of liquid and gaseous heat transfer mediums at the same time for collecting energy from ambient sources and, alternately, using both mediums to transfer energy from one to the other for purposes of providing heating and cooling of living space. Said corrugated solar panel assembly being used separately or as an integrated part of the roof and walls of a building.

Gantner's U.S. Pat. No. 4,607,791 (8/1986) discloses a hydronic room heating device in the form of a baseboard heating panel of air entrained concrete with concrete radiating fins molded on the back of the panel with an upper concrete heating element section positioned to allow air flow past the fins upwardly and out through the opening between the upper element and the panel using low temperature heated water from solar heated systems.

Krumhansl's U.S. Pat. No. 4,621,613 (11/1986) discloses a method for pool and spa heating and cooling. The efficiency with which the water in pools and spas may be heated is greatly improved by circulating water through a heat exchanger such that the heated water is introduced at or near the lowest point in the body of pool or spa water and by removing water to be heated from a point near the surface notwithstanding that the heated water rises to form a warm layer at the surface. When the body of water is heated to a selected temperature, the flow direction is reversed so that water is withdrawn from the low point and, after heating, is returned to a point nearer the surface. That method has the advantage that it can be practiced with conventional pool and spa plumbing systems with minimum modification to permit a reversal of pool and spa inlet and outlet opening connection to the external water cleaning conduit. Water flow and control in the external circuit remains the same. System operation and practice of the method is enhanced by the inclusion of a solar energy collector and valves of unique design.

Blount, Sr's U.S. Pat. No. 4,671,253 (6/1987) discloses a domestic water preheater whereby a heat exchanger is constructed of series connected PVC pipe 120 feet long. Said construction being in a serpentine fashion and either mounted vertically or horizontally into an attic. The heat exchanger thereby constitutes an air to liquid preheater which is connected to a domestic hot water system. Connecting pipes and valves to effect operation when desired are included. Preferred embodiment being "a length of pipe having a sufficient length and volume to effect exchange between the hot air trapped in a residential attic and tap water flowing through the pipe". See discussion above of R. David Burn's 1981 invention and public disclosure of same in March of 1983, within Minnesota, which appears similar to this U.S. Patent. Both being lengths of series connected pipe within an attic to passively affect heat exchange between the hot attic air and water flowing through the pipe.

De Shon's U.S. Pat. No. 4,733,417 (3/1988) discloses a steady state swimming pool heat exchanger designed to warm the water in swimming pools by the conducting of heat from the constant heat reservoir of the earth into the water in the pool through a heat conducting rod sunk vertically into the earth beneath the pool. Attached to the rod is a contact plate, mounted on the floor of the pool, which transfers heat energy from the rod to the water.

OBJECTS AND ADVANTAGES

Accordingly, several objects and advantages of the present invention are:
(a) to provide for the use of an existing roof and attic structure without any modification as part of an effective solar energy device;

(b) to provide an attic based heat exchange apparatus(s) capable working in conjunction with the unmodified roof and attic structure to form an "attic solar energy vehicle";

(c) to accelerate solar energy collection by increasing the temperature differential between the roof's internal attic side and the roof's external shingle or covering side that is exposed to solar radiation;

(d) to provide an effective solar energy system which does not have the problems associated with solar panel type systems;

(e) to provide for low cost heating of swimming pool water;

(f) to provide for low cost heating of spa or hot tub water;

(g) to provide for low cost heating of domestic or other hot water;

(h) to provide for simultaneous space cooling while heating a pool;

(i) to provide simultaneous low cost space heating and hot water;

(j) to provide a dual mode apparatus for using convection as the primary heat exchange method and a heat pump as a secondary or backup heat exchange method in geographical areas that lack enough solar exposure to use convection for 100% of heat exchange needs;

(k) to provide for space heating of residential or other space;

(l) to provide for cooling of swimming pools or other water bodies;

(m) to provide an attic heat exchange apparatus for use with heat pumps;

(n) to reduce by 90% or more the fossil fuels needed for heating swimming pools;

(o) to provide an easily installed attic heat exchanger of substantial capacity for the above heating requirements;

(p) to provide an effective means of controlling solar collection from an unmodified roof and attic as described herein automatically by means of temperature sensors and other devices thereby optimizing solar collection and minimizing operating costs and fossil fuel backup heater usage;

(q) to broaden the use of swimming pools by providing a low cost heating alternative to those pool owners who cannot afford the high operating costs of traditional fossil fuel swimming pool heaters;

(r) to broaden the use of swimming pools without a solar pool blanket;

(s) to eliminate the use of chlorofluorocarbons found in pool heat pumps that damage the earth's ozone layer by providing a cost effective alternative that uses renewable solar energy;

(t) to eliminate the burning of fossil fuel, which has been found to damage the environment by increasing the "greenhouse effect", for heating swimming pools and other water heating applications—by offering a cost effective alternative that uses renewable solar energy;

(u) to provide a solar energy device that does not have to be mounted on top of the roof or have a separate structure built for it;

(v) to provide a heat exchanger that can accept the full flow rate of most swimming pool pump and filter systems thereby eliminating the need for a separate or an internal heat exchanger flow bypass circuit;

(w) to provide a heat exchanger with extended life characteristics when compared with heat pump heat exchangers in an acidic pool environment;

(x) to provide a solar system that is easy to plumb into the existing swimming pool support system and one that does not require a second booster pump;

(y) to provide an attic based solar system that will work in conjunction with an efficiently plumbed swimming pool to provide 100% of the pool's heating needs from renewable solar energy;

(z) to provide an attic based solar system that will work in conjunction with attic installed radiant heat barriers;

Still further objects and advantages will become apparent from a consideration of the ensuing description and drawings of my invention.

DRAWING FIGURES

Figures 3A, 3B:
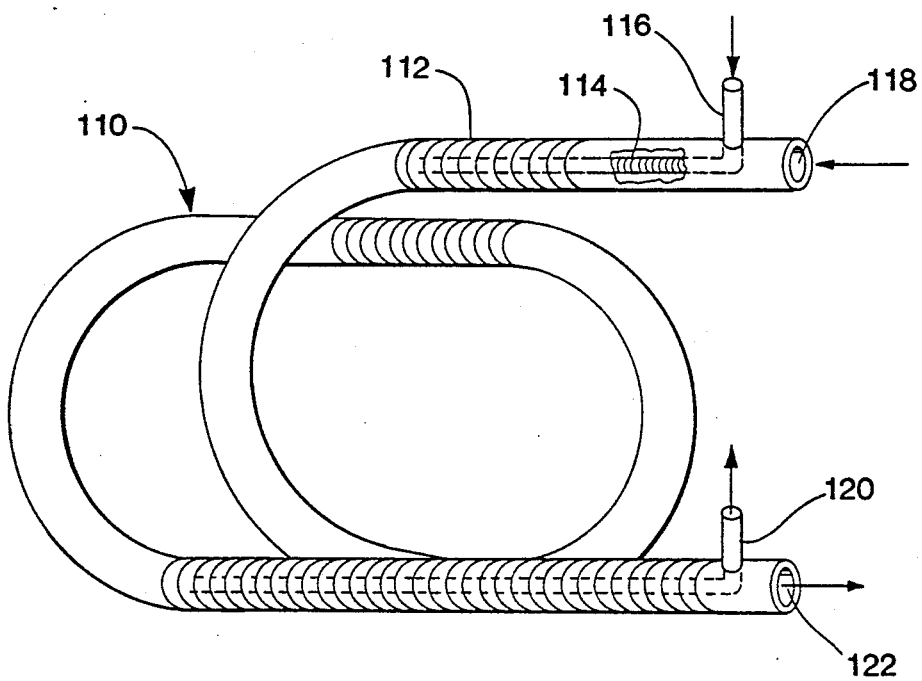

FIG. 3a is a perspective drawing that shows prior art. Heat pump heat exchange coil that transfers heat from refrigerant gas to pool water. FIG. 3b shows Table 1 which compares this method with the current inventions heat exchange method called the PCS1 which stands for pool convection system one.

Figure 4:
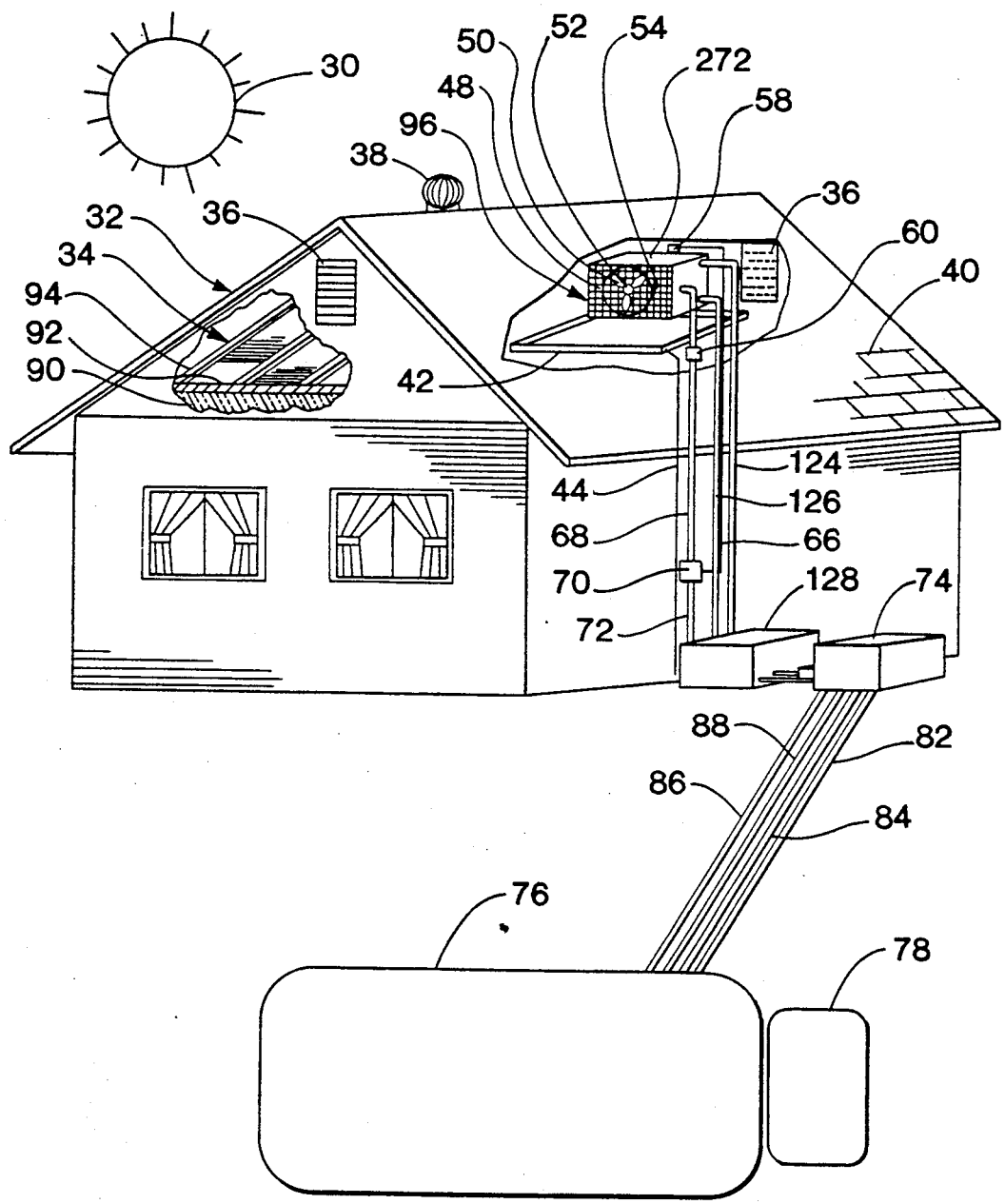

FIG. 4 is a perspective drawing that shows an alternate configuration of the basic invention utilizing a heat pump pool heater that is split into two assemblies with one assembly comprising the attic based air to refrigerant heat exchanger.

Figure 5:
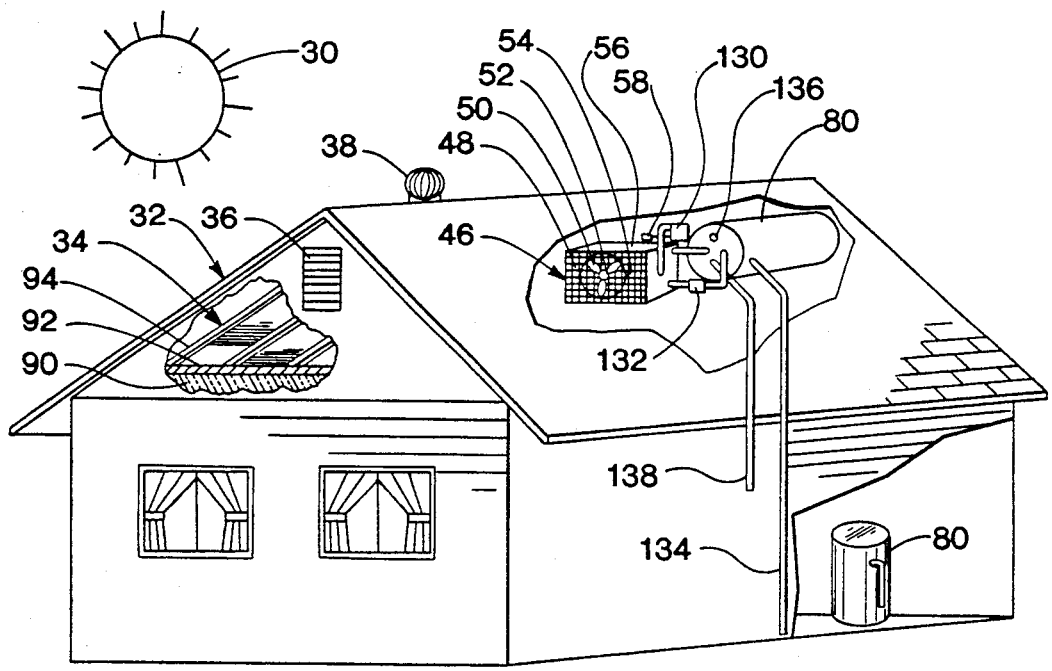

FIG. 5 is a perspective drawing that shows an alternate configuration of the basic invention for domestic or other hot water heating.

Figure 6:
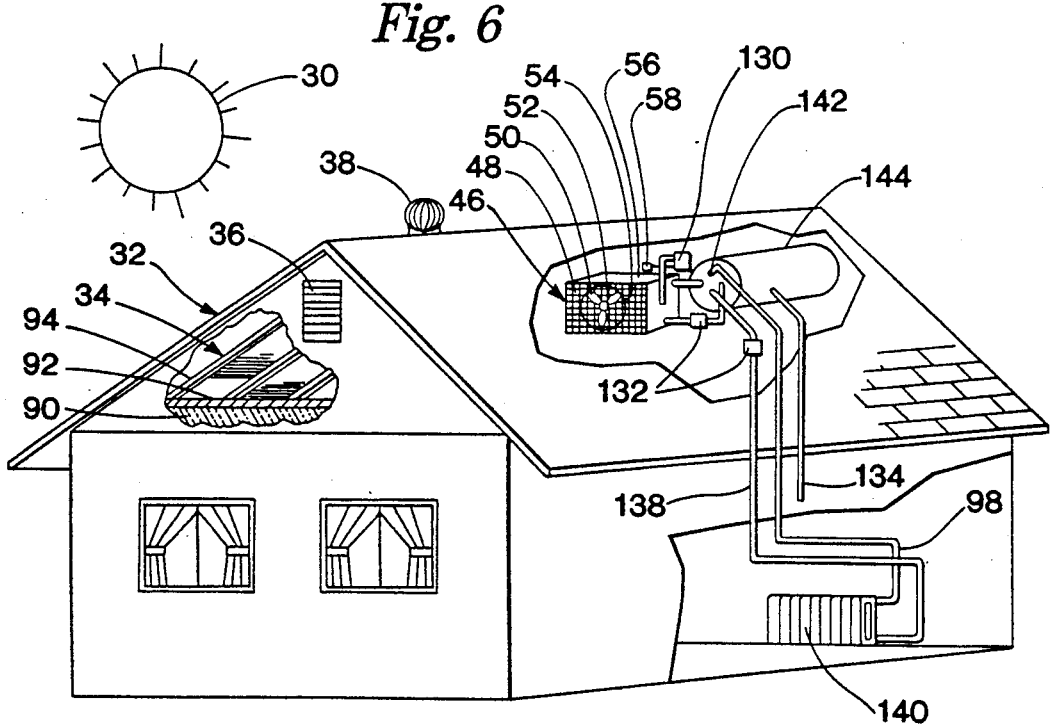

FIG. 6 is a perspective drawing that shows an alternate configuration of the basic invention for space heating with hydronic heaters. Also can be interpreted to indicate the combination of hot water domestic heating and hydronic space heating at the same time.

Figure 7:
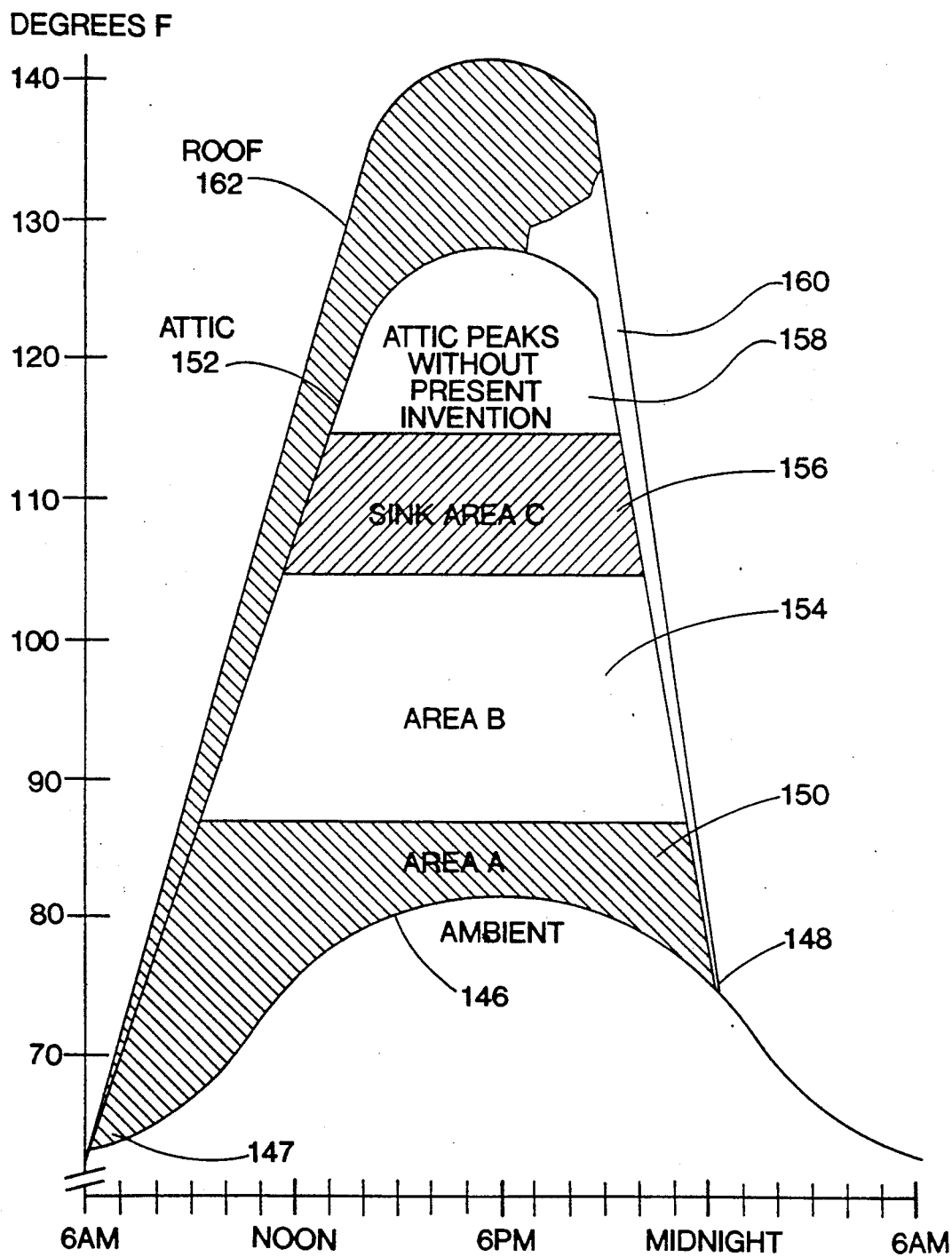

FIG. 7 is a temperature profile graph showing ambient, attic and roof temperature profiles along with useful temperature operating areas therein defined.

Figure 8:
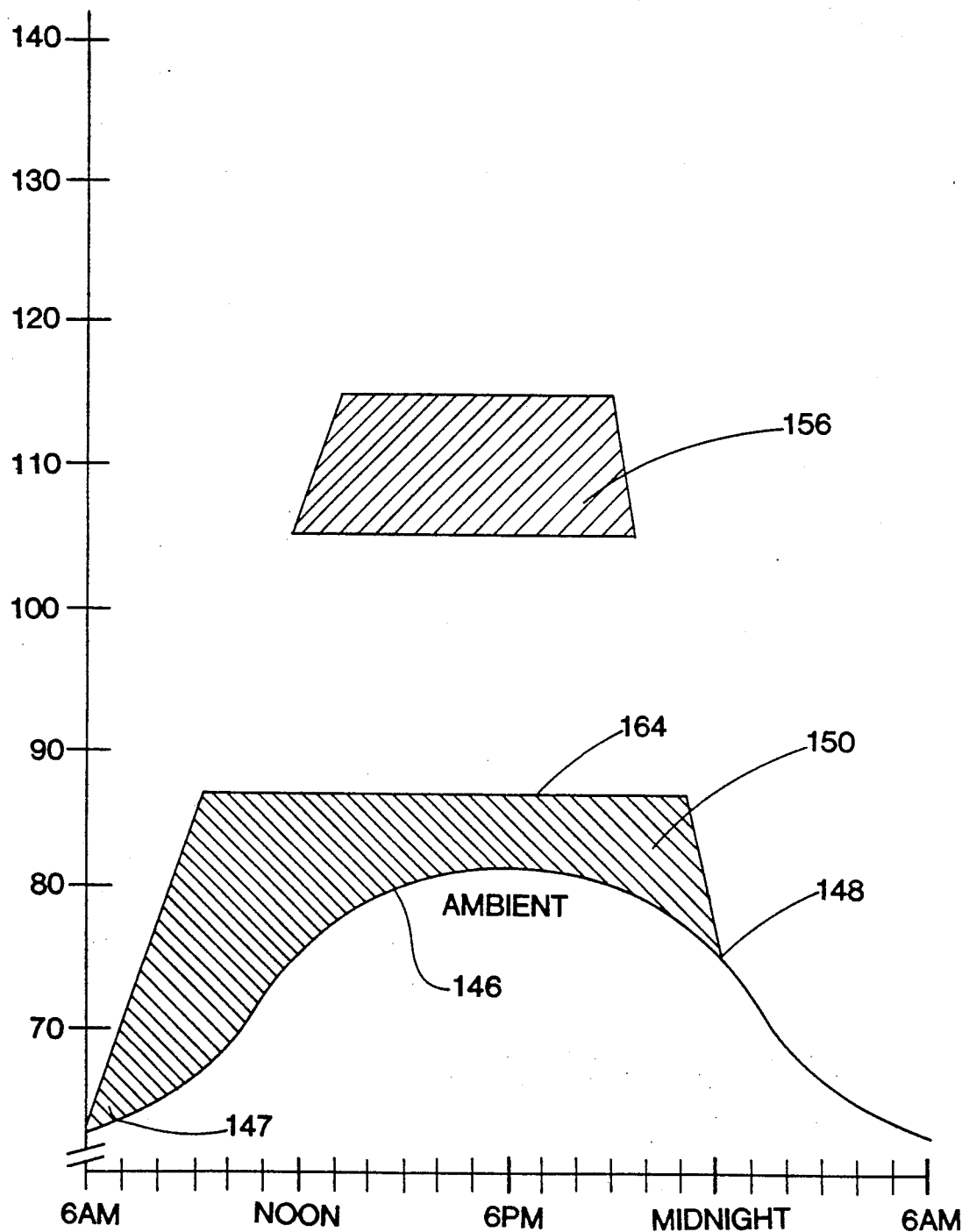

FIG. 8 is a temperature profile graph showing the potential lower operating ceiling level within the attic structure and the typical sink area that the present invention operates at. The sink area being the typical internal "operating" attic temperature at its peak.

Figure 9A:
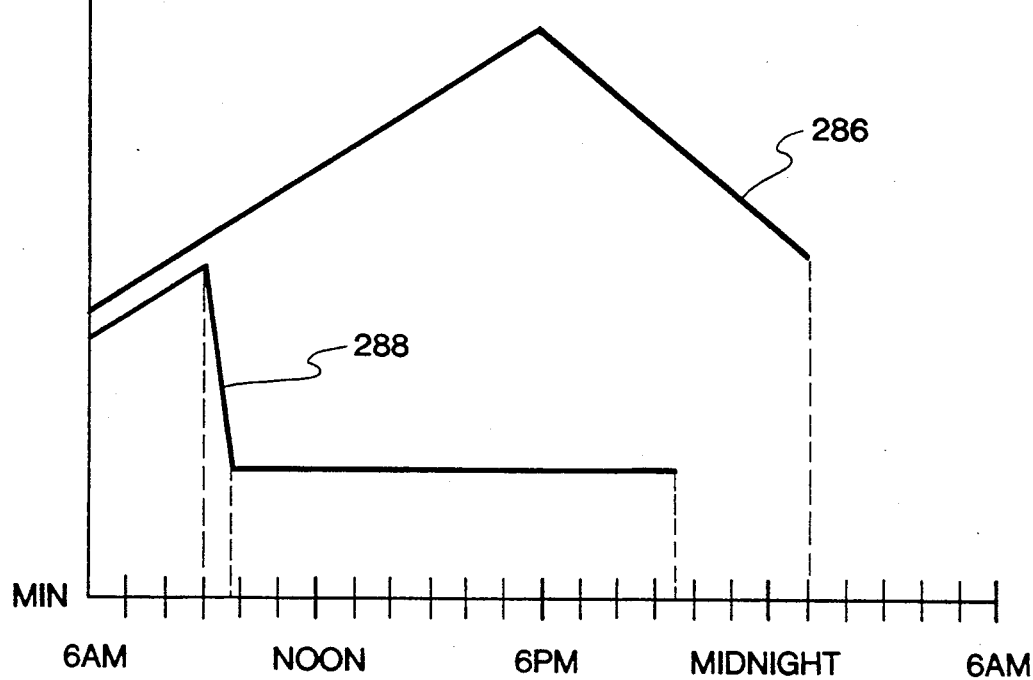
Figure 9B:
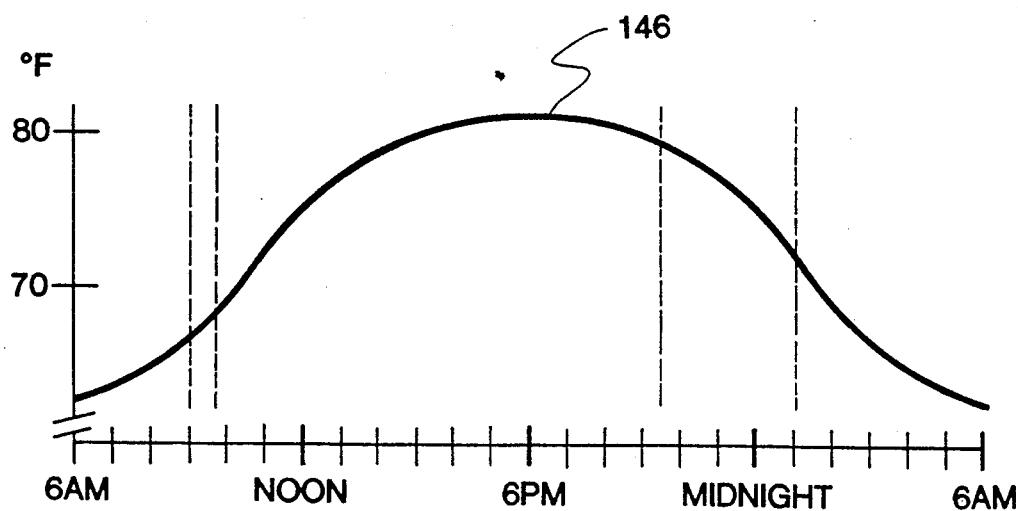

FIG. 9a is a SOLAR RESISTANCE profile showing the relationship of solar resistance with and without the present invention—that an attic will exhibit—in perspective with the ambient temperature profile FIG. 9b.

Figure 10A:
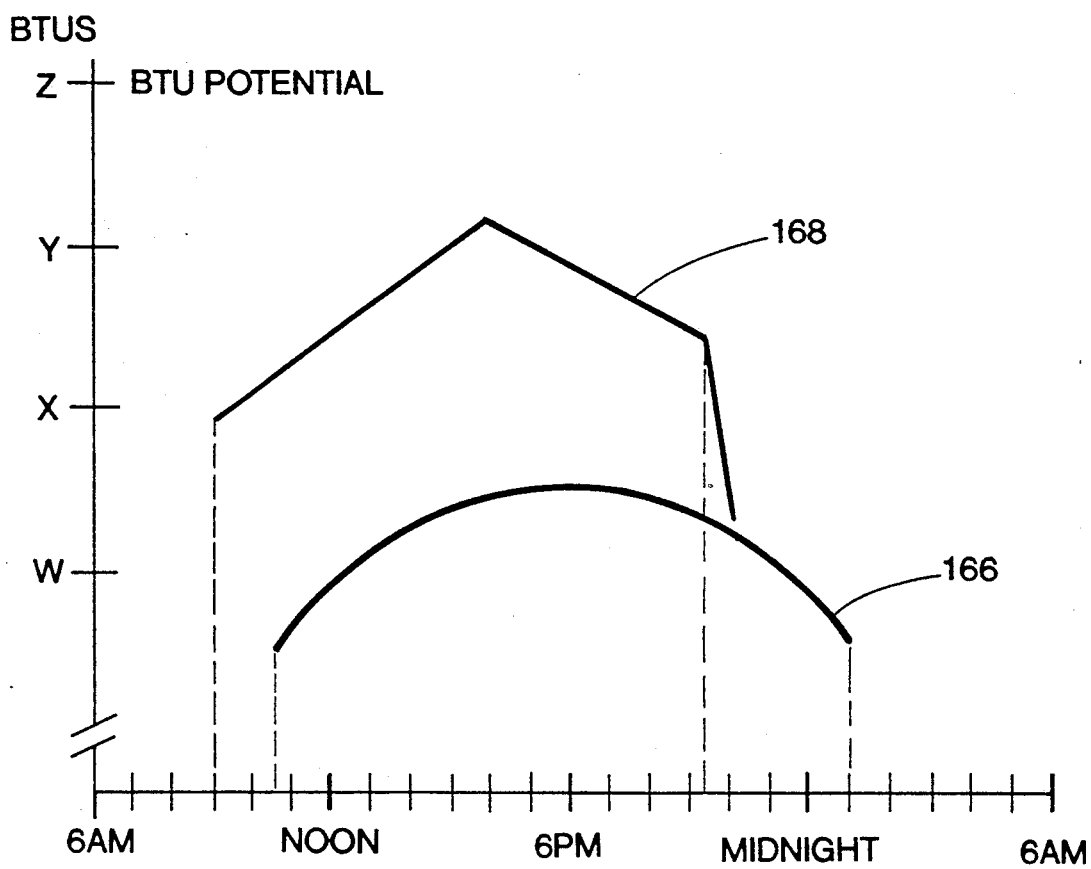
Figure 10B:
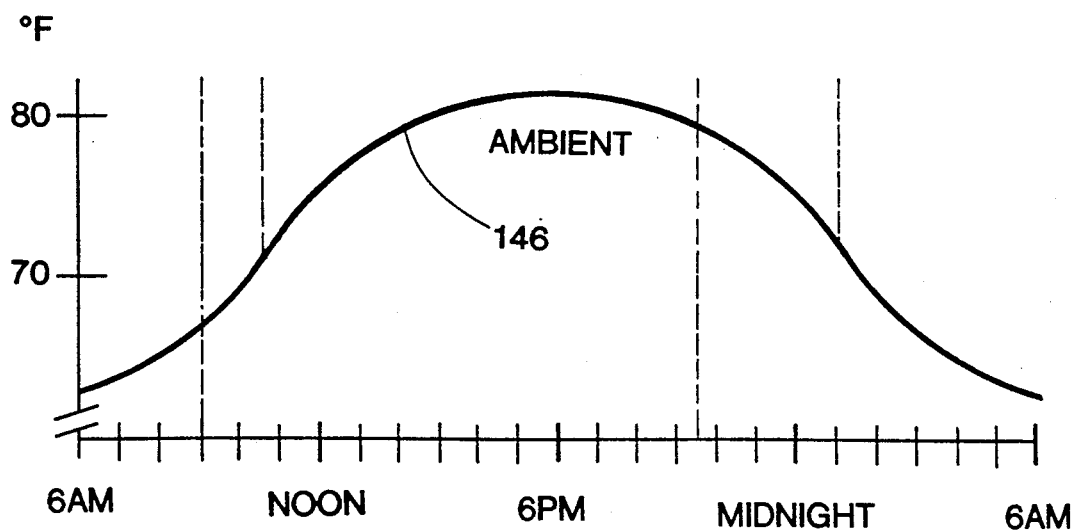

FIG. 10a is a BTU profile graph showing the relationship of BTU potential with and without the present invention and in perspective to the ambient temperature profile FIG. 10b.

Figure 11:
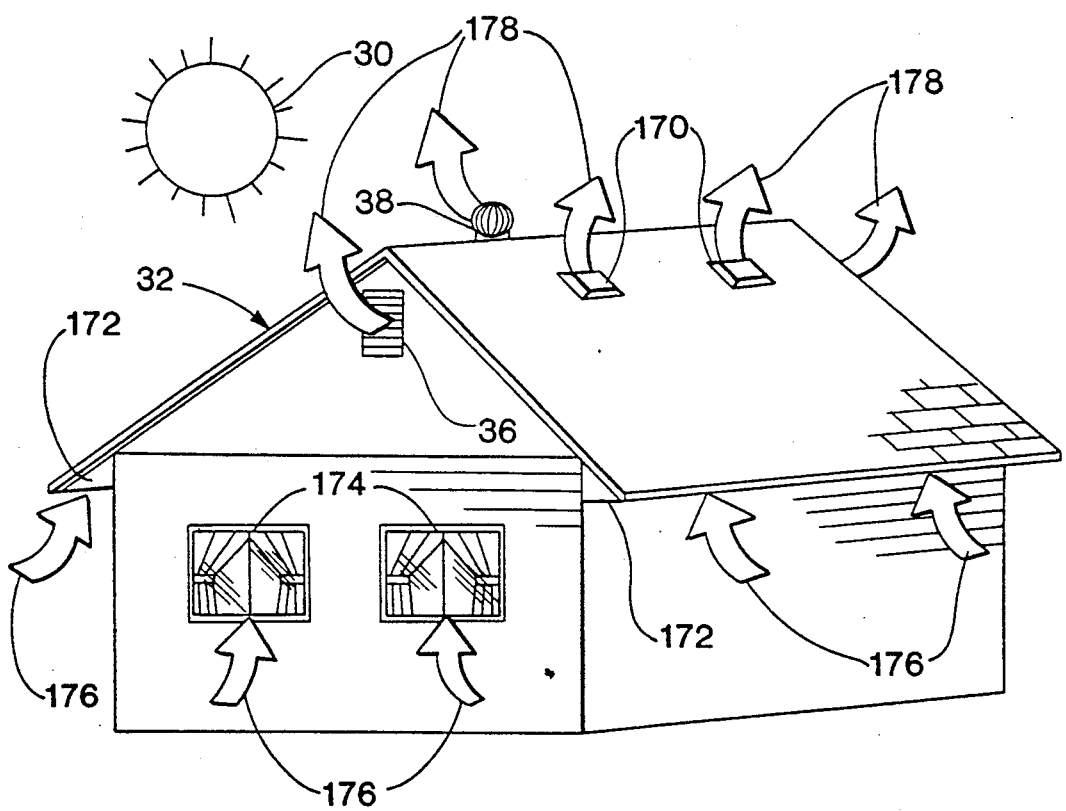

FIG. 11 is a perspective drawing that shows the typical ventilation patterns that occur in a residential dwelling or similar structure.

Figure 12A:
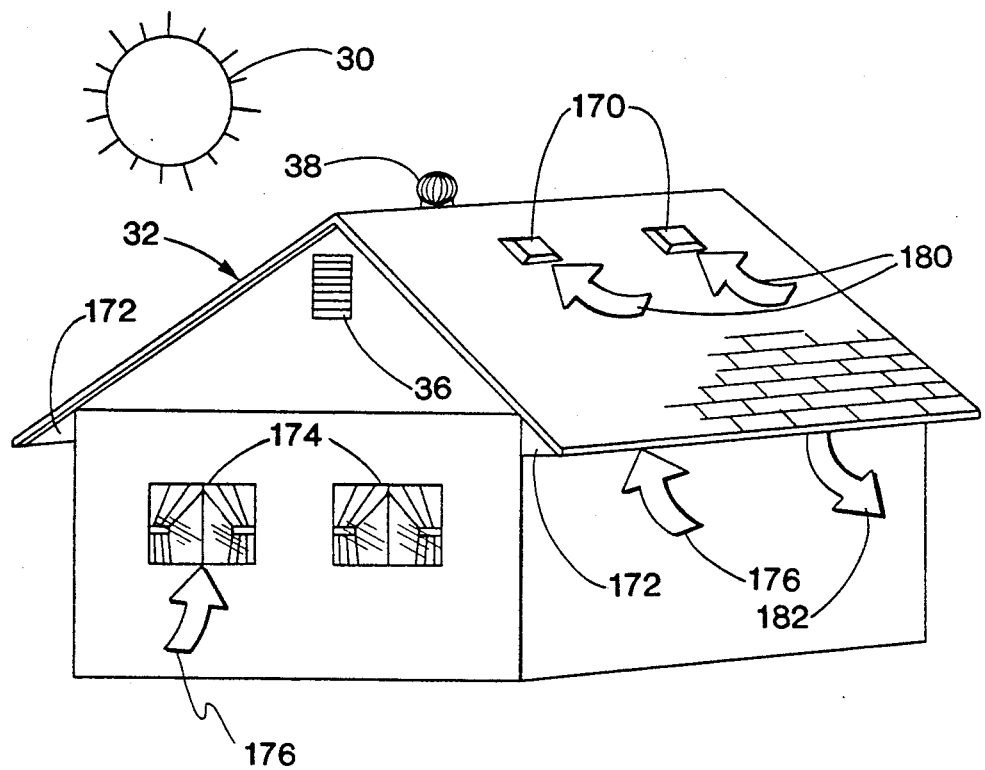
Figure 12B:
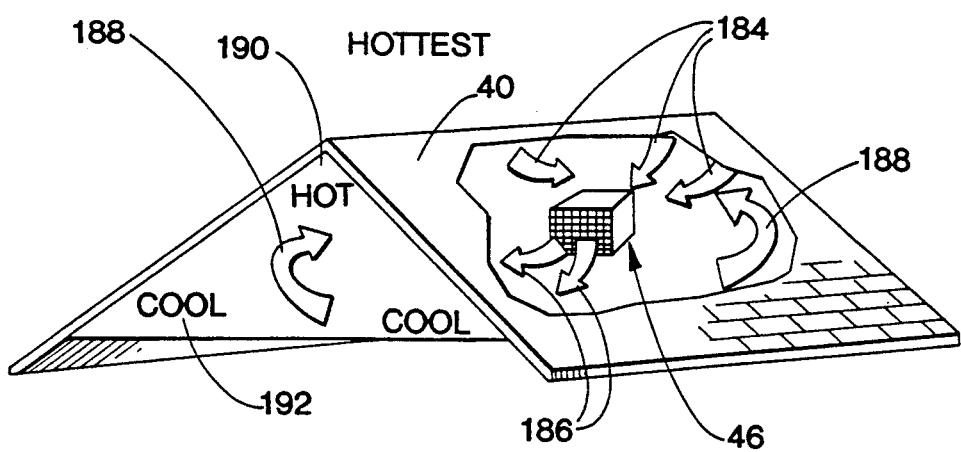

FIG. 12a and 12b show perspective drawings of the altered ventilation patterns that occur when the present invention is operating.

Figure 13:
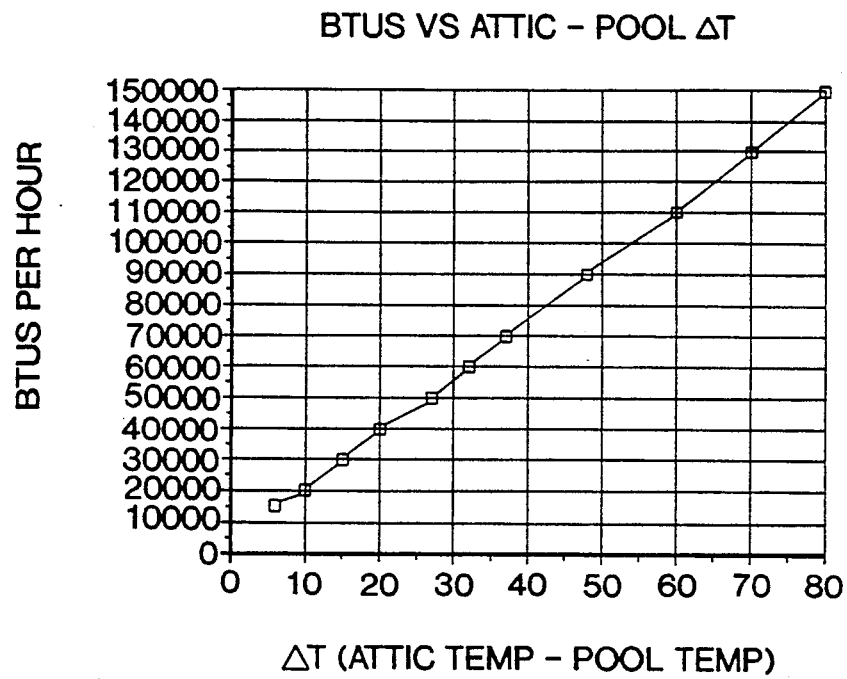

FIG. 13 is a temperature transfer characteristic graph, of the present invention, which shows how btus relate to the temperature differential between the attic and the swimming pool.

Figure 14:
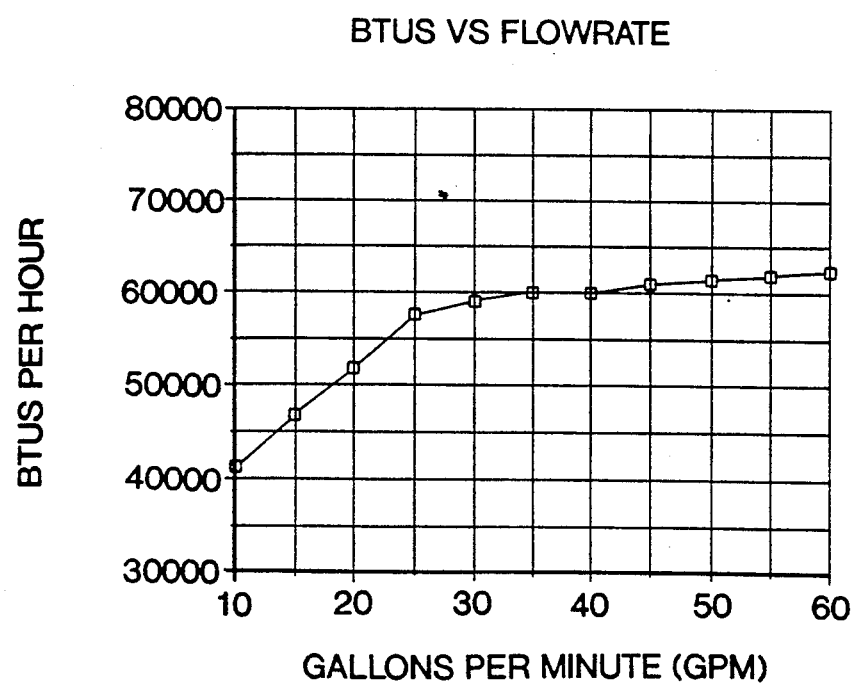

FIG. 14 is a temperature transfer characteristic graph, of the present invention, which shows how btus relate to the flow rate of water in gallons per minute.

Figure 15:
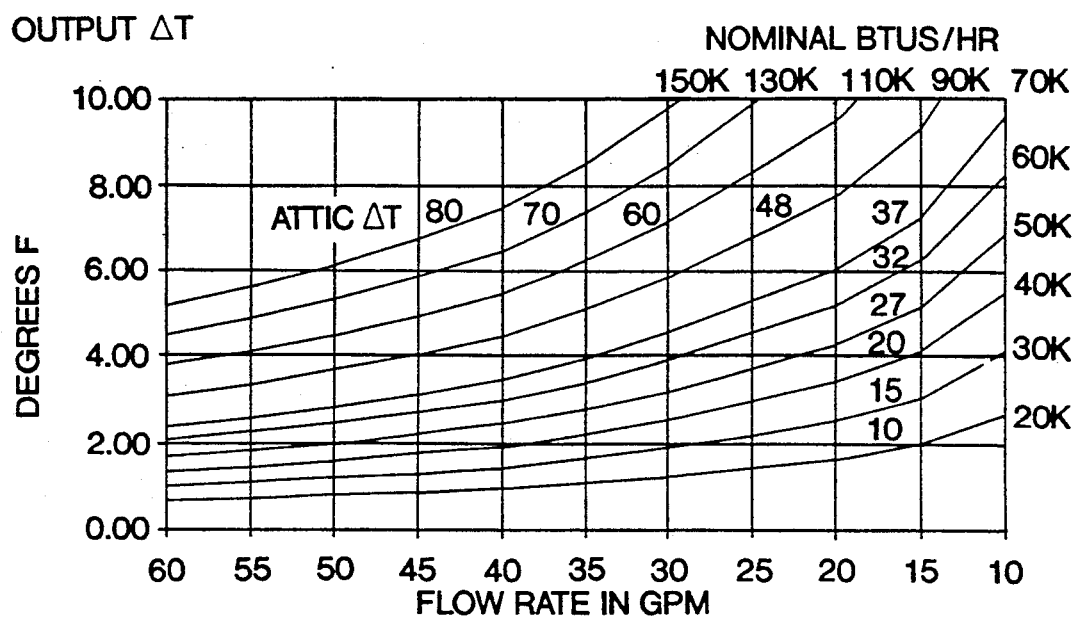

FIG. 15 is a family of OPERATING CURVES for the present invention showing the relationship of the output temperature increase ($\Delta T$), in degrees fahrenheit, of the water flowing through the PCS1 vs the flow rate in gallons per minute vs the temperature differential between the swimming pool and attic. As flow rate in GPM decreases, output water temperature differential increases for a given constant attic and pool temperature differential.

Figure 16:
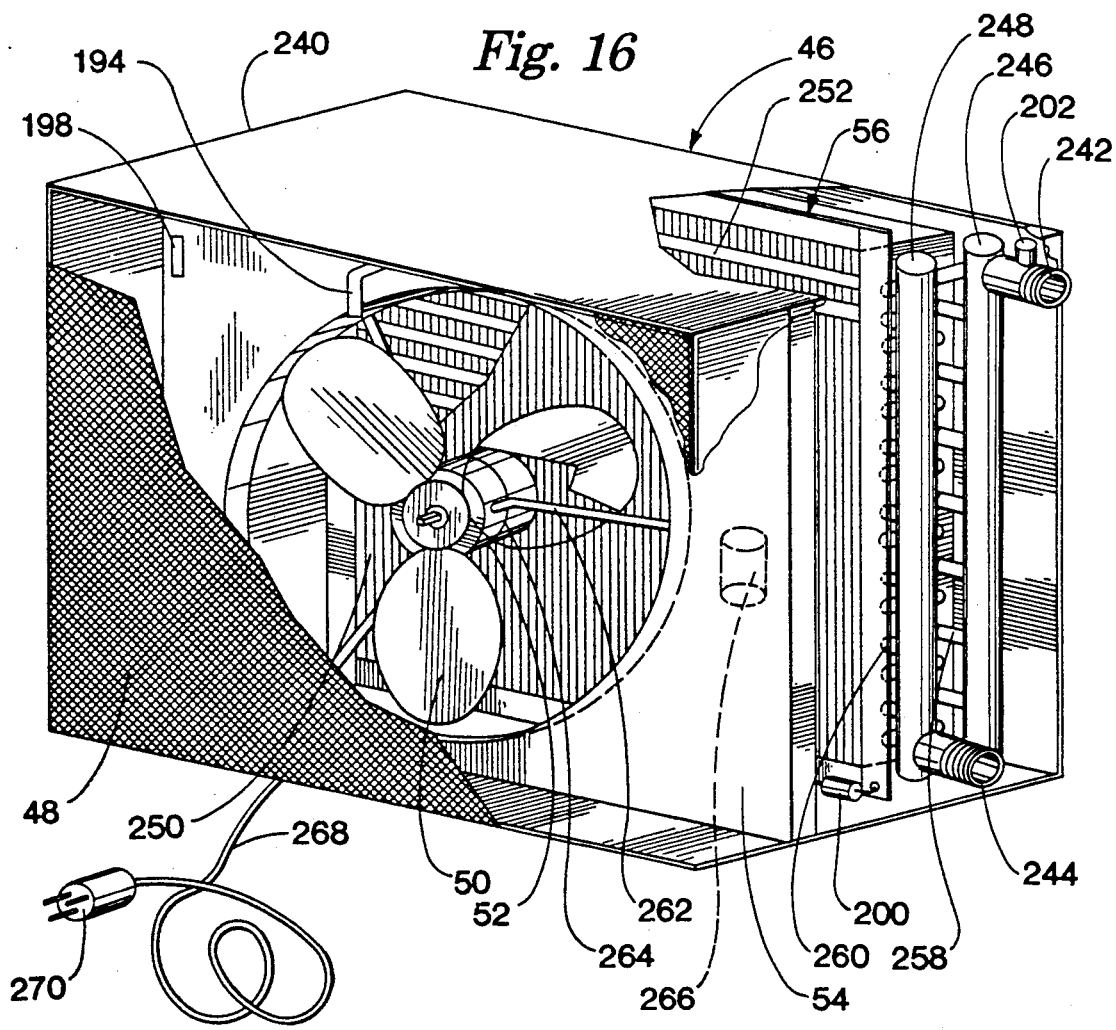

FIG. 16 is a perspective drawing of the PCS1 [Pool Convection System One] heat exchanger 46.

Figure 17:
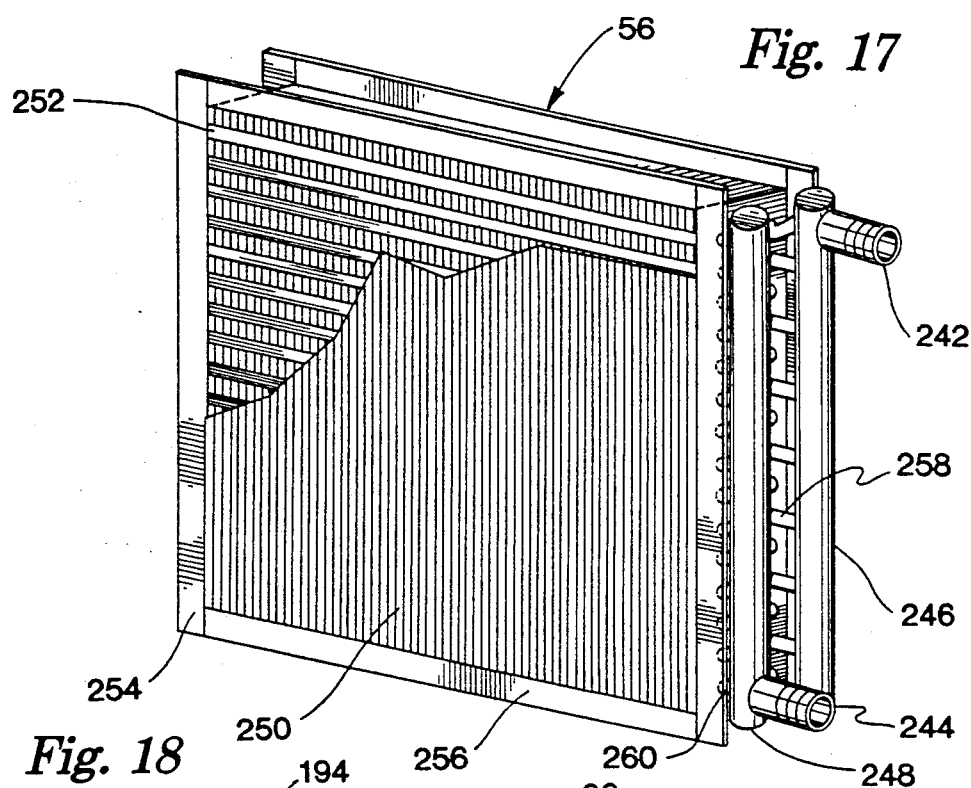

FIG. 17 is a perspective drawing of the Air-Water heat transfer coil 56 within the PCS1 heat exchanger 46.

Figure 18:
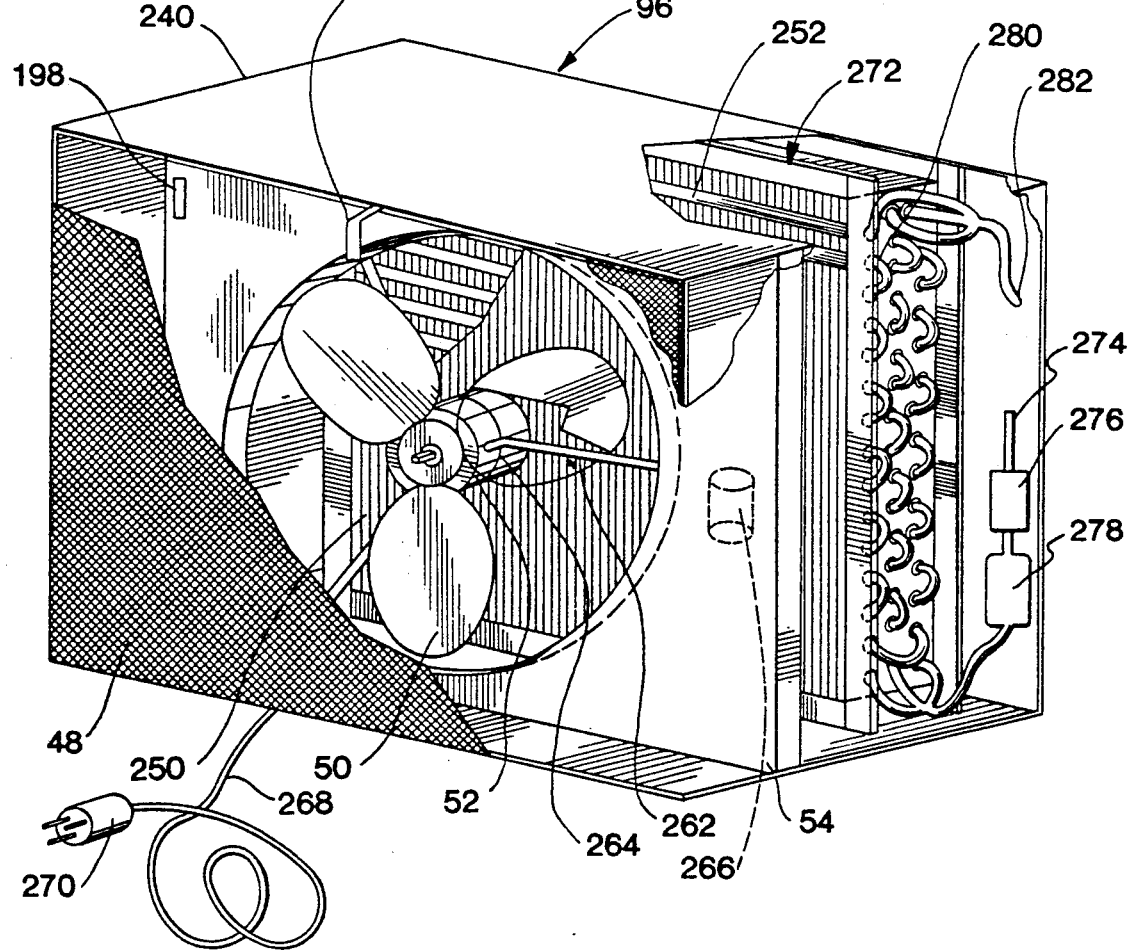

FIG. 18 is a perspective drawing of a heat pump heat exchange subassembly designed to be placed within an attic and to work in conjunction with an externally located compressor system, pool water heat exchanger and other heat pump parts.

Figure 19:
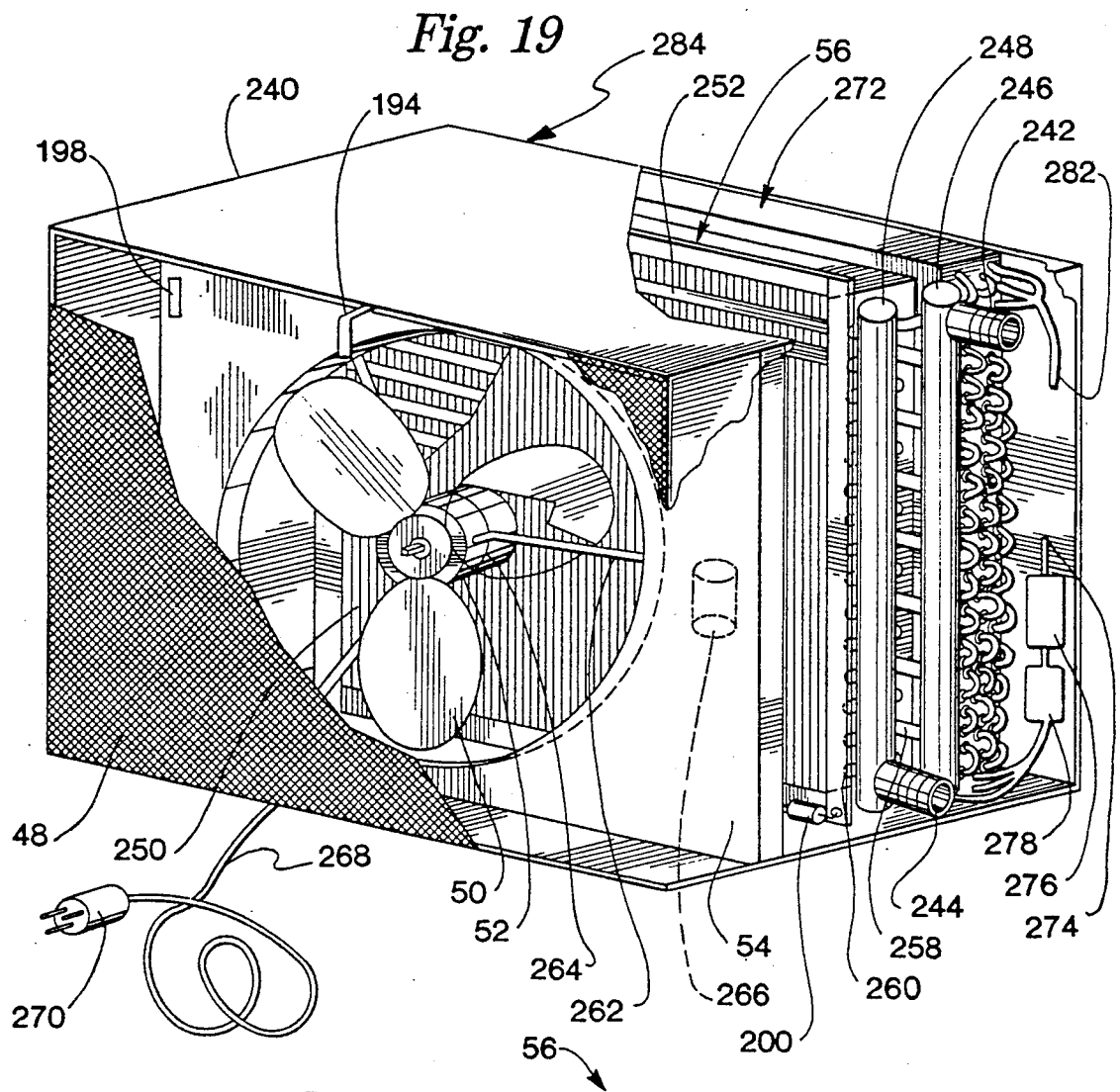

FIG. 19 is a perspective drawing of a dual mode attic based heat exchanger in which an evaporator coil for a heat pump is piggybacked onto a straight air-water heat transfer coil. Primary mode of heating is straight forced air convection and secondary or backup heating is accomplished by heat pump method.

Figure 20A:
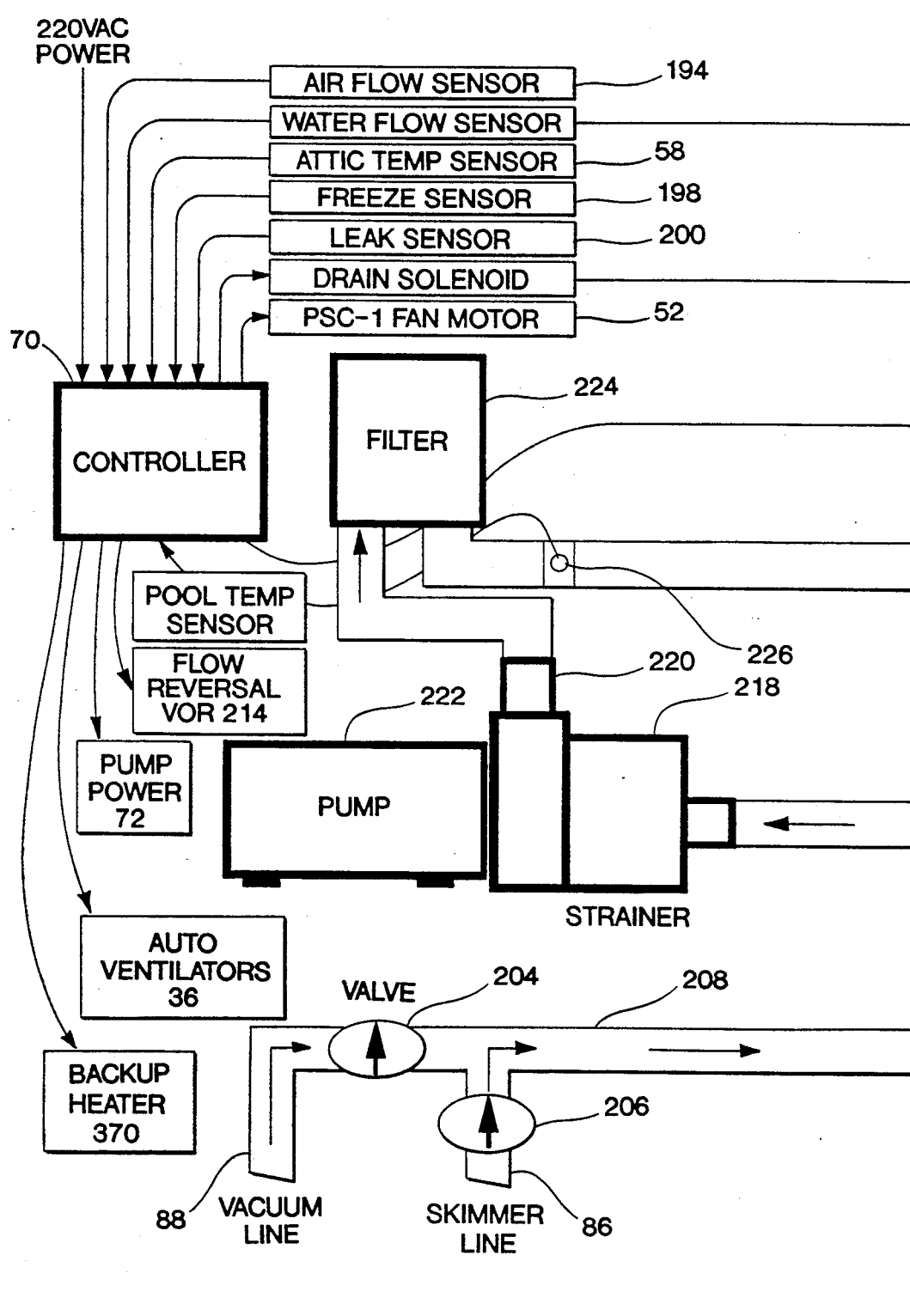

FIG. 20 shows an arrangement of sections shown in FIGS. 20a and 20b.

FIGS. 20a and 20b perspective drawing sections of the present invention when plumbed for heating a swimming pool.

Figure 21:
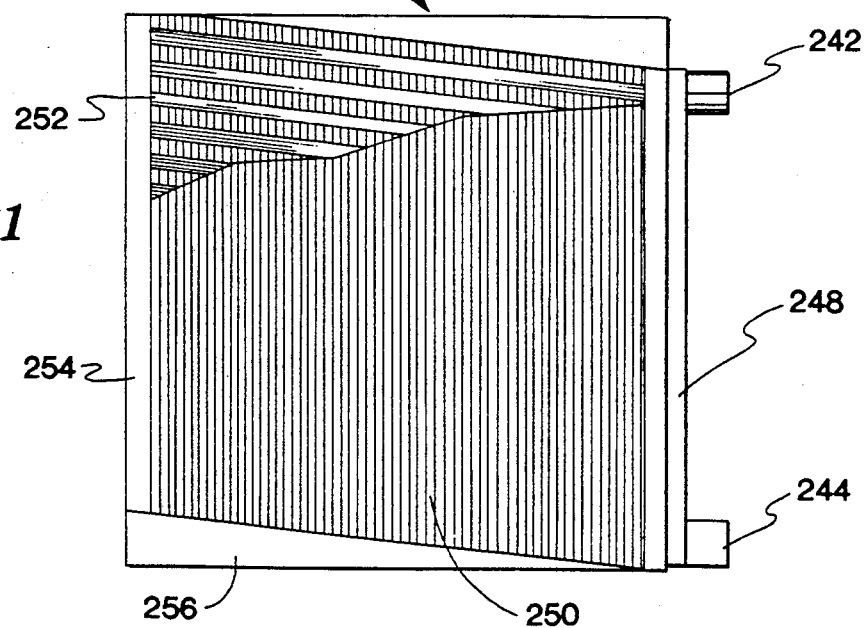

FIG. 21 is a perspective drawing showing the air to liquid coil 56 modified to facilitate automatic and complete drain down of the coil without having to access the attic during the winterization process of the swimming pool.

Figure 22:
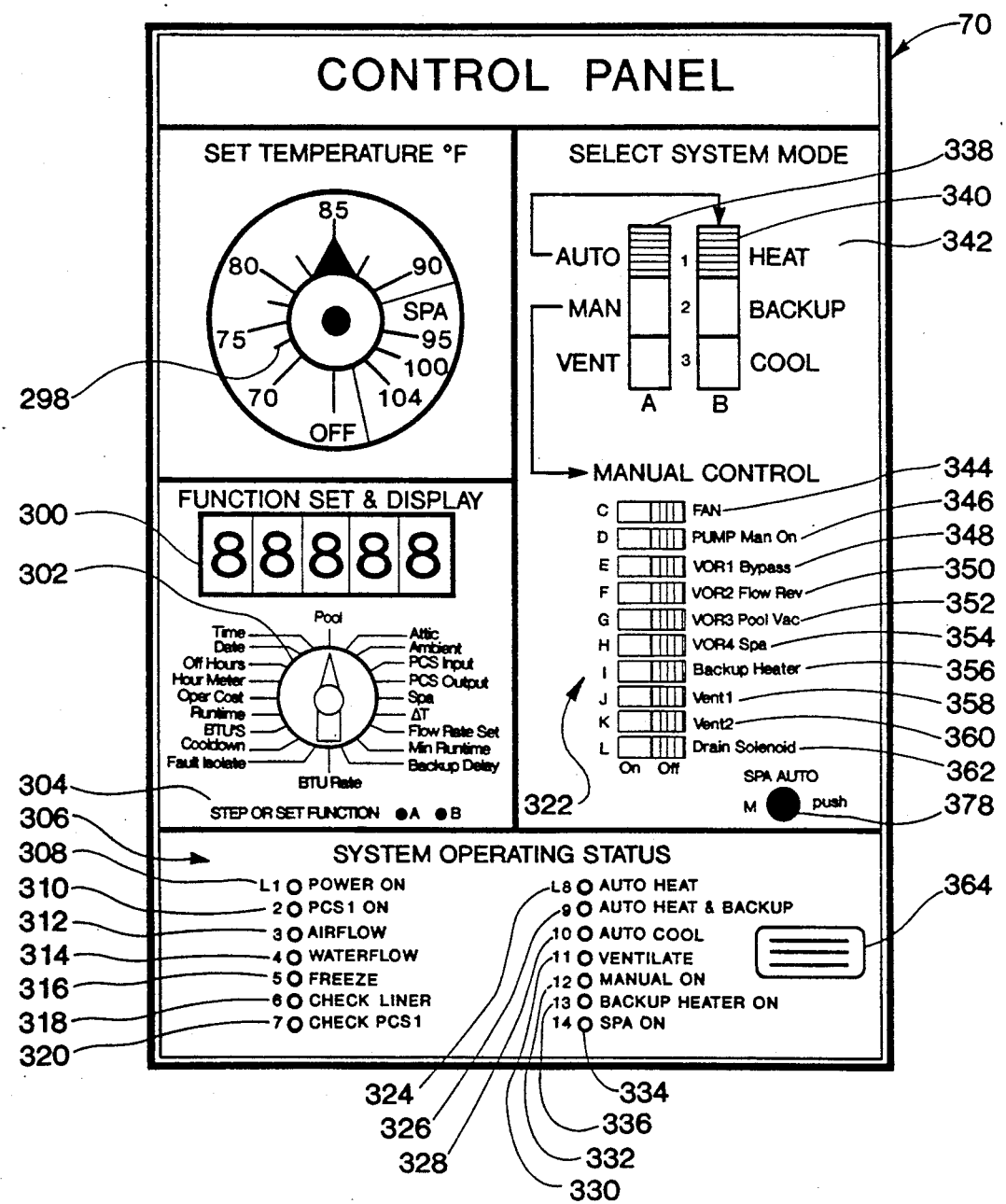

FIG. 22 is a perspective drawing of the control panel 70 used to automatically control attic 34 based heat exchanger 46 and any accompanying backup heater including operation of dual mode exchanger 284.

Figure 23:
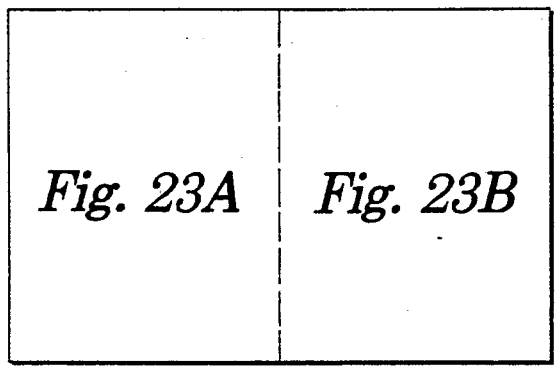
Figure 23A:
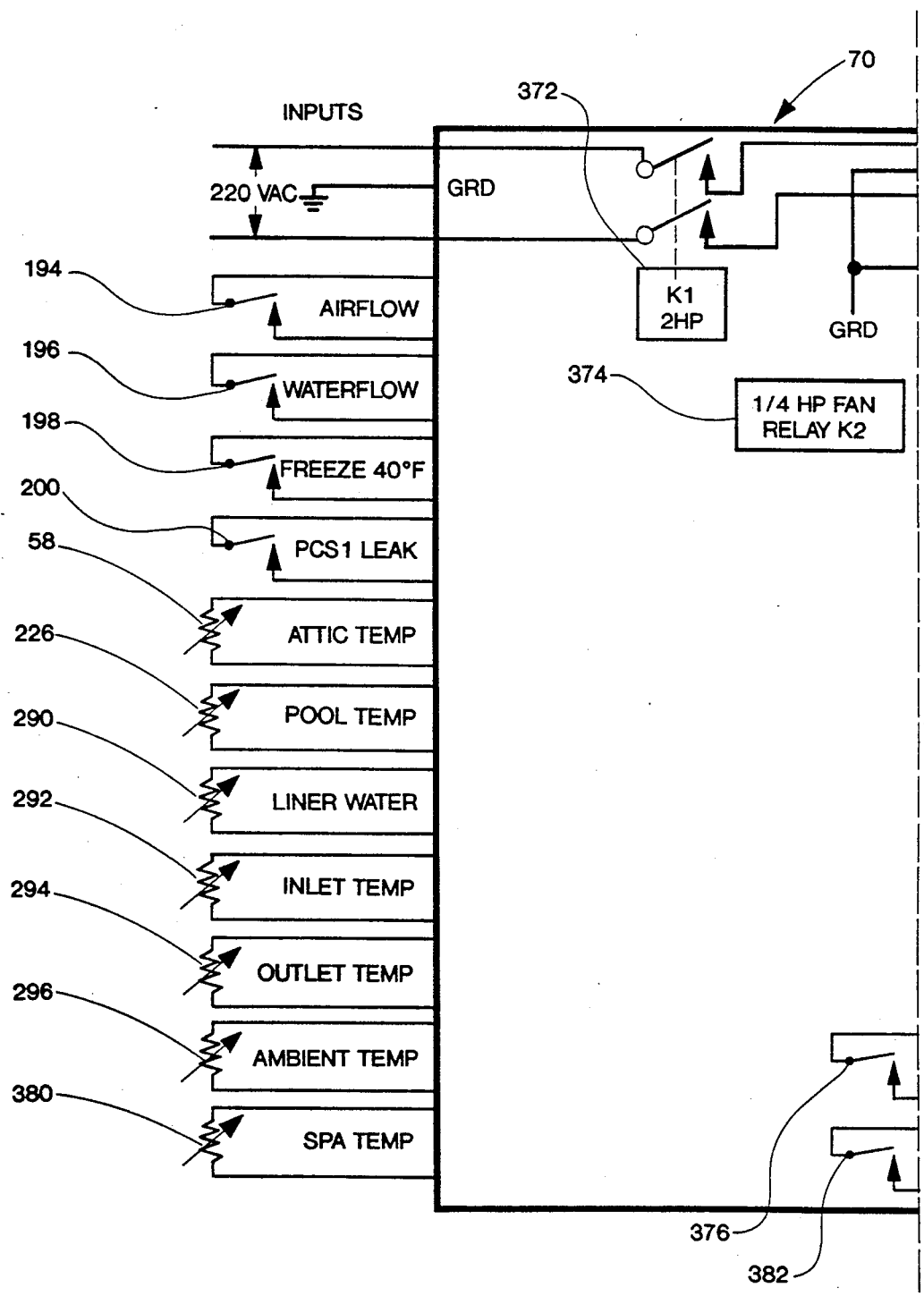
Figure 23B:
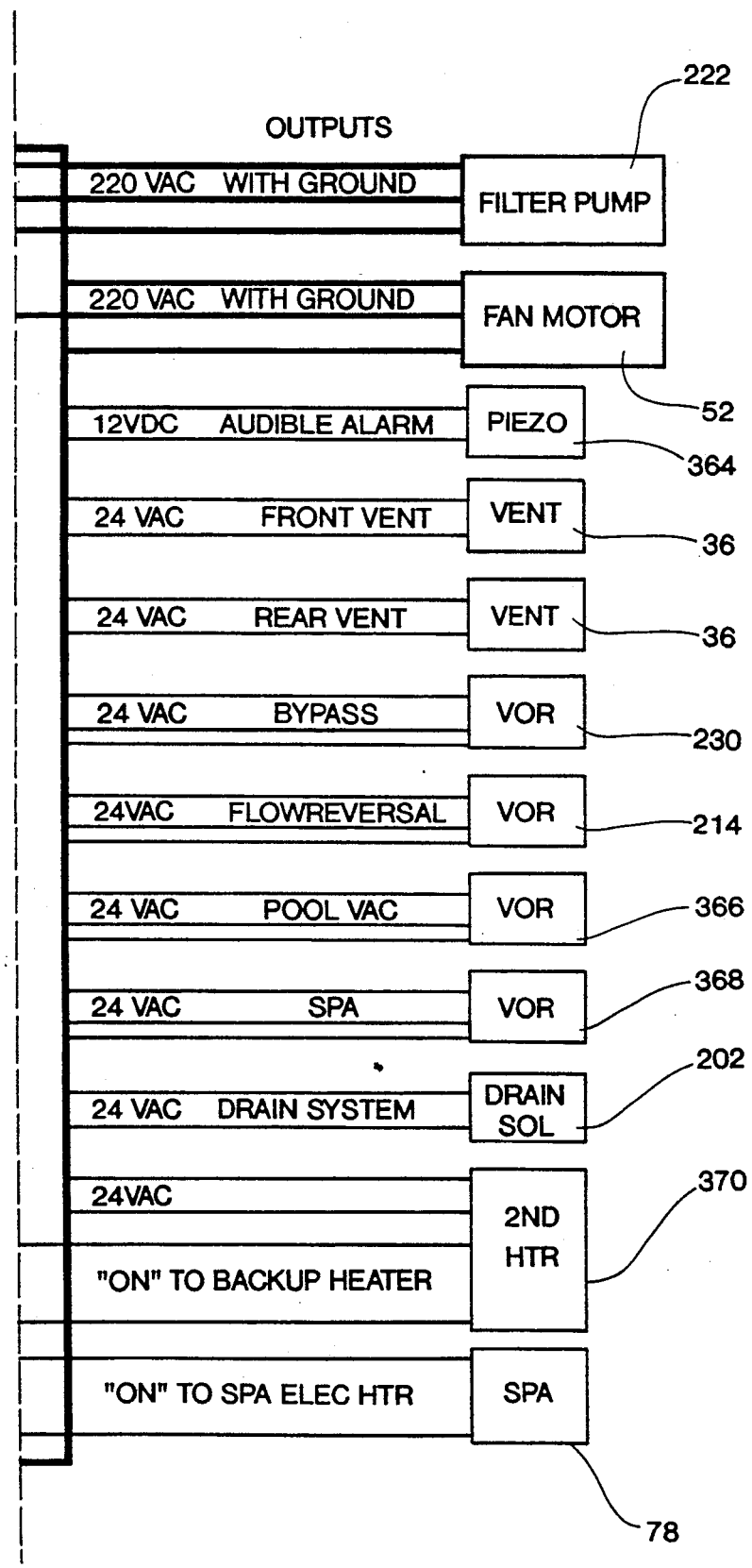
Figure 24A:
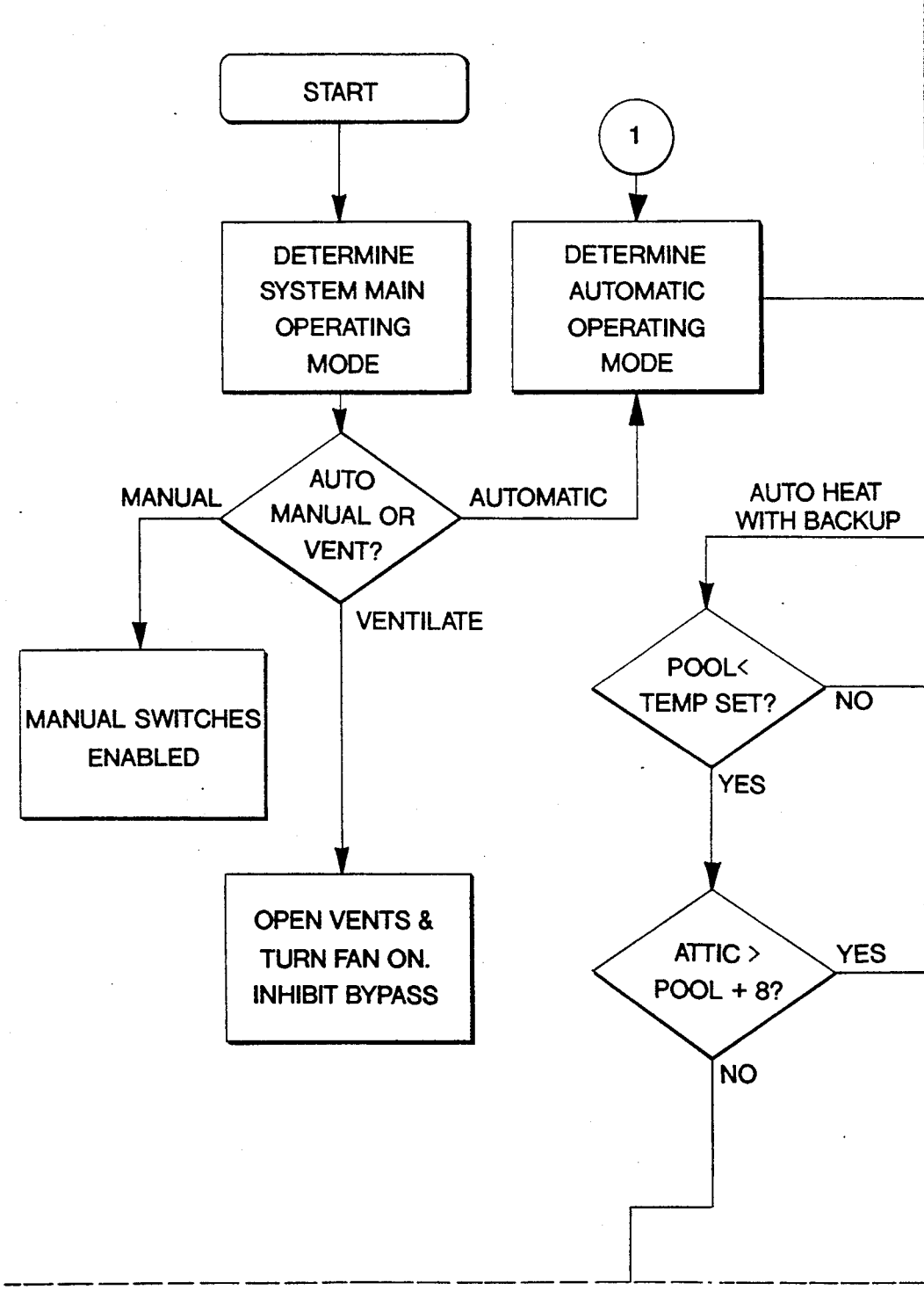
Figure 24B:
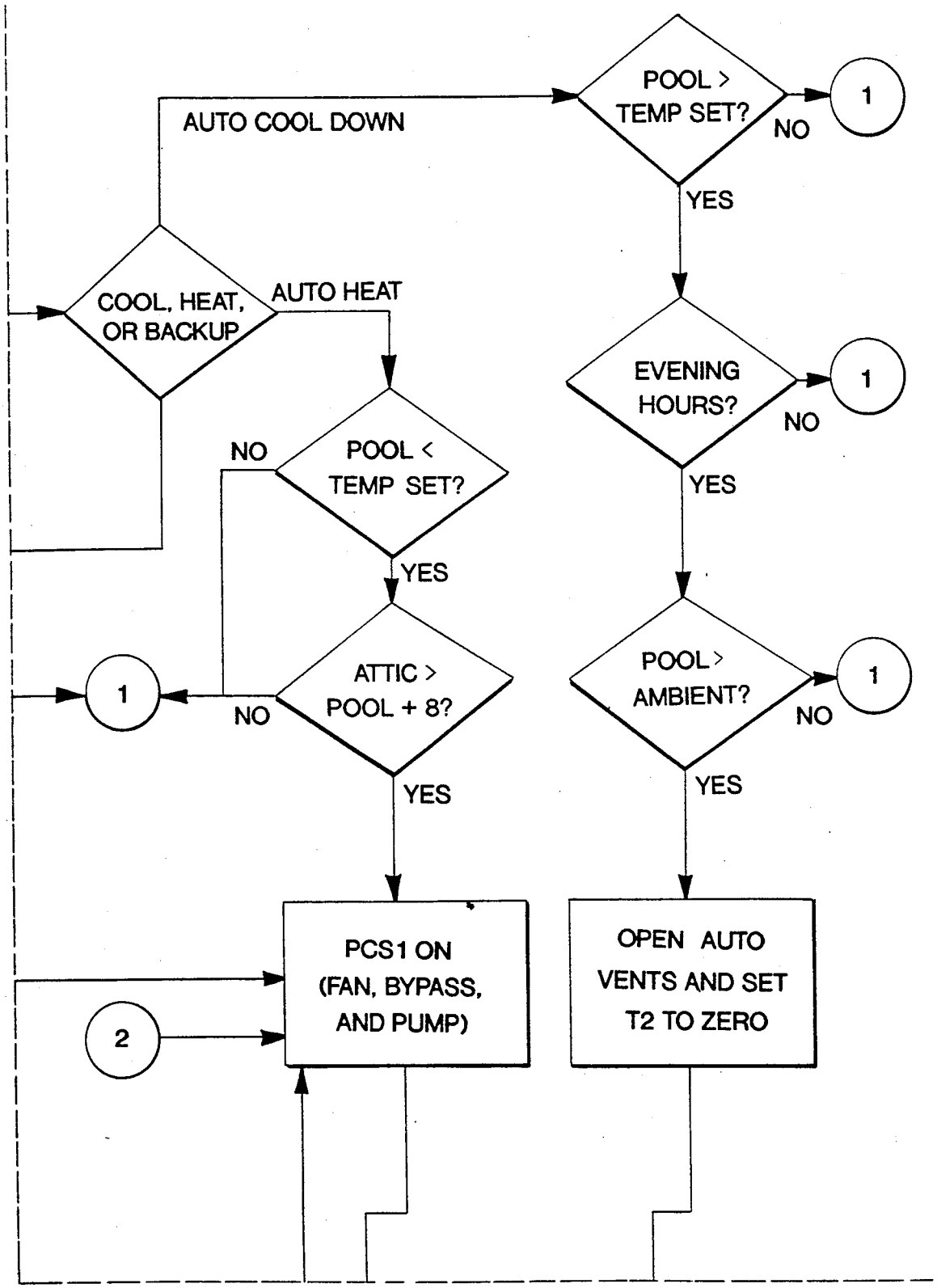
Figure 24C:
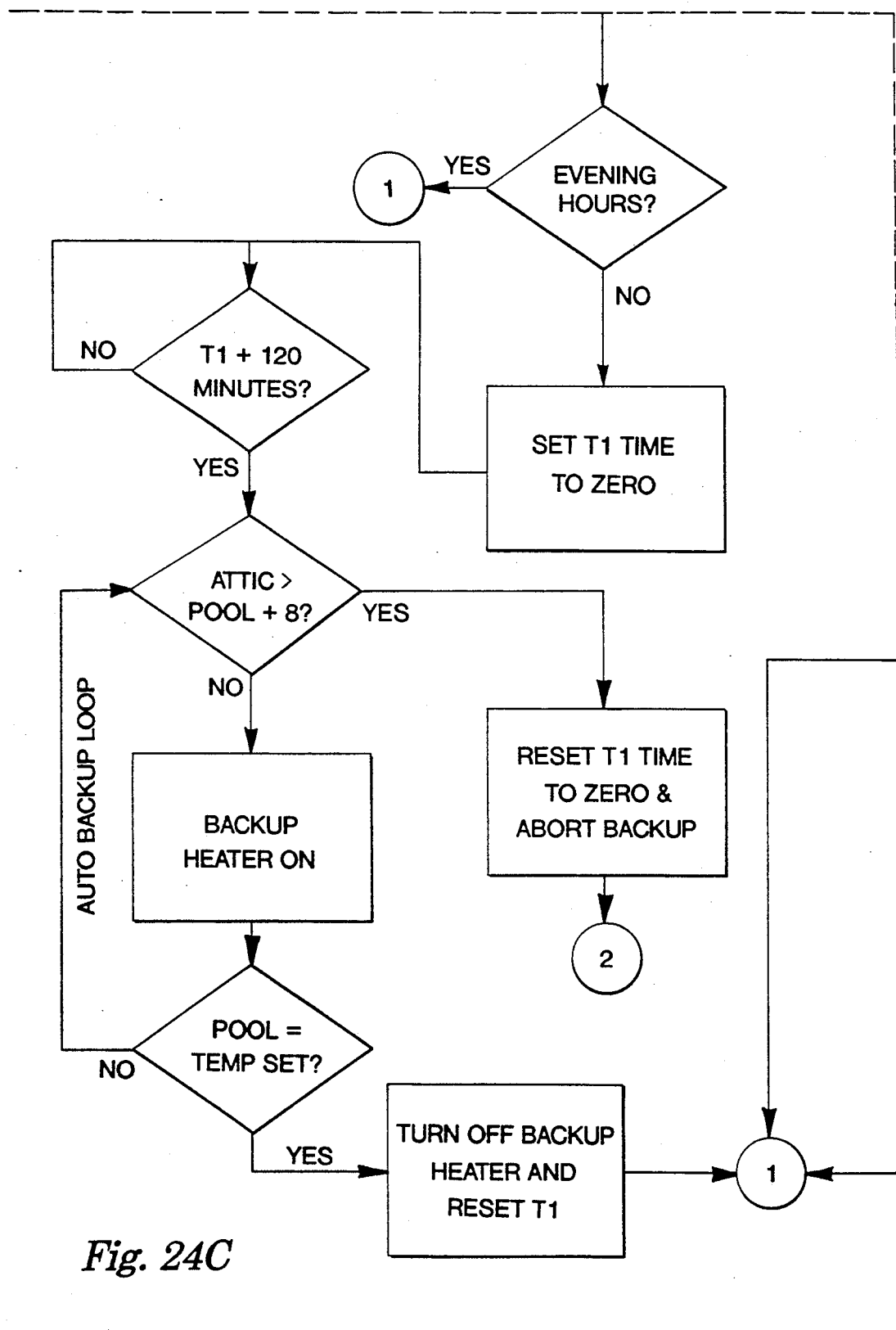
Figure 24D:
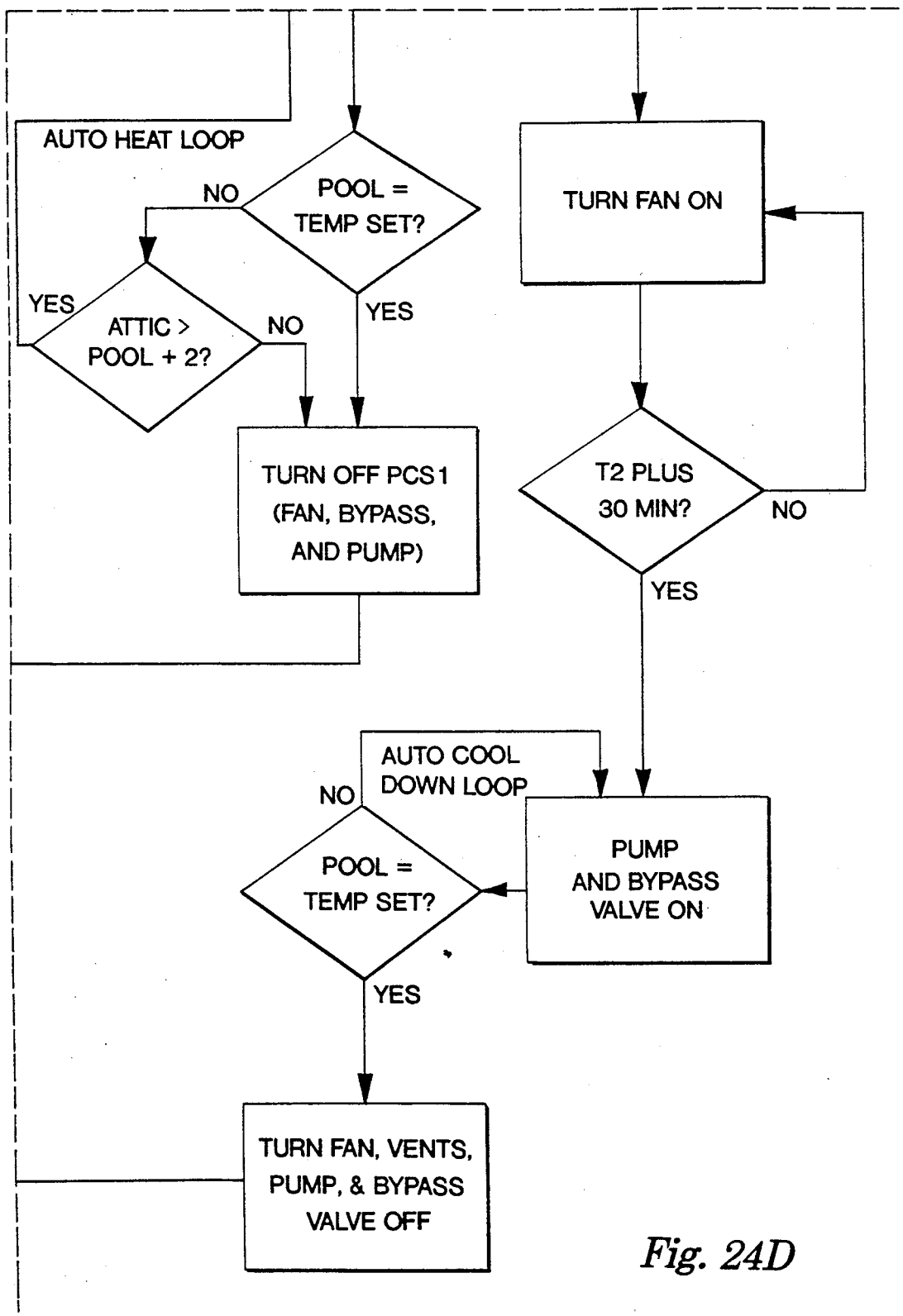

FIG. 23 shows the arrangement of sections shown in FIGS. 23a and 23b.

FIGS. 23a and 23b are perspective drawings of the input and output signals of the present invention.

Figure 24:
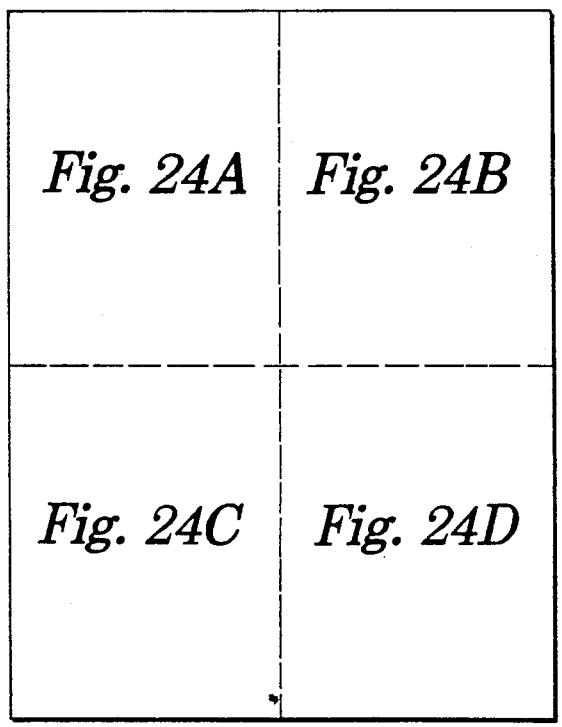

FIG. 24 is a basic flow chart diagram showing the primary operating modes of the present invention.

Figure 25:
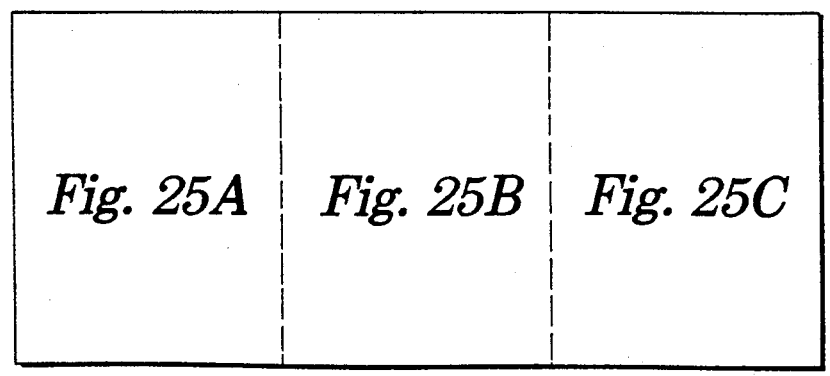

FIG. 25 shows the arrangment of sections shown in FIGS. 25a, 25b and 25c.

FIGS. 25a, 25b and 25c comprise the sections of a table of the basic operating modes of the present invention. It includes the control switch positions, input signal conditions, internal logic requirements and the resultant outputs which occur "during" the operation of the basic modes. For example: Heating the pool is described by "Auto Heat"; Operation of the backup heater is described by "Auto Backup"; Cooling the pool is described by "Auto Cool".

| Reference Numerals In Drawings |
| --- |
| 30 Sun |
| 32 Roof Structure |
| 34 Attic Structure |
| 36 Automatic Vent |
| 38 Roof Ventilator |
| 40 Roofing Material |

| -continued |
| --- |
| Reference Numerals In Drawings |
| 42 Leak Protection Liner |
| 44 Liner Drain Hose |
| 46 Forced Air-Liquid Heat Exchanger |
| 48 Protective Grille |
| 50 Fan Blade |
| 52 Fan Motor |
| 54 Venturi Insert |
| 56 Air-Water Heat Transfer Coil |
| 58 Attic Temperature Sensor |
| 60 Electrical Outlet |
| 62 Inlet Pipe from Support System |
| 64 Outlet Pipe to Support System |
| 66 Low Voltage Wiring |
| 68 High Voltage Wiring (220 VAC) |
| 70 Control Panel |
| 72 Pump Power |
| 74 Support System |
| 76 Swimming Pool |
| 78 Spa or Hot Tub |
| 80 Electric Hot Water Tank |
| 82 Pools Main Drain |
| 84 Pools Return Line |
| 86 Pools Skimmer Line |
| 88 Pools Vacuum Line |
| 90 Attic Insulation |
| 92 Radiant Barrier |
| 94 Attic Roof Rafters |
| 96 Evaporator Coil & Fan Assembly |
| 98 Hydronic heater return line [pipe] |
| 100 Heatrim Series "Heat Exchanger" |
| 102 Inlet Pipe from Recirc Pump |
| 104 Outlet Pipe & Pool Return Line |
| 106 Pool Recirculating Pump [14 GPM] |
| 108 Pump Suction Inlet from Pool |
| 110 Heat Pump Heat Exchanger |
| 112 Flexible Rubber [Pool Water] Coil |
| 114 Heat Pump Heat Exchange Coil |
| 116 Exchanger Hot Gas Input |
| 118 Exchanger Pool Water Inlet |
| 120 Exchanger Cooled Gas Output |
| 122 Exchanger Pool Water Outlet |
| 124 Refrigerant Supply Line |
| 126 Refrigerant Return Line |
| 128 Balance of Heat Pump Device |
| 130 Hot Water Controller |
| 132 Hot Water Recirculating pump |
| 134 T & P Valve and Drain Line |
| 136 Cold Water Input |
| 138 Hot Water Output |
| 140 Hydronic Space Heater |
| 142 Storage Tank Input (Return) |
| 144 Water Storage Tank |
| 146 Ambient Temperature Profile |
| 147 Attic Temp Departs from Ambient |
| 148 Attic Temp Remerges to Ambient |
| 150 Area A of FIGS. 7 and 8 |
| 152 Attic Temperature Profile |
| 154 Area B of FIG. 7 |
| 156 Sink Area C of FIGS. 7 and 8 |
| 158 Attic Peak Area of FIG. 7 |
| 160 Roof Attic Temp Decay Area |
| 162 Roof Temperature Profile |
| 164 Ceiling Profile Potential |
| 166 BTU Profile Without present invention |
| 168 BTU Profile With present invention |
| 170 Passive Roof Air Vent(s) |
| 172 Eave(s) |
| 174 Window(s) |
| 176 Normal Air Intake Area(s) |
| 178 Normal Air Exhaust Area(s) |
| 180 Altered Air Vent Air Flow |
| 182 Counter Air Flow Force(s) |
| 184 Hot Air From Roof's Interior |
| 186 Cool Air Output From PCS1 |
| 188 Recirculating Air (Streams) |
| 190 Hot Attic Peak Area |
| 192 Cooler Attic Floor Area |
| 194 Air Flow Sensor |
| 196 Water Flow Sensor |
| 198 Freeze Protection Sensor |
| 200 Leak Detection Sensor |

Reference Numerals In Drawings (continued)

- 202 Drain Solenoid
- 204 Vacuum Line Flow Control Valve
- 206 Skimmer Line Flow Control Valve
- 208 Skimmer/Vac Suction Intake Line
- 210 Flow Proportioner Valve
- 212 Flow Reversal Valve
- 214 Flow Reversal Valve Operator
- 216 Pump Intake Line
- 218 Strainer
- 220 Pump Discharge Line
- 222 Existing Pool Filtration Pump
- 224 Existing Pool Filter
- 226 Pool Water Temperature Sensor
- 228 PCS1 Bypass Valve
- 230 Bypass Valve Operator [VOR]
- 232 Auto Draindown Kit
- 234 Check Valve
- 236 Return Line to F/R Valve
- 238 Chemical Dispensing Equipment
- 240 Sheet Metal Cabinet [Parts]
- 242 Water Inlet To PCS1
- 244 Water Outlet From PCS1
- 246 Inlet Manifold
- 248 Outlet Manifold
- 250 Aluminum Fins
- 252 Copper or Cupro-Nickel Pipe(s)
- 254 Vertical Flange(s)
- 256 Horizontal Flange(s)
- 258 Input to Coil Circuit(s)
- 260 Output From Coil Circuit(s)
- 262 Motor Mounting Arm(s)
- 264 Motor Mounting Band
- 266 Motor Starting Capacitor
- 268 Electrical Cord
- 270 200 VAC Male Electrical Plug
- 272 Heat Pump Evaporator Coil
- 274 Freon Input [From Pool Heat Exchanger]
- 276 Compressor Safety Control Valve
- 278 Refrigerant Expansion Valve
- 280 Refrigerant Coil circuit(s)
- 282 Freon Output [To Compressor]
- 284 Dual Mode Heat Exchanger
- 286 SOLAR Resistance without invention
- 288 SOLAR Resistance with invention
- 290 Liner Water Sensor
- 292 PCS1 Inlet Temperature Sensor
- 294 PCS1 Outlet Temperature Sensor
- 296 Ambient Temperature Sensor
- 298 Temperature Thermostat
- 300 L.E.D. Function Readout Display
- 302 Function Selector Switch
- 304 Function Step & Set Switches
- 306 L.E.D. Operating Status Panel
- 308 Power On L.E.D.
- 310 PCS1 On L.E.D.
- 312 Airflow On L.E.D.
- 314 Waterflow On L.E.D.
- 316 Freeze L.E.D. [40° F.]
- 318 Check Liner L.E.D.
- 320 Check PCS1 L.E.D.
- 322 Manual Switch Bank [Mini Sw's]
- 324 Auto Heat Mode L.E.D.
- 326 Auto Heat & Backup Mode L.E.D.
- 328 Auto Cool Mode L.E.D.
- 330 Ventilate Mode L.E.D.
- 332 Manual On L.E.D.
- 334 Spa On L.E.D.
- 336 Backup Heater On L.E.D.
- 338 Main System Mode Switch A
- 340 Auto Mode Switch B
- 342 Main Mode Switches
- 344 Fan On Switch C
- 346 Pump Man On Switch D
- 348 VOR1 Bypass On Switch E
- 350 VOR2 Flow Reversal Switch F
- 352 VOR3 Pool Vac Switch G
- 354 VOR4 Spa Switch H
- 356 Backup Heater Switch I
- 358 Vent #1 Switch J
- 360 Vent #2 Switch K
- 362 Drain Solenoid Switch L
- 364 Piezo Warning Alarm
- 366 Pool Vac Valve Operator
- 368 Spa Valve Operator #4
- 370 Backup Heater [Any Kind]
- 372 Relay K1 2 HP Pump
- 374 Relay K2 ¼ HP FAN
- 376 Relay K3 Backup Heater
- 378 Spa Auto Switch M (push on)
- 380 Spa Temperature Sensor
- 382 Spa Relay

DESCRIPTION-FIGS. 1,4-6,16-23

Figure 1:
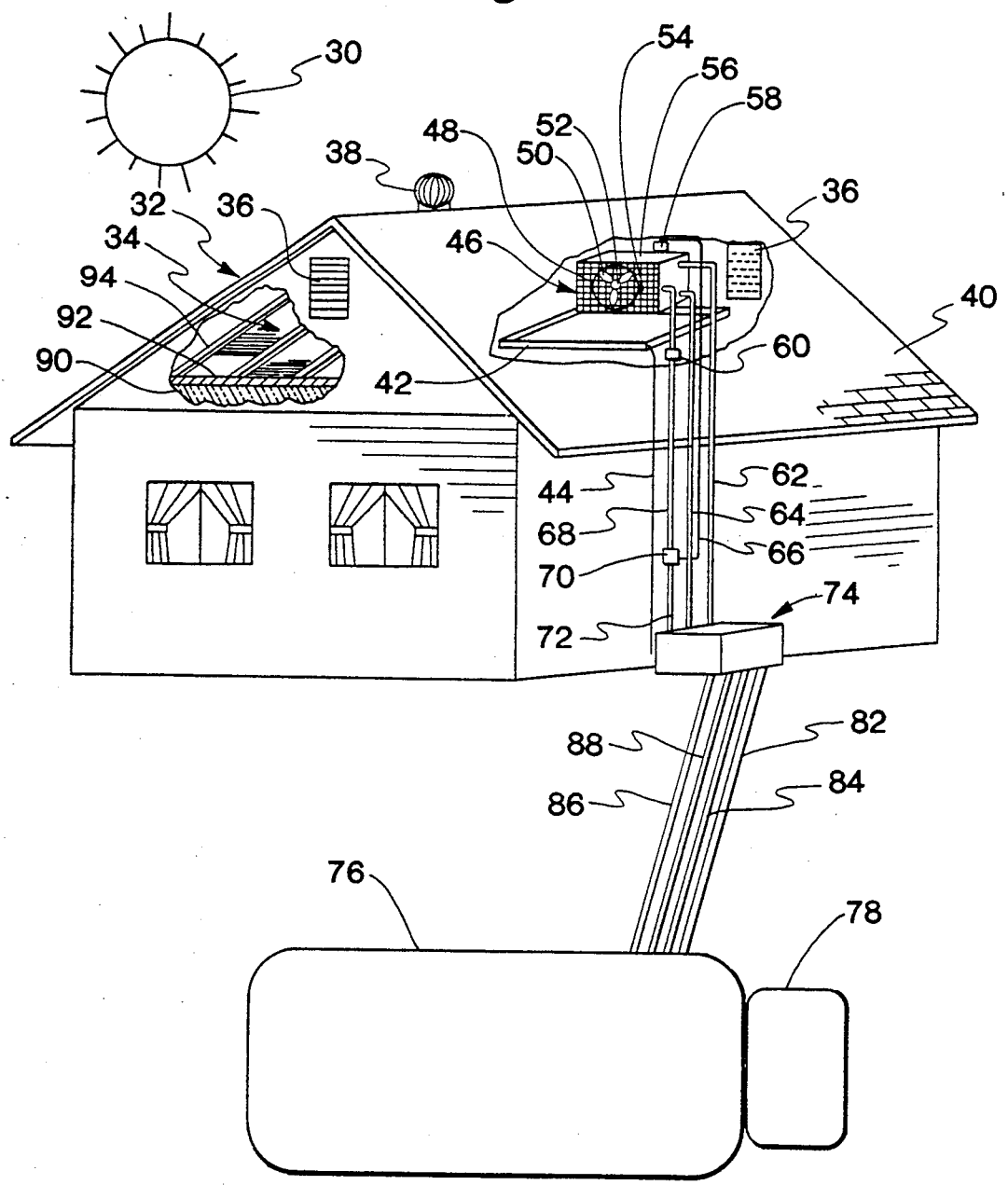
FIG. 1 is a perspective drawing that shows the overall basic invention of the "attic solar energy vehicle".
Figure 2:
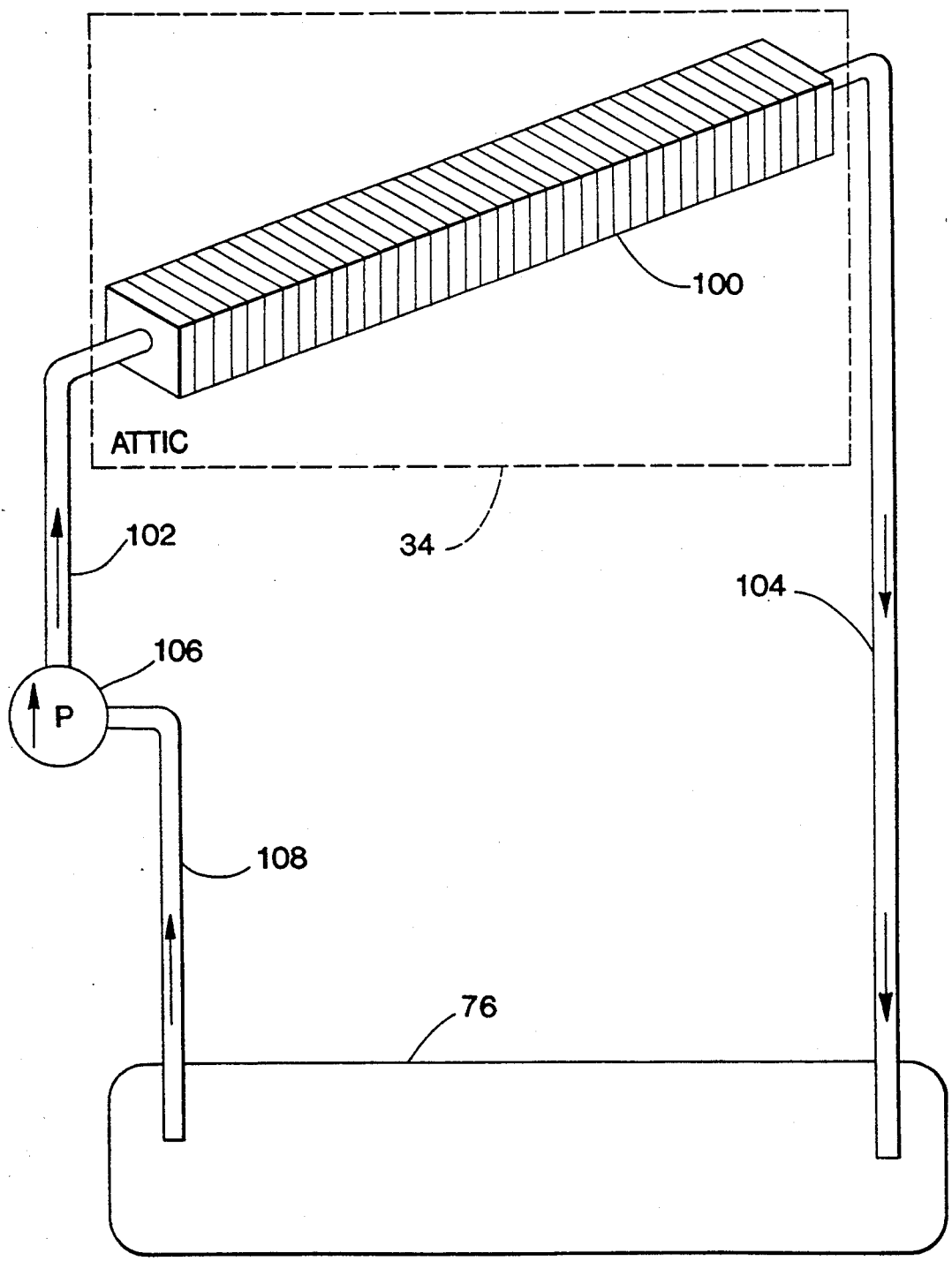
FIG. 2 is a perspective drawing that shows prior art. Attic based passive heat exchange application for swimming pools with the exchanger constructed of 60 feet of series connected hot water baseboard heating pipe.

A typical embodiment of the present invention is illustrated in FIG. 1 where the invention is used to heat a swimming pool and spa. Swimming pool 76 is connected to its support system 74 by pipes 82,84,86 and 88 which constitute the pool's main drain, return line, skimmer line and vacuum line respectively. Spa 78 is physically located adjacent to pool 76 and has its own support plumbing pipes connected to support system 74 [not shown in drawing]. All pipes are typically 1½" or 2" rigid PVC and it is not uncommon for the entire support system 74 to be constructed out of rigid pvc pipe and fittings. Mission couplings are then used to mate the pvc pipe to copper or other pipes where necessary as in the case of a gas heater installation. Pool 76 and Spa 78 share a common heater by way of a markUrban Share-A-Heater TM valve[3] physically located within support system 74. If this valve is automated with an electric valve operator [VOR], control panel 70 would decide whether pool 76 or spa 78 is heated. Otherwise, operation of the valve is manual. A default position would allow pool 76 to be heated. For the discussions that follow, pool 76 is being heated unless otherwise indicated.

[3]Share-A-Heater TM valve is a trademark of markUrban and Innovative Pool and Spa of Tustin, Calif.

Support system 74 is connected to control panel 70 which supplies power 72 to run the filtration pump. A temperature sensor is located within support system 74 for sensing pool 76 or spa 78 water temperature. This can be accomplished with either one or two sensors depending upon their physical location. The temperature sensors are wired into control panel 70 which also contains a thermostat to set the desired temperature of pool 76 or spa 78.

Attic temperature sensor 58 is connected to control panel 70 by low voltage wiring cable 66. Control panel 70 supplies 220 VAC power via high voltage wiring cable 68 and electrical outlet box 60 to forced air-liquid heat exchanger 46 which is located within attic structure 34. Pool 76 or spa 78 water is routed from support system 74 up to heat exchanger 46 by inlet pipe 62 and down from heat exchanger 46 back to support system 74 by outlet pipe 64. Inlet 62 and outlet 64 pipes are run alongside the house near support system 74 location up the outside [exterior] wall and into the eaves where the pipes continue inside attic 34 until they reach heat exchanger 46.

Rigid PVC pipe is generally used. However, at the eaves, flexible pvc pipe can be used to complete the run within attic 34 to exchanger 46. This makes heat exchanger 46 installation easier to accomplish [plumb] and minimizes the number of joints fabricated. A practical installation would use flexible pvc pipe in a continuous length from heat exchanger 46 through the eaves where it is then joined to rigid pvc pipe near support system 74 location. A pvc union coupling fitting is installed on one end of each attic 34 flexible pvc pipe section as preparation for the installation and out of the confines of attic 34 [preferably the previous day to allow a complete cure of the pvc cement]. The other side of the union coupling is installed on heat exchanger 46 inlet 242 and outlet 244 [FIG. 16] prior to mounting heat exchanger 46 in attic structure 34 [again, previous day desired]. This installation method eliminates the need for any pvc welding within attic structure 34. Flexible pvc pipe sections previously cut to the right length and equipped with a union coupling at one end are installed, union coupled onto heat exchanger 46 and then routed outside of attic 34, at the eaves, where they are joined and pvc welded to rigid pipe to complete the connection to support system 74.

A catastrophic leak protection liner 42 is installed directly under heat exchanger 46 for the collection of water in the event of a heat exchanger 46 leak. Any water collected in liner 42 is carried to the outside of the house and near pool 76 area by a liner drain hose 44 which is coupled in a leak proof way to liner 42. An inexpensive way of implementing this protection is to use a small plastic swimming pool for children and a garden hose. However, rather than have a small garden hose emanate out of the eaves near support system 74, a small section of 1" rigid pvc pipe can be installed near inlet 62 and outlet 64 pipes. The garden hose can then be cut to a custom length and slipped inside the rigid pvc pipe above the eaves. This improves the appearance of the installation. Leak protection liner 42 provides protection for any leak that may result from improper winterization or chemical etching of heat transfer coil 56 by a prolonged acidic pool 76 condition. A leak occurring under these conditions in coil 56 would amount to only a few gallons of water per minute flowing into attic 34 and would be safely collected by liner 42 and carried out of attic 34 by drain hose 44 without creating damage to the house. Protection against a massive leak is provided by sensing a leak condition electronically and shutting down support system 74 filtration pump 22 [FIG. 20]. This is described later.

Refer now to FIG. 16. Heat exchanger 46 is comprised of sheet metal cabinet [parts] 240 forming a box structure in which protective grille 48 [⅛×1" grid] is mounted at the front side for safety purposes. Directly behind protective grille 48 is 24" fan blade 50 and ¼ HP fan motor 52. Motor 52 has a motor mounting band 264 attached around its housing in which three motor mounting arms 262, spaced 120° from each other, are attached. The other end of these three supporting arms 262 are bolted to 24" venturi insert 54 which provides the support structure for motor 52 and fan blade 50. On the right side of venturi insert 54 is a motor starting capacitor 266.

Five inches further back and located directly behind motor 52 is air-water heat transfer coil 56. Coil 56 is comprised of corrugated aluminum fins 250 and expanded pressure fitted internal copper or cupro-nickel pipes 252. Corrugated fins have a rippled appearance and function as a better heat transfer surface to the airflow than flat aluminum fins. Pipes 252, ⅜" in diameter, are three rows deep and eighteen rows high comprising a total of 54 individual pipes each 32.5" long for a total pipe length of 146.25 feet. Total finned surface is 27"×27" and fin density is 10 fins per inch. Total coil 56 thickness is five inches. Drain solenoid 202 is mounted on inlet 242 to allow in air when draining.

Refer now to FIG. 17 which shows further details of coil 56. Water enters coil 56 at inlet 242 and is communicated to inlet manifold 246. Manifold 246 divides the water and communicates it equally into nine different coil circuit inputs 258. Each coil circuit consists of six lengths of pipe 252 interconnected to form a continuous length of pipe 16.25 feet long. Nine coil circuits 16.25 feet in length equals the total length of 146.25 feet. Water flows from coil circuit inputs 258 through the coil circuits and out of the circuits from nine coil circuit outputs 260 and is recombined in outlet manifold 248. Water then leaves coil 56 at water outlet 244. Coil 56 is equipped with horizontal flanges 256 and vertical flanges 254 which serve to protect coil 56 coil circuit end connections and fins in addition to providing a mounting surface so coil 56 can interface with [be secured to] cabinet 240. Coil 56 has a hot and cold side for both air and water and works off of the principle of temperature differentials for heat transfer. At a 32° F. temperature differential between pool 76 and attic 34, coil 56 is rated nominally at 60,000 BTU'S per hour.

Refer back to FIG. 16. Starting capacitor wires originate at motor 52 and are routed along horizontal support arm 262 and connected to capacitor 266 at its mounted location on venturi 54. Power wires, also originating at motor 52, are routed to capacitor 266 location where they are connected to electrical cord 268. The other end of electrical cord 268 is connected to male electrical plug 270. Heat exchanger 46 then plugs directly into electrical outlet 60 [FIG. 1]. This provides an easy method to disconnect power to heat exchanger 46 for maintenance purposes in attic 34.

Air flow sensor 194 is mounted in the air stream and provides a circuit closure when fan 50 air flow velocity reaches 350 FPM[4]. Freeze sensor 198 provides a circuit closure when the temperature at heat exchanger 46 reaches 40° F. Leak detection sensor 200 is in the form of a float which rises when water is in the base of heat exchanger 46. When the water level exceeds one eight of an inch, sensor 200 provides a circuit closure. The base of cabinet 240 forms a tray which has a water tight integrity one inch high.

[4] Feet Per Minute

Heat exchanger 46 is either hung from attic 34 roof rafters 94 [FIG. 1] or simply sits on a platform designed to hold it. Some minimal plywood and other wood such as 2×4 studs may be required to construct a simple platform in attic 34 to hold heat exchanger 46. Two inches of yellow exterior certifoam building insulation can be placed directly under heat exchanger 46 to minimize any vibration communicating to the house structure. Vibration is further minimized by using a rubber absorption pad between motor 52 and motor mounting band 264. Still further vibration isolation is accomplished by use of rubber mounting pads between motor mounting arms 262 and venturi insert 54.

Motor 52 is a standard, off-the-shelf, 104° F. Ambient, 220 vac, 1075 RPM[5], Totally-Enclosed-Air-Over [TEAO] motor that draws 1.8 amps full load and is internally thermally protected and self resetting. Attic 34 can get up to 160° F. in certain cases. Most motors are rated for maximum ambient operating temperatures of 104° F. Motor 52 will operate towards this upper limit only temporarily as the air output of air-water heat transfer coil 56 is 30°-40° F. cooler than its input and heat exchanger 46 therefore quickly pulls the internal attic 34 temperature down to a lower operating level. Motor 52 is in the air stream and receives this cooler air directly from coil 56. When heating pool 76, the temperature of the air output of coil 56 will be sinked down towards the temperature of pool 76 water [nominally 85° F.]. Where employed for spa 78 heating at 104° F. desired temperature, motor 52 will operate near its upper ambient limit.
[5]Revolutions Per Minute Any extreme environment, causing persistent thermal cutoff of motor 52, must be addressed by upgrading motor 52 temperature rating [changing motors]. Standard motors are further adapted for use by shortening the length of the motor's shaft to a distance of only two inches and removing the shaft end moisture plugs and reinstalling the moisture plugs on the opposite [coil 56 facing] end of motor 52. This ensures motor 52 shaft will not interfere with protective grille 48 and also that any moisture coming off of coil 56 will not enter motor 52 housing. Motor 52 moisture drainage will now occur at the shaft end and be carried into the air stream away from heat exchanger 46.

Fan blade 50 is selected to produce 2500 SCFM[6] air flow, at 1075 RPM, against a static pressure of 0.22 inches of coil 56. This translates into roughly 500 FPM of air flow across coil 56 and is sufficient to minimize any coil condensation by keeping moisture in vapor form [force of air blows any moisture off of coil 56 thereby inhibiting condensation buildup].
[6]Standard Cubic Feet Per Minute Refer back to FIG. 1. Heat exchanger 46 has been physically installed within attic 34 and connected to support system 74 and control panel 70. Sun 30 radiates solar energy onto "unmodified" roof structure 32 throughout the daylight hours. Solar energy is absorbed by roofing material 40 and radiates into "unmodified" attic structure 34. Roof rafters 94 and attic insulation 90 serve as minor energy storage devices while radiant barrier 92 functions to thermally isolate attic 34 environment from the living space below. Wind turbine ventilator 38 is defeated to prevent excessive loss of attic 34 heat. This can be accomplished by boarding ventilators 38 up and closing them off from the inside of attic 34 with a small piece of scrap plywood. Any power ventilators located on roof 32 must be disconnected and closed off in a similar way.

A small amount of passive air vents 170 [FIGS. 11, 12] will not affect the operation of the present invention. This would include any normal air vents 170 connected with standard building ventilation principles. In the case where additional ventilation has been added, it will most likely have to be reduced. This is especially true on "super cool" attics created by ingenious homeowners. Experience has shown it is inexpensive to close off the augmented ventilation of roof and attic structures. Remember, the present invention desires the opposite effect of a hot roof and attic and of being able to place this free solar energy into productive use. After decades of conditioning towards the cooling down and ventilation of attics, the present invention will take a little time for the readjusting of our thinking. Another factor affecting performance, but not shown, is the issue of large trees and their resultant shading of roofs. It is desirable to create a 100% sunny roof 32. Creating such a roof 32 may entail cutting down some trees and trimming others. A 100% shaded roof 32 would severely restrict the performance of the present invention.

The present invention works well with any radiant barrier 92 that has been placed on attic 34 floor [top of insulation layer]. However, any radiant barrier 92 applied directly to roof 32 interior would prevent roof 32 from functioning as an effective solar collector. Automatic solenoid operated vents 36 are installed at both ends of the house and are connected to control panel 70. On command from the control panel's logic, vents 36 open and provide a means of whole house ventilation when employed with fan 50 of heat exchanger 46. If attic insulation 90 consists of "blown-in" insulation [loose fibers], fiberglass batt insulation is laid down immediately in front and in back of heat exchanger 46 to prevent any movement of loose insulation 90. [Two-three foot coverage is sufficient.]

The principle parts of the "attic solar energy vehicle" are "unmodified" roof 32, "unmodified" attic 34 "attic based" heat exchanger 46 and control panel 70. Unmodified meaning that no structural modifications of roof 32 or attic 34 are required for successful operation of the present invention. Heat exchanger 46 is simply installed within attic 34 and attic 34 along with roof 32 are used "as is".

Turn now to FIGS. 4 and 18 which show an alternate embodiment of the present invention splitting a heat pump swimming pool heater in half. An alternate "attic based" heat exchanger 96 [evaporator coil and fan assembly] is physically mounted within attic 34 as previously described. Heat exchanger 96 is constructed using a heat pump evaporator coil 272 instead of water coil 56. Construction of heat exchanger 96 is otherwise similar to heat exchanger 46. Cooled freon or other refrigerant gas originates from the heat pump's water heat exchanger 110 [FIG. 3] cooled gas output 120 located physically in the second half of the heat pump 128 next to support system 74. From the second half of the heat pump 128, cooled refrigerant gas is routed to coil 272 via a refrigerant supply line 124 and enters coil 272 at input 274. The refrigerant then proceeds through a compressor safety control 276 and expansion valve 278 and enters refrigerant coil circuits 280. As refrigerant proceeds through coil circuits 280, it absorbs heat from the air and leaves coil 272 at output 282 returning to the second half of heat pump 128 via refrigerant return line 126. This warmed refrigerant then enters a compressor where it is compressed and turned into a heated gaseous form. The output of the compressor then reenters heat exchanger coil 110 where the heat is once again transferred to pool 76 water.

This embodiment of the present invention allows a heat pump to take advantage of the heated attic 34 condition. Heated attic 34 air present at heat exchanger 96 allows the heat pump to improve its coefficient of performance [C.O.P.] by increasing the temperature differential between pool 76 cooled refrigerant gas and the ambient air temperature that evaporator coil 272 is exposed to. This has a direct bearing on how hard the compressor has to work to recompress the refrigerant into a heated gaseous state. The net result is decreased energy consumption by the compressor which can now be built for lighter duty cycles and service. At the same time, the compressor and other sensitive parts in the second half of heat pump 128 are protected from the harsh attic 34 temperature environment.

Refer now to FIG. 19 which shows another embodiment of the present invention. This being dual mode heat exchanger 284. Heat exchanger 284 is constructed in a similar fashion to exchangers 46 and 96 described previously. However, exchanger 284 employs heat pump evaporator coil 272 piggybacked onto water coil 56. The net result of this construction is to enable a dual mode of operation to be controlled by control panel 70. The primary operating mode would be the low cost of forced air convection presented through coil 56. A secondary or backup heating is now presented by coil 272 and the heat pump's 128 refrigerant cycle.

Refer now to FIG. 21 which shows an alternate construction method for water coil 56. Coil 56 flanges 254 and 256 are altered along with internal fins 250 and pipes 252 to present the water flowing through coil 56 with an easier drain path for winterization in colder climates. This method of construction for coil 56 presents exchanger 46 with a self draining method that allows nearly 100% of water drainage without any significant internal entrapment of water. Horizontal flanges 256 are the primary control factor being constructed in wedge fashion to provide a slanted drain slope to all pipes 252.

Refer now to FIG. 5 which shows an alternate embodiment of the present invention used for heating domestic or other hot water. Heat exchanger 46 is installed in attic 34 and used in conjunction with two domestic electric hot water tanks 80. One tank 80 is installed in attic 34 slightly higher than exchanger 46. Such a higher installation allows tank 80 to function in a thermosiphon mode with exchanger 46 if desired.

Attic 34 tank 80 is modified to accept recirculating water from exchanger 46 via recirculating pump 132 [or thermosiphon mode]. Hot water controller 130 is mounted in attic 34 and senses attic 34 temperature and the hot water temperature in attic 34 tank 80. Cold water from a domestic well or from a street municipal water line is supplied to attic 34 tank 80 at cold water input 136 and is sent to the end of attic 34 tank 80. Attic 34 tank 80 is supplied with a temperature and pressure relief valve and drain line 134. Water is drawn out of attic 34 tank 80 by recirculating pump 132 [or thermosiphon] where it is sent into heat exchanger 46 outlet 244. Water then returns to attic 34 tank 80 from exchanger 46 inlet 242. Note that in this application inlet 242 and outlet 244 of exchanger 46 are reversed for use with attic 34 tank 80. This is done to facilitate thermosiphoning and because coil 56 hot and cold sides are not significant temperature differential heat transfer factors in this application. Coil 56 hot and cold sides are discussed in the operation section that follows. Hot water is drawn out of attic 34 tank 80 at output point 138 where it is distributed.

Below the frost belt, this is the extent of the installation for domestic or other hot water heating since exchanger 46 is not exposed to prolonged freezing temperatures. In the event sufficient attic 34 heat is not available for hot water, controller 130 activates the backup heating elements located within attic 34 tank 80.

In freezing areas, a second tank 80 is located in tandem, within the house, and is activated during the months when attic 34 is exposed to freezing temperatures. At this time, both attic 34 heat exchanger 46 and attic 34 tank 80 would self drain and the function of heating domestic or other hot water would be transferred to tank 80 located within the house.

This embodiment allows for construction of a smaller heat exchanger 46 which will provide a supply of domestic or other hot water at a low cost. This is possible since the application does not use (a) the high volume of water that a swimming pool uses; and, (b) does not require the same level of heat transfer capacity from attic 34. Operating cost factors are exchanger 46 fan motor 52 and attic 34 recirculating pump 132 [if used]. These operating cost factors are minimal when compared to the cost of using electric heating elements for 100% of domestic or other hot water needs.

Refer now to FIGS. 1 and 22. Spa 78 is plumbed directly into support system 74 [not shown] and shares heat exchanger 46 by way of a special Share-A-Heater TM valve [not shown]. For heating spa 78, control panel 70 is either placed into "Spa Auto" mode by pushing switch 378 "On" or activated manually by switch 354. When spa 78 is activated, the Share-A-Heater TM valve is turned 90° and water flow through heat exchanger 46 is derived from spa 78 instead of pool 76. Likewise, when pool 76 is heated, the valve is rotated back to pool 76 position. Control panel 70 provides this automatic & manual switch functions when an automatic valve operator [VOR] has been mounted on top of the valve stem. If the valve has not been equipped with an automatic valve operator [VOR], the valve's stem must be hand rotated 90° for spa 78 heating. This special valve handles all of the issues involved in the water flow paths and no other equipment is necessary for the present invention to provide spa 78 heat from exchanger 46.

Refer now to FIG. 6 which shows another embodiment of the present invention used for space heating applications. Heat exchanger 46 is installed in attic 34 as described above. Attic 34 tank 144 is a hot water storage tank. Exchanger 46 heats the water in tank 144 as previously described. Tank output 138 is now tied directly into hydronic space heater 140. Water is forced down through space heater 140 by recirculating pump 132 [second stage or second pump] and returns via return pipe 98 to tank input 142. Controller 130 operates in conjunction with the house internal space thermostat to turn hydronic space heater 140 on only when desired. In this embodiment, it is possible for the simultaneous application of hot water heating for distribution and hot water [recirculating] space heating.

Refer not to FIGS. 20 and 23 which show the inputs and outputs of the present invention. Inputs are 220 vac, exchanger 46 air flow sensor 194, pool 76 water flow sensor 196, attic 34 temperature sensor 58, exchanger 46 freeze sensor 198, exchanger 46 leak sensor 200, pool 76 water temperature sensor 226, liner 42 water sensor 290, exchanger 46 inlet temperature sensor 292, exchanger 46 outlet temperature sensor 294, ambient temperature sensor 296 and spa 78 temperature sensor 380.

Outputs are pump 222 power 72, 24 vac power to automatic ventilators 36, circuit closure from backup heater relay 376 along with 24 vac to backup heater 370, circuit closure from spa relay 382 to spa 78, 24 vac power to bypass valve 228 valve operator 230, 24 vac power to flowreversal valve 212 valve operator 214, 24 vac power to pool vac valve operator 366, 24 vac to spa 78 valve operator 368 [mounted on top of Share-A-Heater TM valve], 24 vac to heat exchanger 46 drain solenoid 202, 220 vac to fan motor 52, 12 vdc to piezo alarm 364. Internal power relays 372 rated at 2HP and 374 rated at ¼HP are shown.

Refer now to FIG. 20 for details of how the present invention is connected and plumbed into support system 74 for purposes of heating pool 76. Pool 76 water is taken off of the top of pool 76 by return line 84 where it flows into Flowreversal TM valve[7] 212. Water flows through the lower half of valve 212 midvane diverter and into proportioner valve 210 up intake line 216 into strainer 218 where pump 222 pumps the water and discharges it out discharge line 220 into filter 224. Filter 224 output is sent into bypass valve 228. Between filter 224 and bypass valve 228, pool 76 water temperature sensor 226 is installed. If bypass valve 228 is on, water flows up through water flow sensor 196 and into heat exchanger 46 located in attic 34. Water then flows out of exchanger 46 down through check valve 234 and into return line 236 where it continues through chemical dispenser 238 [if used, must be downstream of exchanger 46] and back into valve 212 where it proceeds through the top half of the midvane diverter and back into pool 76 main drain 82. After pool 76 water is returned to main drain 82, water rises from the bottom of pool 76 and is eventually taken back into return line 84.

[Footnote] Flowreversal TM is a trademark of markUrban and Innovative Pool and Spa of Tustin, Calif.

If bypass valve 228 is off, water flows down return line 236 bypassing attic 34 heat exchanger 46. Drain down tube 232 connected between inlet line 62 and outlet line 64 near support system 74 allows the automatic draining of exchanger 46 when not in use. [This simply consists of a hollow tube of ¼ inch diameter.] Check valve 234 prevents pool 76 water from entering exchanger 46 when it is not in use through outlet [return] line 64.

Vacuum line 88 is connected to control valve 204 and suction intake line 208 to proportioner valve 210. Skimmer line 86 is connected to control valve 206 and suction intake line 208 to proportioner valve 210.

Valve 204 controls the suction on vacuum line 88 and is used in conjunction with valve 210. Valve 206 controls the suction on skimmer line 86 and is used in conjunction with valve 210. Valve 210 functions to create the proper amount of suction on line 208 and to effect correct operation of the skimmers in "flow reversal" mode. Without valve 210, in a standardly plumbed pool 76, water would be forced out of the skimmers—during reverse flow—because skimmer line 86 is typically tied directly to main drain line 82 when pool 76 is constructed.

The benefit of reverse flow in pool 76 is to create an efficient pool 76 heating environment. Taking water off the top of pool 76, heating it, and returning it to the bottom so the heated water can rise inside pool 76 can reduce pool 76 heat demand ½-⅔rd's. This is described in detail in Krumhansl's U.S. Pat. No. 4,621,613 (11/1986). It is desirable to use either this method or that of an "in floor" circulation method along with the present invention since an efficient pool 76 allows greater heating margin when using the "attic solar energy vehicle". The increased heating margin resulting from an efficient pool 76 will allow a marginal attic 34 environment to function effectively.

During flow reversal as described above, some degradation of the cleaning of pool 76 can take place and it may be desirable to return flow reversal valve 212 to the "normal" position where pool 76 water is taken off the bottom of pool 76 via main drain line 82 and returned to the top of pool 76 via return line 84. This is accomplished by simply rotating valve 212 90° to the right either manually or automatically with control panel 70. The midvane arrow of valve 212 will then point to "normal". Observe that water is now drawn from main drain line 82 where it flows up into the top of valve 212 through the upper half and to the left into valve 210 [FIG. 20]. Water then continues on as previously described and returns back into valve 212 at the same point. Valve 212 now routes the "normal" return flow down into return line 84. Notice that no change to valve 210 is required when switching valve 212 from reverse flow to normal or vice versa.

Experience has shown that a manual flow reversal valve 212 can be installed and simply left in the reverse flow mode unless pool 76 is being drained at which time it can be rotated to "normal" flow. During "normal flow" where water is drawn into the main drain—only a small circular area 2-3 feet in diameter, close to the main drain, remains clean. Pool 76 floor is then "vacuumed" on a periodic basis to clean the rest of pool 76. No change in pool 76 appearance occurs when left in reverse flow. In this case, the main drain simply blows a small circular area clean [again 2-3 feet] and vacuuming again cleans the rest of the floor area.

One could state that "optimum" cleaning of pool 76 should occur in "normal" while "optimum" heating should occur in "reverse". It's logical to assume that all particulate matter gravitates into the main drain during "normal" water flow. However, the above observation that no visual difference appears at pool 76 floor in terms of particulate matter accumulated—suggests valve 212 can be left 100% of the time in "reverse" flow. This fact is confirmed by "in floor" circulation systems now available which document that pool 76 traditional design simply does not cause all particulate matter to gravitate towards and into the main drain. Further confirmed by the abundance of automatic "pool vacs" available to clean pool 76. Two criteria for plumbing pool 76 for use with the present invention is then (a) to effect reverse flow and allow pool 76 heated water to enter the bottom and rise to the top where it is drawn out; and, (b) being able to drain all the water out of pool 76 is necessary. Midvane diverter flowreversal TM valve 212 offered by Innovative Pool and Spa of Tustin, Calif. offers an easy plumbing solution.

Refer now to FIG. 22. The inventions control panel is comprised of: main mode switches 342, manual switch bank 322, temperature thermostat 298 with "Off" function, L.E.D. display 300, Function selector switch 302, Function step & set switches 304, Operating status panel 306, piezo alarm 364 and Spa Auto switches 378. Main mode switches 342 consists of main system mode switch 338 and auto mode switch 340. Manual switch bank 322 consists of the following manual switches: fan 344, pump 346, bypass vor 348, flow reversal vor 350, pool vac vor 352, spa vor 354, backup heater 356, vent 1 358, vent 2 360 and drain solenoid 362. If thermostat 298 is in the "Off" position, control panel 70 is turned off except for pump 222 manual switch 346 and spa 78 manual switch 354 functions.

Manual switches 322 are dual state "on or off" mini switches. All manual switches 322 are deactivated when main mode switch 338 is in "Auto" except pump 222 switch 346 and spa 78 switch 354 which are activated at all times to allow manual override of these two functions. This means that pump 222 can be manually turned on [continuously if desired] and that spa 78 can be manually selected instead of pool 76. If spa 78 is manually selected by switch 354, thermostat 298 must be readjusted to the desired spa 78 temperature from its current pool 76 setting. If spa 78 auto switch 378 is pushed on, switch 354 is deactivated and spa 78 temperature is preset to 104° F. This allows thermostat 298 to remain set for pool 76 temperature. With switch 378 on, pool 76 will automatically be heated until it no longer needs the heat available at which time spa 78 will be heated until attic 34 heat is consumed or no longer useable. If at anytime during spa 78 heating, pool 76 needs heat, control panel 70 will redirect the heat to pool 76.

Operating status panel 306 consists of the following green L.E.D. indicator lights: power on 308, PCS1 on 310, airflow 312, waterflow 314. The following "flashing" red L.E.D. indicator lights: freeze 316, check liner 318, check PCS1 320. The following yellow L.E.D. indicator lights: auto heat 324, auto heat and backup 326, auto cool 328, ventilate 330, manual on 332, backup heater on 336, and spa on 334.

Function switch 302 allows the analysis of temperature conditions, heat transfer capacity, and other characteristics of pool 76 and the "attic solar energy vehicle". In other words, complete analysis of the entire "system" is possible. Switch 302 default vertical position is the current pool 76 temperature in °F. from sensor 226. This means pool 76 temperature will be immediately visible whenever the cover of the control panel is opened. Going clockwise around switch 302, all switched functions will now be described.

"Attic" is the current attic 34 "peak" temperature in °F. measured by sensor 58. "Ambient" is the current ambient temperature in °F. measured by sensor 296. "PCS Input" is exchanger 46 inlet 242 current temperature in °F. from sensor 292. "PCS Output" is exchanger 46 outlet 244 current temperature in °F. from sensor 294. "Spa" is the current spa 78 temperature in °F. from sensor 380. "$\Delta T$" default display is the temperature differential between exchanger 46 outlet 244 and inlet 242 in °F. Pushing the "A" set or step button 304 displays the temperature differential between attic 34 sensor 58 and pool 76 sensor 226. Pushing "B" 304 displays the temperature differential between attic 34 sensor 58 and spa 78 sensor 380. "Flow Rate Set" allows the user to input the correct water flow rate for internal energy calculations by using "A" and "B" set function switches 304. Flow rate is set at the factory to 30 GPM.

"Min Runtime" allows the user to input the desired minimum run time of filtration pump 222 by using "A" and "B" set function switches 304. Minimum run time of pump 222 is set at the factory to 6 hours. On a poor solar 30 day, X amount of filtration time for the pool will still be desired and may not be derived from automatic operation. This varies a little from pool to pool. An exact time for an individual pool is best determined by reducing pump 222 minimum run time down until pool 76 is experiencing cleaning problems as evidenced by algae growth or other visible problems such as cloudy and unclear pool water. Minimum run time is factory set to begin at 12 noon and run during optimum solar 30 heating hours.

"Backup Delay" allows the user to input a backup heater 370 startup delay time in hours by using switches 304. This is factory set to 2 hours. See flow chart of FIG. 24 for further details. In essence, this startup delay allows the solar 30 radiation sufficient time to "build up" heating momentum and holds back any backup heater 370 use until it is determined to be absolutely necessary. Note that switch 338 must be in "Auto" and switch 340 must be in "Backup" before this function is used.

"BTU Rate" reflects a current calculation of heat transfer capacity in BTU's per hour based on the formula BTU's/Hr = 500.4 × $\Delta T$ × GPM. The figure 500.4 is derived by multiplying 8.34 lbs per gallon [weight of water] times 60 minutes [translates gallons per minute to hourly rate]. GPM is manually inputted. $\Delta T$ is derived internally from the temperature sensors as described above. "BTU Rate" allows the user to correlate visually the performance of the system with the various weather conditions that may prevail. Only "sensible" heat is calculated since it is "measurable". Latent heat components are ignored in the calculation.

"Fault Isolate" checks the reading of input signal conditions by using the "A" & "B" step function switches 304. For example, checking the condition of the airflow sensor 194 or waterflow sensor 196 [open or closed circuit]. "Fault Isolate" also checks the resistance reading of all temperature sensors; the input line voltage; and, all output voltages. This minimizes the need to go into attic 34 and allows any problem to be quickly isolated to a defective component.

"Cooldown" allows the user to input a cool down startup delay by using "A" and "B" set function switches 304. This is factory set to 30 Minutes. This function requires switch 338 to be in "Auto" and switch 340 to be in "Cool". Control panel 70 then compares pool 76 temperature sensor 226 to ensure it is greater than thermostat 298 and ambient sensor 296. If so, the cool down delay allows the opening of vents 36 and the turning on of fan 50 for a preset time [30 minutes] before allowing the pumping of pool 76 water through exchanger 46. The startup delay clears out all hot attic 34 air. Cooldown allows a hot pool 76 to be cooled down to thermostat 298 setting. Cooling down an overheated pool occurs during the evening hours. During the hot summer months, it is not uncommon for some pools to overheat. Exchanger 46 operates in a reverse mode to eliminate the heat. Hotter pool 76 water is put into coil 56 and cooler airflow is drawn across coil 56. Heat transfer principles similar to automobile engine cooling now apply. Once pool 76 temperature is brought back down to thermostat 298 setting, control panel 70 shuts down exchanger 46 and resets itself according to the flow chart shown in FIG. 24.

"BTU's" allows the user to observe the total accumulated heat transferred into pool 76 over the last 24 hours, 7 days, and 30 days. This includes the minimum, maximum and average values over these same periods of time. In addition, the C.O.P. [coefficient of performance] is calculated here as an overall indication of system performance. Step function switches "A" and "B" 304 are used to cycle through the various readings. C.O.P. is determined by the formula C.O.P. = Btus Out ÷ Btus In. Output Btus are defined by the internal formula previously described. Input Btus are defined by the run time of exchanger 46 ¼HP fan 50 times the Btu electric kilowatt constant of 3410 Btus per Kilowatt hour.

"Runtime" allows the user to observe how much total time pump 222 and exchanger 46 [PCS1] have ran over the last 24 hours, 7 days and 30 days. It also allows the user to see average, minimum and maximum values [on a per day basis] over the time periods of 7 days or 30 days. Set function switches 304 are used to cycle through the different readings presented.

"Operating Cost" allows the user to input the cost per kilowatt of electricity they pay. Factory set cost is 10¢ per kilowatt. User also inputs the size of pump 222 in horsepower. Factory set position is 1HP. Using step function switches 304, the user can then read the estimated operating costs of pump 222 and exchanger 46 [PCS1] over the last 24 hours, 7 days and 30 days.

"Hour Meter" indicates the total accumulated runtime of exchanger 46 and is derived from the formula Runtime=airflow+waterflow. This is resettable internally by way of a jumper connection.

"Off Hours" allows the user to set a block of time that inhibits the operation of exchanger 46 and also inhibits the operation of backup heater 370. This is factory set from 11 p.m. until 9 a.m.. During this time period, no heating of pool 76 is allowed in "Auto" mode since any such heating would be unduly expensive. This time period also defines when "Auto" Cool down will occur. See FIG. 24. Pump 222 manual switch 346 still functions during these hours along with spa 78 manual switch 354.

"Date" and "Time" functions are self explanatory. All of the above readings occur on L.E.D. display 300. Function switch 302, when used in conjunction with status panel 306, provides a powerful diagnostic device. It also allows close correlation of system performance with prevailing weather patterns. All temperature readings are accurate to $\pm 1°$ F. except inlet 242 and outlet 244 temperatures which are calibrated to $\pm 0.1°$ F.

Other built-in control panel features include: lithium backup battery, output of signals and data to Macintosh®[8] LabVIEW®[9] software for analysis, auto shutdown if freezing temperatures are detected, auto shutdown if water is detected in liner 42, auto shutdown if excessive water is detected in PCS1 [exchanger 46], and auto shutdown of bypass valve 228 if no airflow 194 is detected. Shut down of the water flow through exchanger 46 when no airflow 194 is detected prevents excessive condensation from building up inside exchanger 46. Pump 222 is shut down if any leak is detected. Otherwise, shut down of exchanger 46 means turning fan 50 off and bypass valve 228 off. This allows other pool 76 functions to be maintained [I.E. filtration]. When an alert [or alarm] condition is detected, piezo 364 is turned on and the appropriate red L.E.D. will flash. Different tones for different piezo 364 alert conditions are used. FIGS. 24 and 25 show the five major operating modes along with signal conditions and will be discussed in the operation section that follows.
[8] Macintosh® is a registered trademark of Claris, Inc. [9] LabVIEW® is a registered trademark of National Instruments® of Austin, Tex.

OPERATION-FIGS. 1, 4, 7–20, 22, 24–25

The operational parts of the "attic solar energy vehicle" are "unmodified" roof 32, "unmodified" attic 34, "attic based" heat exchanger 46 and control panel 70. Heat exchanger 46 is physically installed within attic 34 as previously described. No modifications are made to roof 32 or attic 34 except those necessary to install heat exchanger 46 and its associated plumbing and electrical wiring.

"Unmodified" roof 32 functions as a massive solar 30 energy collector which receives solar 30 radiation throughout daylight hours. Solar 30 radiation "heats" up roofing material 40 which then communicates solar 30 heat to underlying roof structure 32. Roof structure 32 material further communicates solar 30 heat into attic 34.

Refer to FIG. 7 showing temperature profiles vs time of day. These temperatures were observed during July of 1989 in Elk River, Minn. on a 16 year old house with medium brown asphalt shingles 40 on roof 32 [single layer and original roofing material 40]. Roof 32 is equipped with twice the amount of passive vents 170 [FIG. 11] than what the house was originally constructed with. Observe ambient temperature profile 146 and roof 32 temperature profile 162. Profile 162 represents the temperature present directly on top of roofing material 40. For the discussions that follow, roof 32 profile 162 will be used to mean either the top of roof 32 or the top of roofing material 40. The same point for our analysis. Both ambient profile 146 and roof 32 profile 162 peak at the same time during the day.

Ambient 146 starts off at a low of approximately 62.5° F. at 6 a.m. and begins to climb, as sun 30 radiates energy, up to 82° F. It then gradually declines again during late afternoon and evening hours settling back down to 62.5° F. At some point 147, in the early morning hours, roof 32 temperature 162 [roofing material 40] begins to depart away from ambient 146 temperature. The temperature differential between ambient 146 temperature and roof 32 keeps increasing during the day as roof 32 "absorbs" solar 30 radiation. Profile 162 indicates that roof 32 eventually reaches 142° F.—a full 60° F. higher than the ambient. Again, this is pure solar 30 radiation being absorbed! During the late afternoon, roof 32 begins to gradually lose its temperature. During the evening, profile 162 indicates roof 32 rapidly loses the increased temperature differential and rejoins ambient 146 at some point 148.

Heat travels from hot to cold. Since roof 32 is "gaining" heat, solar 30 radiation must be "hotter" than roof 32 even when roof 32 is at 142° F. Attic 34 represents a "cooler" area so roof 32 then radiates its "collected" heat into attic 34 at some per hour BTU rate $\underline{Y}$. The actual hourly BTU rate $\underline{Y}$ of heat communicated from roof 32 to attic 34 will vary and is heavily dependent upon roofing material 40 used and also the thickness of the supporting structure for roof 32 plus the type of material used in supporting structure 32. Attic 34 temperature profile 152 follows roof 32 profile 162; but, at a lower temperature. During maximum solar 30 radiation, roof 32 will be between 10° and 25° F. hotter than attic 34. Attic 34 temperature sensor 58 is physically located at the peak of attic 34 [next to roof 32] and represents, in essence, the opposite side roof 32.

As the day progresses, the increase in temperature differential between roof 32 profile 162 and attic 34 profile 152 represents "resistance" to solar 30 radiation from roof 32 and attic 34. Some of this resistance represents the inability of roof 32 structure to readily communicate its heat by way of "conduction" into attic 34. For example, if roof 32 communicated 100% of its "absorbed" heat instantaneously, profile 152 would be identical to profile 162 since—in this example—temperature sensors are located on both sides of roof 32. A second component of this "resistance" lies in the fact that, as the day progresses, attic 34 is building up heat. When attic 34 starts off, it is more receptive to "accepting" inwardly radiated heat from roof 32 than it is later in the day when it has reached a much higher temperature 152.

Another way of expressing this heat transfer is to say that the higher the temperature differential between roof 32 and attic 34—the easier it is to transfer heat from roof 32 to attic 34 until at some attic saturation point where solar 30 "resistance" becomes a significant factor. One could even expect BTU hourly rate $\underline{Y}$ will increase at higher temperature differentials and decrease at lower temperature differentials. Starting off in the morning, attic 34 is at a quiescent state [ambient] at the same time solar 30 radiation is accelerating [sun 30 is rising]. As attic 34 temperature nears its peak, solar 30 radiation is decelerating [sun 30 is setting]. Near 152 peak, attic 34 demonstrates a saturation point where it stops following roof 32 [stops gaining temperature rise] and starts offering some "resistance". Roof 32 continues to gain, but communication [conduction] between roof 32 and attic 34 is slowed.

Normal air movement patterns, generally accepted, are shown in FIG. 11. Cooler incoming air 176 is drawn into the house through windows 174, eaves 172 and any open doors, etc.. This cooler air, preferably aided by some gentle wind, circulates up into attic 34 where it helps to carry hot attic 34 air out through passive vents 170 and wind turbine 38 as outgoing exhaust air 178. If end of house vent 36 is a passive vent, outgoing exhaust air 178 will exit there also. In the present invention, end of house vent 36 is changed from a passive to a solenoid operated vent for use in manual venting of attic 34 or cooling pool 76. The problem with this general model of ventilation is that it is too simplistic. Remember, heat travels from hot to cold.

On a windy day, ventilator 38 will effect an enormous amount of heat transfer out of attic 34 and into the ambient air. However, on a still day or one with only a gentle breeze, ventilator 38 will have almost no effect on the buildup of attic 34 heat. This has been observed and is best explained by FIG. 12A. On a still day, roof 32 is hotter than attic 34. Passive vents 170 allow air movement. How does it move? From hot to cold which is from roof 32 into attic 34 via vent 170. Arrows 180 indicate this altered air flow pattern—not generally considered. With a hot attic 34, another airflow component 182 is possible. Instead of air 176 suspected air flow, counterflow 182 is possible as hot attic 34 air travels from attic 34 through eaves 172 into the ambient cooler air. Again, heat travels from hot to cold. The best way to ventilate an attic with assured results is by way of a roof 32 mounted electrical power ventilator that creates the forced airflow [in the right direction] desired. Any such power ventilator is disconnected for practice of the present invention along with wind turbine ventilators 38.

The present invention creates altered air flow patterns as described by "sinking" the internal temperature of attic 34 to a "much lower value" than would ordinarily be available. The natural effect is to cause hot roof 32 air flow patterns that flow inward to attic 34 via passive vents 170.

The present invention works on the heat transfer principle of temperature differential. The larger the temperature differential between attic 34 and pool 76—the greater the amount of heat transfer in BTU's per hour. This is shown graphically in FIG. 13 where output rate in BTU's per hour is plotted against $\Delta T^{10}$ which is attic 34 temperature minus pool 76 temperature. At 32° $\Delta T$, the present invention delivers 60,000 BTU's per hour. The heat transfer curve of the present invention is linear. The greater the temperature differential, the greater the heat transfer rate. Pool 76 water is enjoyable to swim in at 82° F. The healthiest pool 76 temperature is quoted at 78° F. At 32° $\Delta T$, attic 34 would have to be between 110°-114° F. to transfer heat at 60,000 Btus per hour and this would have to be sustainable.
[10] $\Delta T$ is an abbreviation that stands for "temperature differential"

FIG. 14 indicates how flow rate will affect the heat transfer capability by showing nominal 60,000 Btu transfer curve plotted against different flow rates. Heat transfer is fairly flat from 25-60 GPM [nominally 60K Btus] and drops significantly below 25 GPM flow rate. The 2" inlet 242 and outlet 244 and corresponding manifolds can accept larger flow rates. However, maximum heat transfer and wear characteristics occur when the flow rate is between 45-55 gallons per minute. Below 30 GPM, heat transfer capability declines. Above 55 GPM, accelerated wear of coil 56 can occur.

FIG. 15 shows a family of operating curves. The vertical scale indicates temperature rise at the output of exchanger 46 [outlet 244 temperature minus inlet 242 temperature] and the horizontal scale is flow rate in gallons per minute [GPM]. Each curve shown represents a different attic 34 to pool 76 temperature differential. The nominal rating of 60,000 Btus per hour is the heavier line and indicates 32° F. $\Delta T$. It can be observed that as flow rate decreases, output temperature increases for a given and constant attic 34 to pool 76 $\Delta T$. It can also be observed that the higher the temperature differential between attic 34 and pool 76, for a given flow rate, the greater the output temperature rise and greater the BTU hourly rate of heat transferred.

Nominal swimming pool 76 heat requirement is 50,000 Btu's per hour. This is the typical sizing for heat pumps or solar panel systems when looking at a 450 square foot to 600 square foot pool [surface area]. These heaters bring pool 76 temperature up to its operating point slowly and then generally keep it there. This is contrasted with gas heaters or other fossil fuel types that are rated to raise pool 76 10°-30° F. in a single night. In this case, a rating of 150,000 to 300,000 Btus/Hr is not uncommon. Since the present invention operates in a solar 30 environment, the first situation applies. The "attic solar energy vehicle" will bring pool 76 up slowly and then keep it at the desired temperature 298 [thermostat set point shown in FIG. 22].

The present invention is recommended for use with flow reversal valve 212 so that an efficient pool 76 heating environment is created. Using this valve alone reduces pool heat demand by $\frac{1}{2}$-$\frac{2}{3}$rds. This makes it possible to heat a 450-600 sq. ft. pool 76 with a device that delivers only 25,000 Btus per hour [or even less]. A question then becomes: what kind of attic 34 temperatures could deliver 25,000 Btus per hour if sustainable. FIG. 15 indicates that the $\Delta T$ would only be 12°-15° F.

Adding this to the desirable range of pool 76 temperatures of 78°-82° F., indicates that attic 34 temperatures of 90°-97° F. could be capable of delivering a sufficient amount of heat to pool 76. FIG. 15 also indicates that only a 27° F. $\Delta T$ is required to achieve the "nominal" condition of 50,000 Btus per hour. Attic 34 temperatures of 105°-109° F. [sustainable] will deliver the nominal amount of heat required and will heat pool 76 without the added benefits of valve 212. An actual operating environment should yield this latter case on a sustainable basis.

Refer back to FIG. 7. Roof 32 and attic 34 temperature decay area is represented by 160. Without the present invention, temperature peak area 158 will occur. With the present invention the operating temperature at attic 34 peak [152] will sink into area C 156 as the present invention takes the heat out of attic 34.

When the present invention turns on, it takes 15-30 minutes to remove the hot air contained within attic 34. Air is not a good storage medium for heat and the actual internal air space of attic 34 is not a critical heat transfer factor. Some heat is contained in insulation 90 and roof 32 building materials, but again this is a minor amount. After the present invention takes out whatever heat is immediately available within attic 34, it then starts taking the heat "conducting" through roof 32 off of the inside of roof 32 and immediately transfers it to pool 76. Hot air is taken off of roof 32 inside attic 34 as fan 50 creates air movement and circulation in attic 34. Since roof 32 functions as a massive solar 30 collector, the main criteria for heat capacity is roof 32 itself. Larger roofs with black asphalt shingles will perform better than smaller roofs with white asphalt shingles. Roof 32 size, in proportion to pool 76 size, is generally much larger and in a typical case 2-3 times larger in surface area exposed for solar 30 collection.

The "rule-of-thumb" for solar panel sizing is 1 to 1: one sq ft of panel required for each sq ft of pool 76 surface area. It can be observed that the present invention enjoys a more "massive" collector in the form of "roof" 32. It can also be observed that problems associated with solar panel systems are nonexistent with the present invention.

Refer to FIG. 12B and observe internal attic 34 hot air 184 from roof 32 interior that flows into exchanger 46 [roof 32 now functioning as a massive solar 30 collector]. Cool air 186 output of exchanger 46 is sinked down towards pool 76 temperature and is typically 20°-40° F. cooler than the input attic 34 air 184 temperature of coil 56. Recirculating air streams 188 occur as attic 34 serves as a container for exchanger 46 air flow. Attic 34 temperature sensor 58 is physically mounted in hot peak area 190. Cooler air sinks to attic 34 floor area 192.

Because exchanger 46 is drawing attic 34 air 184 directly off of the interior of roof 32 and roof 32 as a solar 30 collector is the primary heating factor [not attic 34 air space or insulation 90]—a different mounting configuration [not shown] is possible for roofs that do not have adequate space to house exchanger 46 internally inside attic 34. Exchanger 46 is built 33"H×30"W×20"D and was designed to fit through standard 24" on center trusses in today's building construction. Exchanger 46 fits into standard attics that are 4×12 pitch construction and generally have 4 feet of space between attic 34 floor and peak. Some houses have only 1-2 feet of space available and could not mount exchanger 46 inside attic 34. In this case, mounting exchanger 46 on one end of the house and adapting the air input to coil 56 such that air 184 is drawn through attic 34 from the other end [via a passive end vent 36 construction] and off of the interior of roof 32 should be effective. In this case, cooler air output of exchanger 46 would be sent outward into ambient air unless put to use somewhere else. Theoretically this should work since it is roof 32 functioning as a solar 30 collector that counts. Other optional mounting configurations exist such as mounting exchanger 46 within roof 32.

Refer to FIGS. 7 and 8. The "attic solar energy vehicle" can operate up to 11 hours a day continuously collecting solar 30 radiation. The operating temperature at attic 34 peak will sink into area 156 and remain there during solar 30 collection process. A ceiling profile 164 area is shown in FIG. 8. Attic 34 will now be highly stratified with low temperatures at the floor and higher temperatures at the peak. Floor temperatures will tend to follow profile 164. Area A 150 and area B 154 represent significant BTU capacities previously wasted and now being used by the present invention in terms of heat transferred to pool 76. As solar 30 radiation ceases, roof 32 and attic 34 will rejoin ambient profile 146 at some point 148.

Temperature and btu profile curves shown in FIGS. 7-10 are for pool 76 heating. Different, but similar curves would be expected for hot water 80 or spa 78 heating. Specifically, attic 34 temperature profile 152 shown in FIG. 7 will obviously "sink" to a different operating area "higher" than that shown. In the case of spa 78 heating, where spa 78 is at 104° F., the lowest internal attic 34 temperature will be around 104° F. since this will be the "cool" air output of exchanger 46. Under these conditions, the present invention will only operate when attic 34 is 112° or higher. Again, a good attic can easily get above 120° F. The present invention has demonstrated the ability to heat water beyond 104° F. from attic 34. Once this temperature is reached and heat is no longer desired—attic 34 will continue to gain heat [temperature rise] once again during solar 30 day. Motor 50 might start experiencing thermal cutoff problems if used 100% for spa 78 heating and will have to be upgraded as previously discussed. The balance of this discussion returns to pool 76 heating unless otherwise stated.

Heat transfer capability is enhanced by the increased temperature differential now created between the extremely hot roof 32 exterior and the now "much cooler" attic 34 interior. In essence, heat transfer BTU hourly rate Y is significantly increased. Attic 34 is "sinked" and now provides a stable and ready source for solar 30 heat to be "absorbed". By lowering the interior temperature 58 of roof 32, less heat damage occurs to roofing material 40 and roof structure 32. As a result, they can be expected to last longer.

FIGS. 9A and 9B illustrate solar 30 resistance with and without the present invention. In a normal instance [without the present invention], solar 30 resistance can be expected to increase in a linear fashion until it reaches a peak and then decrease in a linear fashion as represented by curve 286. This usually means that re-merge point 148 can occur after midnight at 1 a.m. or later [depends on roof 32 and attic 34 ventilation dynamics]. When the present invention is installed, it alters the behavior of solar 30 resistance to that of curve 288. It can be observed that as attic 34 builds up heat, at some point, the present invention turns on and sinks attic 34 to a lower temperature. Curve 288 remains substantially flat during solar 30 collection process. When solar 30 radiation declines, there is no substantial amount of heat "stored up" in attic 34 and remerge point 148 occurs much earlier in the evening.

Air conditioners are sized to offset the heat load on the ceiling [attic 34 floor]. A natural byproduct of the "attic solar energy vehicle" is that the ceiling heat load is removed thereby substantially reducing any need for air conditioning of the house. Actual operating tests indicate air conditioners would be used primarily to offset humid and uncomfortable air and little, if any, air conditioner expense would be needed to offset the ceiling heat load normally expected—now nonexistent. This benefit is similar to that of installing a radiant barrier 92 along the floor of attic 34. The present invention alleviates the need for a radiant barrier 92 since it removes attic 34 heat and places it into productive use.

Btu potential for a given roof 32 and attic 34 is summarized in FIGS. 10A and 10B. Curve 166 indicates normal [without the present invention] btu potential would follow and be "passively" similar to ambient curve 146. Curve 168 indicates an altered and higher condition resulting from the active "attic solar energy vehicle". With the present invention, useful Btus can be extracted at an earlier starting time of the day, continue, and be maximized throughout the day. Without the present invention, solar 30 resistance builds up and inhibits the true BTU capacity of roof 32 and attic 34. When solar 30 radiation ceases, curve 168 shows a rapid decline as heat is quickly transferred into pool 76 and is no longer present in the "attic solar energy vehicle".

Refer to FIG. 17. Coil 56 is constructed to have a hot and cold side to both air flow and water flow. Inlet 242 delivers cold water through manifold 246 into the hot air side of coil 56 where it circulates first. Water then cycles through coil 56 and finally arrives at outlet 244 via manifold 248. This maximizes the temperature differential between attic 34 air and pool 76 water thereby maximizing the heat transferred. Output temperature increases of 2°-10° F. are typical from outlet 244. Output air temperatures are typically −20° to −40° F. on motor 50 side of coil 56. Observe that motor 50 is being supplied with substantially cooler air than what is being seen externally at exchanger 46 coil 56. This cooler air helps to maintain motor 50 within its maximum rating of 104° F. ambient environment.

The cooler air output of exchanger 46 can also be used internally, within the house, for space cooling applications. Simply duct it over to where cooler air is desired or needed. Use of the cool air output of exchanger 46 can further reduce the use of or need for air conditioners.

Operation of the heat exchanger 46, described herein, can be accomplished by use of a simple power on/off switch accompanied by manual valves. This is not recommended, however, since this part of the invention is capable of both heating and cooling if simply "turned on". Simplified automation, for heating only, can be constructed using two temperature sensors in conjunction with an automatic valve operator. For example: an electronic comparator amplifier compares attic 34 sensor 58 to pool 76 sensor 226. When 58 is > 226, the comparator activates a relay that turns bypass valve 228 on and applies power to exchanger 46 fan 50. While simple automation of heat exchanger 46 is possible, it fails to take advantage of the capabilities of the "attic solar energy vehicle" and lacks the required minimum protection against catastrophic damage [which can potentially be caused by the present invention]. Full advantage of the present invention's capabilities are derived from the control functions and protections herein described and shown in FIGS. 22-25.

FIGS. 22-25 show five main operating modes: Automatic heating with switch 338 in "auto" and switch 340 in "heat"; automatic heating with backup 370 heating as needed [338 in "auto", 340 in "backup"]; automatic cool down to desired temperature with 338 in "auto" and 340 in "cool"; manual control with 338 in "manual"; and, manual ventilation with 338 in "vent". Minor or sublevel operating modes can include manually turning pump 222 on; manual operation of spa 78 using thermostat 298 and switch 354; or, automated operation of spa 78 using switch 378 and the internal preset "spa auto" temperature of 104° F. Control switch positions, input signal conditions, internal logic conditions along with resultant output conditions are detailed in FIG. 25.

Refer to FIG. 24 flow chart. Flow charting starts with determining the system's main operating mode. Is the main mode automatic, manual or ventilation? Manual and ventilate are self explanatory in the flow chart. Following the automatic path, the next step is to determine which automatic function is selected. Is the automatic mode to heat the pool, heat with backup heat as needed, or to cool the pool down?

Following the auto cool down path, the first decision point is the question: "Is pool 76 temperature 226 > temperature set 298?" The purpose here is to ensure that pool 76 temperature sensor 226 exceeds set temperature 298 point. If not, no further action is taken and the logic loops back to the automatic operating mode decision point in the flow chart. If pool 76 temperature sensor 226 > set temperature 298, the logic proceeds with the question: "Is it evening time?". If we are going to cool overheated pool 76 down with the present invention, it should be during the evening time when ambient temperature 296 drops below that of swimming pool 76. Factory set definition of "evening hours" is from 11 p.m. until 9 a.m. as previously described. These times are user adjustable via function set switches 302 and 304. The next step is to verify that pool 76 temperature sensor 226 is > ambient 296 temperature.

In the cool down process, the present invention requires that pool 76 temperature be > ambient 296 temperature. The present invention 46 requires a temperature differential to operate. In the reverse mode, we are looking electronically for a reverse temperature condition. If yes, the next step is to open automatic vents 36 and turn fan 50 on. This is done for 30 minutes to remove any heated air remaining in attic 34. Again, this time period is adjustable by the user. During this time period, bypass valve 228 is inhibited to prevent water flow through exchanger 46. After 30 minutes pass, the next step is to turn pump 222 and bypass valve 228 on. Logic then maintains this operating condition until set temperature 298=pool 76 temperature sensor 226 or until the logic breaks down [9 a.m. in the morning arrives, etc.]. Once the desired temperature is reached, the logic turns off fan 50 and bypass valve 228 and loops back to the automatic mode decision point. Pump 222 is turned off unless it is manually switched on.

Cooling down pool 76 is now restated. Sun 30 ceases its radiation onto roof 32 and "evening hours" [previously defined set points] are reached. During "evening hours", ambient 296 temperature drops below that of pool 76 temperature sensor 226. Pool 76 temperature sensor 226 is greater than temperature set 298 and switches 338 and 340 are in "auto" and "cool" respectively. These are the conditions for cooling down hot pool 76.

For the first 30 minutes, automatic vents 36 are opened up and fan 50 is turned on to blow out any remaining hot attic 34 air. After 30 minutes, pump 222 and bypass valve 228 are turned on. Hotter pool 76 water is sent into exchanger 46 inlet 242 where it is circulated through coil 56 and simultaneously exposed to "cooler" ambient 296 air flow. It is this cooler air 296 passing over hotter pool 76 water, within coil 56, that effects heat transfer in exchanger 46. The process is "reversed" forced air to liquid convection. The greater the temperature differential between ambient 296 and pool 76—the greater the heat transfer capability "out of pool 76". When pool 76 reaches temperature set 298, the process ceases. If the logic is broken, the process ceases.

Returning back to the automatic mode decision point, follow "Auto Heat" down to its first decision point. The first question: "Is pool 76 temp < temp set?" If not, the logic loops back. This first decision answers the question: "Do we want pool 76 heat?" The next decision point asks the question: "Is attic 34 > pool 76 +8° F.?" This is the startup threshold. When attic 34 is 8° F. warmer than pool 76 and pool 76 heating is desired [not equal to the set temp]—then exchanger 46 is turned on. As exchanger 46 is turned on, bypass valve 228 and pump 222 are turned on.

The next decision is whether or not pool 76 sensor 226=temp set 298. If not, attic 34 temperature sensor 58 is tested to ensure it is at least 2° F. higher than pool 76 temperature sensor 226. If yes, the heating process continues on. If the answer to this test is no, exchanger 46 is turned off along with bypass valve 228 and pump 222. If pool 76 temperature sensor 226 equals set temperature 298, shut down also occurs. This is the logic for heating pool 76.

Pool 76 heating is now restated. Sun 30 radiates solar energy onto roofing material 40 which is then conducted into attic 34 via roof structure 32 "conduction". Attic 34 based heat exchanger 46 fan 50 draws hot attic 34 air 184 immediately off of roof 32 interior where it is drawn into coil 56. Coil 56 inlet 242 is supplied pool 76 water via bypass valve 228 which routes pool 76 water up inlet pipe 62 into exchanger 46. Cooler pool 76 water circulates through coil 56 hot side first and out via outlet 244 back down return line 64 to pool 76 via support system 74.

While pool 76 water is in coil 56, heat transfer is effected from attic 34 air 184 into pool 76 water by "forced air to liquid convection" operating off of temperature differential principles. Maximum solar 30 energy collection and -distribution is accomplished by using spa 78 in conjunction with pool 76 so that when pool 76 has no need for solar 30 derived heat it can be channeled into spa 78. The present invention accomplishes maximum solar 30 extraction when "spa auto" switch 378 is pushed on. Roof 32 functions as a massive solar 30 energy collector and attic 34 functions as a storage and transfer device [medium] for exchanger 46. Pool 76 heating is enhanced by using flow reversal valve 212 in conjunction with the present invention. Such combined practice allows a marginal roof 32 and attic 34 environment to succeed in pool 76 heating. Full and automatic control of the present invention is accomplished by the control functions herein described.

Referring back to the automatic decision point follow "auto heat with backup" down to its first decision point. Again the question is asked: "Is pool temp 226 < temp Set 298?" After this point, the "attic solar energy vehicle" is tested. If attic 34 temp 58 > pool temp 226 +8° F., backup 370 heat is aborted and exchanger 46 is turned on as described above. The next test is for "evening hours". Logic prevents the use of backup heater 370 during the "evening hours". Getting past this point, time T1 is set to zero and a period of two hours [factory set and user adjustable] is established during which time backup heater 370 is further inhibited. This two hour time period allows sufficient time for solar 30 activity to begin if it is possible. After two hours, the logic will retest the "attic solar energy vehicle" for capability. If attic 34 passes the temperature test, exchanger 46 will be turned on and backup heat cycle 370 will be aborted resetting T1 to zero.

The purpose in these tests is to maximize the "attic solar energy vehicle" and minimize the use of fossil fuel backup 370 heaters. If no heat is available from the "attic solar energy vehicle", backup heater 370 is then turned on. At this point, the question becomes: "Is pool temp 226=temp set 298?" If yes, backup heater 370 is turned off. If no, the logic loops through continuous testing of attic 34 while backup heater 370 is allowed to heat pool 76. If, at any time, attic 34 temperature sensor 58 exceeds pool sensor 226 by the threshold amount of 8° F.—then backup heater 370 will be turned off and the "attic solar energy vehicle" will be used.

Pool 76 backup heating is now restated. Pool 76 heating is normally accomplished by use of the "attic solar energy vehicle". However, on certain days, sufficient solar 30 radiation may not be available. If backup 370 has been selected as the automatic operating mode by placing switch 340 in "backup", then heater 370 will be enabled as described above in the logic explanation. Logic will attempt to use the "attic solar energy vehicle" by constantly monitoring attic 34 temperature sensor 58 and by initiating a "waiting time" prior to using backup heater 370 in which solar 30 "is given a fair chance". If the logic is "convinced" that renewable solar 30 energy is not available, backup heater 370 will be turned on. Conditions will be continuously monitored to minimize backup heater 370 use and to maximize solar 30 energy use via "attic solar energy vehicle". FIGS. 24-25 can be studied to observe the pertinent conditions for other operating modes.

Shutting down the "attic solar energy vehicle" is accomplished by simply placing thermostat 298 in the "off" position. Achieving full automatic heating of pool 76 [without backup 370 heat] is accomplished by simply setting thermostat 298 to the desired temperature and switches 338 and 340 to "Auto" and "Heat". Manual operation is accomplished by placing switch 338 in "Man" and using mini switch bank 322 to set the desired operating environment. Switch bank 322 is especially useful for testing the system, controlling pump 222 during cleaning operations, and switching spa 78 on during periods when no pool 76 heat is desired. An example of such a time might be during mid July in Southern Florida where pool 76 is hot enough from its own solar 30 collection. In contrast, spa 78 at 104° F. will almost always be able to use solar 30 heat available from the "attic solar energy vehicle".

Automatic combined operation of pool 76 and spa 78 is achieved by pushing switch 378 to "On". When pool 76 doesn't need the heat available from the "attic solar energy vehicle", logic will automatically channel the heat into spa 78 as needed via control of spa valve operator 368. Temperature conditions are read on L.E.D. display 300 by rotating function switch 302 to the appropriate position. In addition, data input and data analysis is effected by using switch 302 in conjunction with switch 304. See descriptions of functions and data available in the previous "description" section. Operating status panel 306 provides a visual indication of key operating conditions. Piezo alarm 364 functions to audibly alert the user to any alarm condition that is detected. The user is further directed to three areas of possible trouble by red flashing L.E.D. indicator lights for freeze 316, check liner 318, and check PCS1 320 conditions.

During an alarm condition, pump 222 is turned off and drain solenoid 202 is activated [FIG. 16]. This allows air into exchanger 46 at inlet 242 thereby effecting a faster and more complete drain down of exchanger 46 and associated pipes 62 and 64. Auto draindown kit 232 provides the same drain down but does this anytime exchanger 46 is turned off by allowing exchanger 46, inlet pipe 62 and return pipe 64 to gravity drain through check valve 234. In essence, both methods break the "suction" that normally occurs and keeps water within exchanger 46. When exchanger 46 is first turned on, air bubbles will occur in the bottom of pool 76 [reverse flow path] as air is driven out of exchanger 46 during renewed water flow.

When cleaning pool 76, maximum pump 222 suction is channeled to line 208 by turning valve 210 all the way to the right [FIG. 20]. Valve 204 is turned on and the vacuum hose is connected to pool 76 vacuum port [physical pipe opening at pool 76].

The control panel can provide control for automating a pool vac if desired. A word of caution here about using a pool vac and flow reversal together. If plumbed improperly, water flow may be too dependent upon the pool vac and its position within pool 76. Do not allow 100% of the incoming water to be derived from the pool vac. Such a condition will yield erratic logic results as pool 76 water leaves the main drain and can simply reenter a pool vac physically located only 1-2 feet away. If this were the case, very little pool 76 water will be heated and a vortex of current will flow between the main drain and pool vac deceiving the logic with false water temperature 226 information.

Such a condition will abort the benefits of reverse flow since water coming out of the main drain in the floor is simply sucked back into the pool vac also located on the floor of pool 76 a majority of time. It will also provide poor water circulation and corresponding heat distribution throughout pool 76. All of this can lead to ineffective use of the "attic solar energy vehicle". A correctly installed pool vac will clean a pool using a minimal amount of time and a minimal amount of water flow [determined by pool vac specs]. The use of an automatic pool vac is recommended during "non heating" times to avoid any possibility of operating conflict caused by the different device priorities.

Operation of exchanger 96 shown in FIG. 18 produces similar results and operates in a similar manner. In attic 34, heat is now transferred from attic 34 air 184 into the liquid refrigerant passing through coil 272 as a first stage of heat exchange. A second heat transfer stage whereby heat is transferred from the liquid refrigerant into pool 76 occurs in the balance of heat pump 128 located adjacent to support system 74.

Operation of exchanger 284 shown in FIG. 19 produces similar results and operates in a similar manner. Exchanger 284 now allows the use of the heat pump cycle for backup of the convection cycle when solar 30 heat is not available. The present inventions control logic provides automatic control of both methods. Coil 56 convection is used whenever possible as previously described. The logic activates the heat pump cycle and coil 272 as a last resort. Coil 56 and coil 272 are exclusive of each other. Only one operates at a given time.

During the late fall in Minnesota and other States, attic 34 stops gaining heat. Sensor 58 indicates that sometime in October or November, roof 32 and attic 34 will then start to "follow the ambient" outside temperature and have no useable heat. However, in States below the frost belt, roof 32 and attic 34 will still function in a year around capacity. Wherever the average daily temperature exceeds 50° F.—it is estimated that the "attic solar energy vehicle" can be placed into productive use. Sometime in mid February to early March, the attics in Northern States again become viable. In fact, whenever pool 76 water begins to thaw and is at 33° F., attic 34 is typically between 50°-80° F. and contains an enormous amount of potential heat. This heat can be applied immediately to swimming pool 76 to accelerate its startup date.

Winterization techniques are simple. Winterize pool 76 as otherwise required. Drain exchanger 46, inlet line 62, return line 64 and then blow them out with an air compressor to assure no water is trapped. Tilting exchanger 46 up two inches on the end opposite inlet 242 and outlet 244 will allow any trapped water to drain down completely. Remove the union coupling connected to outlet 244 and add ½ gallon of non toxic antifreeze to the bottom of coil 56. Spring startup includes a visual inspection of attic 34 exchanger 46.

SUMMARY, RAMIFICATIONS, AND SCOPE

Thus the reader will see that a new solar energy system is created by using an unmodified roof and attic in conjunction with an attic based forced air to liquid heat exchanger. The reader will also see that the present invention provides a unique way of utilizing solar energy without the problems associated with traditional solar panelled systems. In addition, that the roof and attic are capable of collecting and conducting enormous amounts of solar energy when a significant "heat sink" is located physically within the attic structure to "absorb" the solar energy. Also, that the roof and attic can be made "active" in a way that solar energy collection is significantly enhanced and not just "passively" used.

Useful embodiments of the present invention include but are not limited to swimming pool heating, spa heating, hot tub heating, domestic hot water heating, space heating, swimming pool cooling, space cooling and simultaneous hot water and space heating.

The attic based forced air to liquid heat exchanger can take several forms. Straight air to liquid [water or any other liquid]; air to liquid refrigerant; dual mode devices that use both air to liquid and air to refrigerant heat transfer coils; or, multiple mode units that use two or more liquids of any type and their corresponding heat transfer coils.

Operation of the "attic solar energy vehicle" is low in cost as it relies on forced air to liquid convection principles and temperature differentials and not the burning of fossil fuels. Operating costs are generally limited to that of the fan involved within the heat exchanger.

Useful life of the present attic based heat exchanger, in acidic pool conditions, is several times that of existing swimming pool heat pump heaters by way of two significant factors. First, overall exposure of the heat transfer coil to the pool water is reduced from 100% down to 42% by using a bypass valve which only routes the pool water into the exchanger when it is used. Second, pool water is divided by nine different circuits causing each circuit to be only exposed to acidic pool water 4.6% of the time versa the heat pump coil circuit exposure of 100%.

Use of the "attic solar energy vehicle" will reduce substantially the need to use fossil fuel for heating swimming pools and other applications thereby improving both the greenhouse effect and the ozone problem which currently pose enormous threats to humanity.

Installation of the present attic based heat exchanger is simpler and less complicated than the construction of either roof based solar panel systems or attic based passive pipe systems. The heat exchanger can accept full water flow rates, from the pool's support system, without modification or internal bypass flow circuits via the full 2″ inlet and outlet manifolds. The exchanger uses the existing pool filtration pump and does not require a second booster pump.

The control logic described provides sophisticated and complete control over the "attic solar energy vehicle" including the monitoring of its performance and correlation capabilities to ambient weather patterns. This correlation capability will inherently instruct users when to use solar blankets and backup heaters.

When used with the flow reversal principles of swimming pool heating described in Krumhansl's U.S. Pat. No. 4,621,613 (11/1986), the present invention can provide for sufficient pool heating under poor attic and roof conditions and at very low attic temperature conditions.

The present invention will broaden the swimming pool heating market by providing a heating system that: (a) does not involve massive roof modifications, (b) does not involve high monthly operating costs, (c) does not burn fossil fuels, and (d) does not use chlorofluorocarbon chemicals (CFC's).

Prolonged life of roofing materials is apparent by the internal sinking of the attic and the lowering of the attic's peak temperature profile. The need for radiant heat barriers is eliminated where the present invention is utilized primarily for swimming pool heating.

While my above description contains many specificities, these should not be construed as limitations on the scope of the invention, but rather as an exemplification of one or more preferred embodiments thereof. Many other variations are possible.

For example, the sizing of the heat exchangers can be varied greatly and centered on different btu per hour ratings for different liquid heating applications [swimming pools vs domestic hot water, etc.]. Different physical sizes of the heat exchanger can also be used for different sizes of swimming pools. Different materials can be used in the heat exchanger to enhance the heat transfer capability and chemical resistance for different liquids. The heat exchanger can be located inside the attic, outside the attic or physically on the roof or built into the roof, etc. [different mounting configurations].

Other sensors can be added to improve the leak protection schemes presented herein such as a water flow detector within the leak liner draindown pipe or a pressure sensor to detect subtle changes of pressure within the system while operating. Other improvements to the control logic can be made such as providing an input runtime for control of an automatic pool vacuum during "non heating" hours.

Direction of the airflow can be changed and varied. A fan, with multiple speeds, can be used. Different fans and motors can be employed for different SCFM requirements. The attic heat exchanger can be built in a circular form to improve the internal attic heat transfer and air flow. Different roofing materials can be employed to absorb greater amounts of solar radiation. Different roof structure materials can be employed to conduct heat faster and more efficiently.

Additional automatic valve operator functions can be added and additional data can be collected and displayed on the controller. Premanufactured support systems can be supplied for the attic heat exchanger. This is useful in new pool construction where retrofitting the support system is not required. The swimming pool and heat exchanger can then just "plug in". Exchangers can be built in more modular form for easier installation and service. They can also be modified in many different ways for the direction of both air input and air output circuits [to take advantage of the cooler air output of the exchanger, etc.]. The attic can be enhanced to present hot air easier and faster to the heat exchanger by other devices such as fans, etc.

Accordingly, the scope of the invention should be determined not by the embodiments illustrated, but by the appended claims and their legal equivalents.

I claim:

1. A solar energy collection and heat transfer means for heating a liquid, comprising:
   (a) a substantially structurally unmodified roof means for collecting solar energy;
   (b) a substantially structurally unmodified attic means adjacent said roof means, said attic means for receiving and storing the solar energy collected by said roof means;
   (c) a forced air to liquid heat exchanger means within said attic means for transferring the stored solar energy from said attic means into a liquid, said liquid for receiving and absorbing the solar energy stored by said attic means, said forced air to liquid heat exchanger means further comprising:
      (i) an air to liquid heat transfer coil, said coil comprising an inlet manifold, an outlet manifold, and a plurality of individual tubular members joined to form a plurality of coil circuits, said circuits interconnecting said manifolds and being substantially coplanar therewith;
      (ii) fan means for drawing the air in said attic means into an air flow path having an upstream direction and a down-stream direction, said fan means being adjacent to said coil and down-stream therefrom;
      (iii) electric motor means operably connected to said fan means for driving said fan means;
      (iv) venturi air flow means for directing said air; and
      (v) housing means for housing said coil, fan means, motor means, and venturi air flow means, wherein said fan means, motor means, and venturi air flow means are substantially coplanar and down-stream from said coil; and
   (d) a liquid system means for providing a controlled liquid flow path and for moving said liquid to and from said forced air to liquid heat exchanger means.

2. The solar energy collection and heat transfer means of claim 1, further including operational parameter sensing means for sensing operational parameters.

3. The solar energy collection and heat transfer means of claim 2 further including control means operably connected to said solar energy collection and heat transfer means and to said operational parameter sensing means, said control means for controlling said solar energy collection and heat transfer means.

* * * * *